US007707487B2

(12) United States Patent
Easter et al.

(10) Patent No.: US 7,707,487 B2
(45) Date of Patent: Apr. 27, 2010

(54) METHOD AND SYSTEM FOR COMPLIANCE FORMS AND COMPLIANCE FORMS USER INTERFACE

(75) Inventors: Clark Easter, Monkton, MD (US); Theodosia Ewers, Mount Savage, MD (US); Jonathon Bealer, Monkton, MD (US); Gabor Banoczi, Baltimore, MD (US); Robert Volker, Towson, MD (US); David Williams Adams Mabelle, Kilauea, HI (US)

(73) Assignee: Spectrum K12 School Solutions, Inc., Towson, MD (US)

( * ) Notice: Subject to any disclaimer, the term of this patent is extended or adjusted under 35 U.S.C. 154(b) by 141 days.

(21) Appl. No.: 10/648,790

(22) Filed: Aug. 27, 2003

(65) Prior Publication Data
US 2004/0073868 A1 Apr. 15, 2004

Related U.S. Application Data

(60) Provisional application No. 60/406,046, filed on Aug. 27, 2002, provisional application No. 60/477,346, filed on Jun. 11, 2003.

(51) Int. Cl.
*G06F 15/00* (2006.01)
*G06F 7/00* (2006.01)
*G09B 3/00* (2006.01)

(52) U.S. Cl. .................. 715/225; 715/224; 715/226; 715/273; 434/322; 434/365; 707/3; 707/104.1

(58) Field of Classification Search .................. 715/505, 715/506–508, 780, 221–226, 234; 709/218; 705/44; 434/118, 323, 350, 362
See application file for complete search history.

(56) References Cited

U.S. PATENT DOCUMENTS

| 6,075,968 | A | * | 6/2000 | Morris et al. | .......... 434/350 |
| 6,154,753 | A | * | 11/2000 | McFarland | .......... 715/508 |
| 6,270,351 | B1 | * | 8/2001 | Roper | .......... 434/118 |
| 6,464,505 | B1 | * | 10/2002 | Pocock | .......... 434/219 |

(Continued)

OTHER PUBLICATIONS

David R. Olson, "Assent and Compliane in Children's language comprehension", Proceedings of the theoretical issues in nature language processing-2, ACM, Jul. 1978, pp. 115-124.*
C. Heckman et al., "Designing Goverment Agents for Constitutional Compliance", Proceedings of the third annual conference on Autonomous Agents, ACM, Apr. 1999, pp. 299-305.*
"www.4glsoftware.com", retrieved from the wayback machine, Mar. 2001, pp. 1-22.*

(Continued)

*Primary Examiner*—Laurie Ries
*Assistant Examiner*—Maikhanh Nguyen
(74) *Attorney, Agent, or Firm*—Arent Fox LLP

(57) ABSTRACT

A method and system for interactive and automated assistance with document (e.g., forms) completion for use in complying with requirements or otherwise performing functions for which automated documents are useful, and a user interface for a code authoring tool to support development, customization, and revision of such documents. The user interface for document completion includes search functions to identify documents needing completion, highlighting of fields of documents based on priority for completion of those fields, and a compliance check feature to confirm proper document completion. The code authoring tool allows a user to customize the format of data limitations for fields in documents, define selection choices presented, which are linked to the fields, create help, warning, or error messages, build calculations, define business rules, and generate code and associated documentation, which may be optionally exported.

31 Claims, 72 Drawing Sheets

U.S. PATENT DOCUMENTS

| | | |
|---|---|---|
| 6,507,726 B1 * | 1/2003 | Atkinson et al. ............ 434/350 |
| 6,561,812 B1 * | 5/2003 | Burmester et al. .......... 434/365 |
| 6,813,474 B2 * | 11/2004 | Robinson et al. ............ 434/353 |
| 6,904,412 B1 * | 6/2005 | Broadbent et al. ............. 705/38 |
| 6,912,502 B1 * | 6/2005 | Buddle et al. ................... 705/1 |
| 7,069,234 B1 * | 6/2006 | Cornelius et al. .............. 705/26 |
| 7,330,817 B1 * | 2/2008 | Exall et al. ...................... 705/1 |
| 7,398,467 B1 * | 7/2008 | Bates et al. .................. 715/234 |
| 2002/0059107 A1 * | 5/2002 | Reich et al. .................... 705/26 |
| 2002/0194014 A1 * | 12/2002 | Starnes et al. ................... 705/1 |
| 2003/0055669 A1 * | 3/2003 | Ryan et al. ...................... 705/1 |
| 2003/0113697 A1 * | 6/2003 | Plescia ........................ 434/322 |
| 2003/0190593 A1 * | 10/2003 | Wisnosky et al. ........... 434/362 |
| 2003/0236796 A1 * | 12/2003 | Easter et al. ............. 707/104.1 |
| 2004/0044684 A1 * | 3/2004 | Easter et al. ............ 707/103 R |
| 2004/0177326 A1 * | 9/2004 | Bibko et al. ................. 715/530 |
| 2005/0102283 A1 * | 5/2005 | Anderson et al. ............... 707/4 |

OTHER PUBLICATIONS

Silver, Robert, "A User's Guide to the 1999 IDEA Regulations," Mar. 18, 1999, Revised May 7, 1999, pp. 1-60.*

R. Silverstein, "A User's Guide to the 1999 IDEA Regulations," Mar. 18, 1999, Revised May 7, 1999.*

Federal Register, Part II—Department of Education, 34 CFR Parts 300 and 303, vol. 64, No. 48, Mar. 12, 1999, pp. 1-268.*

Jeffrey M. Kaplan, Justice Department Revises Corporate Prosecution Standards, Ethikos and Corporate Conduct Quarterly—Examining Ethical and Compliance Issues in Business, May/Jun. 2003, vol. 16, No. 6, pp. 1-16.*

* cited by examiner

FIG. 5

Green shaded fields

Purple/salmon shaded fields

Yellow shaded fields

FIG. 6

All Yellow

FIG. 7

Purple/salmon shaded field

SETS: EZ Compliance - Forms Writer

Admin | Return to last search | Select new student | Logout — 172

Student Search Criteria

First Name:
Last Name:
DOB:
SSN:
Student ID:
IEP School: 9999 - Temporary School (Training) | Training Region Search

Admin | Return to last search | Select new student | Logout

— 192

— 194

| Student ID | SSN |
|---|---|
| 356139 | 242553730 |
| 979224 | 239752380 |
| 979495 | 239751009 |
| 378279 | 237670085 |
| 468009 | 241492318 |
| 632992 | 241414427 |
| 978143 | 240579304 |
| 193370 | 242497034 |
| 458928 | 244731322 |
| 218187 | 244558401 |

EZ FORMS - Citrix ICA Client

SETS Form Writer by 4GL - Microsoft Internet Explorer

Student: SEVEN FORMS   ID: 70799

Admin | Return to last search | Select new student | Logout

| * Special Ed | Intervention | | | |
|---|---|---|---|---|
| 🔲 Meeting | Events | Student Profile | | |
| 📋 Details: | | | | |

06/13/2002 [Draft] 📄 ]   Compliance: ☐ Check

EXEC ListMeetingForm 15,1,0, 1

ERM Initial   ▶* ADD EVENT TO THIS MEETING   Delete Event

| | Form Name | Form Rule | Form Status | |
|---|---|---|---|---|
| ✓ | Notice Of Meeting (06/13/2002) ☐ Lock | ◆ Required | Compliant | |
| | Special Education Referral/Evaluation Review/Consent Form | | blank form | |
| | Special Education Direct Referral/ Consent Form | ○ Optional | blank form | |
| * | Request For Records | ○ Optional | Non-Compliant | ✗ delete |
| * | Release Of Information | ○ Optional | Non-Compliant | ✗ delete |
| * | Evaluation Extension | ◆ Required | Non-Compliant | ✗ delete |

IEPT Post-Initial   Delete Event

| | | ◆ Required | | |
|---|---|---|---|---|
| | IEPT Report Pages 1 & 2 | ◆ Required | blank form | |
| | IEPT Report Pages 2 & 4 | ◆ Required | blank form | |
| | IEPT Report Pages 5 & 6 | | blank form | |

Admin | Return to last search | Select new student | Logout 242, 244, 246, 248

| Student ID | SSN |
|---|---|
| 465586 | 448654998 |
| 46456 | 896559798 |
| 45445855 | 454868498 |
| 9999999 | 165248955 |
| 12345 | 212908720 |
| 4646589 | 848465987 |
| 4656464 | 513152155 |
| 45548978 | 465484564 |
| 4645864 | 465858512 |
| 999689 | 465696465 |
| 465645 | 465585345 |
| 46565686 | 465988568 |

Student: SEVEN FORMS  ID: 70799

Admin | Return to last search | Select new student | Logout

* Special Ed    Intervention

Student Profile

Meeting / Event

☐ List

▽ Filter [ ▼ ]    show all    ▶* Add Meeting / Event

| Da | Meeting / Event Type | Forms | Status |
|---|---|---|---|
| ERM Initial | MET Initial | | |
| 05/ MET Initial | IEPT Initial | | Draft |
| 05/ IEPT Initial | ERM Initial | | Draft |
| 05/ IEPT Post-Initial | IEPT Post-Initial | | Draft |
| ERM Reeval (3yr) | ERM Reeval (3yr) | | |
| MET Reeval (3yr) | MET Reeval (3yr) | | |
| IEPT Reeval (3yr) | IEPT Reeval (3yr) | | |

SETS: EZ Compliance - Forms Writer

Admin | Return to last search | Select new student | Logout

Student Search Results...

Click on Student Name to view/update information.

| | Student Name | Student ID | SSN |
|---|---|---|---|
| 1 | SMITH, AARON | 356132 | 242553730 |
| 2 | SMITH, ALEX | 279224 | 239752380 |
| 3 | SMITH, ALEXANDER | 929495 | 239751009 |
| 4 | SMITH, ALEXANDER | 378279 | 237670085 |
| 5 | SMITH, ALLEN | 468002 | 241492318 |
| 6 | SMITH, ALONZO | 632992 | 241444427 |
| 7 | SMITH, AMANDA | 978143 | 240579304 |
| 8 | SMITH, AMBER | 193370 | 242497024 |
| 9 | SMITH, ANDREW | 458928 | 244731322 |
| 10 | SMITH, ANNA | 218187 | 244558401 |
| 11 | SMITH, ANNA | 279221 | 239754076 |
| 12 | SMITH, ANTONIO | 204137 | 243473316 |
| 13 | SMITH, ANTONIO | 951503 | 246877033 |
| 14 | SMITH, APRIL | 660101 | 237522389 |
| 15 | SMITH, AUSTIN | 959867 | 238834363 |
| 16 | SMITH, BELVIN | 128002 | 243556315 |
| 17 | SMITH, BENJAMIN | 325749 | 246532258 |
| 18 | SMITH, BERNARD | 959812 | 240535096 |
| 19 | SMITH, BOBBIE | 598367 | 81682356 |
| 20 | SMITH, BOBBY | 193236 | 242433510 |

Records 1 - 20 out of 163

Next >

Student: SEVEN FORMS  ID: 70799          Admin | Return to last search | Select new student | Logout

* Special Ed

Meeting | Events    Intervention    Student Profile

▶* Select one stand-alone event -or- multiple events which take place on the same date, then click CREATE

| Meeting / Event Type | Forms |
|---|---|
| ☑ ERM Initial 322 | |
| ☐ MET Initial | |
| ☐ IEPT Initial | |
| ☐ IEPT Post-Initial 324 | |
| ☐ ERM Reeval (3yr) | |
| ☐ MET Reeval (3yr) | |
| ☐ IEPT Reeval (3yr) | |

Student: SEVEN FORMS   ID: 70799

Admin | Return to last search | Select new student | Logout

Special Ed

Intervention | Student Profile

Meeting | Events

▶* Select one stand-alone event -or- multiple events which take place on the same date, then click CREATE

| Meeting / Event Type | Forms |
|---|---|
| ☑ ERM Initial | |
| ☐ MET Initial | |
| ☐ IEPT Initial | |
| ☐ IEPT Post-Initial | |
| ☐ ERM Reeval (3yr) | |
| ☐ MET Reeval (3yr) | |
| ☐ IEPT Reeval (3yr) | |

*Screen capture of EZ FORMS - Citrix ICA Client / SETS Form Writer by 4GL - Microsoft Internet Explorer*

Student: SEVEN FORMS    ID: 70799

Admin | Return to last search | Select new student | Logout

- Special Ed | Intervention
- Meeting | Events | Student Profile
- Details

Compliance: [ ] Check

05/13/2002 [Draft]

▶ * ADD EVENT TO THIS MEETING — 352

EXEC ListMeetingForm 45,1,0, 1
ERM Initial

Delete Event

| Form Name | Form Rule | Form Status |
|---|---|---|
| New Notice Of Meeting | ◆ Required | blank form |
| Special Education Referral/Evaluation Review/Consent Form | | blank form |
| Special Education Direct Referral/ Consent Form | | blank form |
| Request For Records | ○ Optional | blank form |
| Release Of Information | ○ Optional | blank form |
| Evaluation Extension | ○ Optional | blank form |

To get access to the applicable forms please complete and lock the Notice of Meeting.

| EZ FORMS - Citrix ICA Client | _ □ × |
| SETS Form Writer by 4GL - Microsoft Internet Explorer | _ □ × |

Student: SEVEN FORMS   ID: 70799         Admin | Return to last search | Select new student | Logout

| * Special Ed | Intervention | | |

| Meeting | Events | Student Profile |
| Details |

05/13/2002 [Draft 📄 ]                                                  Compliance: [ ] Check EXEC ListMeetingForm 45,1,0, 1
ERM Initial

▶* ADD EVENT TO THIS MEETING

Delete Event

| Form Name | Form Rule | Form Status |
|---|---|---|
| 📄 New Notice Of Meeting | ◆ Required | blank form |
| Special Education Referral/Evaluation Review/Consent Form | | blank form |
| Special Education Direct Referral/ Consent Form | | blank form |
| Request For Records | ○ Optional | blank form |
| Release Of Information | ○ Optional | blank form |
| Evaluation Extension | ○ Optional | blank form |

Done                                                                          Local intranet

| SETS Form Writer by 4GL - Microsoft Internet Explorer | _ □ X |
|---|---|

Student: EIGHT FORMS   ID: 80899        Admin | Return to last search | Select new student | Logout

* Special Ed | Intervention |

Student Profile

Meeting | Events

Details

06/10/2002 [Draft]                                          Compliance: [ ] Check    422

EXEC ListMeetingForm 51,1,0, 1
IEPT Post-Initial

▶* ADD EVENT TO THIS MEETING

Delete Event

| | Form Name | Form Rule | Form Status |
|---|---|---|---|
| ✓ | Notice Of Meeting (06/10/2002) [ ] Lock | ◆ Required | Compliant |
| ✓ | IEPT Report Pages 1 & 2 | ◆ Required | Compliant |
| ✓ | IEPT Report Pages 2 & 4 | ◆ Required | Compliant |
| ✓ | Behavior Manifestation Determination | ○ Optional | Compliant    X delete |
| ✓ | Annual Goals and Short Term Objectives #1 - Enter text here | ◆ Required | Compliant |

| SETS Form Writer by 4GL - Microsoft Internet Explorer | | | | _ □ X |
|---|---|---|---|---|
| Student: EIGHT FORMS ID: 80899 | | Admin | Return to last search | Select new student | Logout | | | |
| | | | | |
| * Special Ed | Intervention | | | |
| | Student Profile | | | |
| ⊞ Meeting | Events | | | |
| ⌨ Details | | | Compliance: ☐ Check | |
| 06/10/2002 [Draft 📅] | | | | |
| Check: PASSED ☐ Lock | | | ▶* ADD EVENT TO THIS MEETING | |
| 🗐 Clear Window | | | | |
| EXEC ListMeetingForm S1,1,0,1 | | | | |
| IEPT Post-Initial | | | Delete Event | |
| Form Name | | Form Rule | Form Status | |
| ✓ | Notice Of Meeting (06/10/2002) ☐ Lock | ◆ Required | Compliant | |
| ✓ | IEPT Report Pages 1 & 2 | ◆ Required | Compliant | |
| ✓ | IEPT Report Pages 2 & 4 | ◆ Required | Compliant | |
| ✓ | IEPT Report Pages 5 & 6 | ◆ Required | Compliant | |

SETS Form Writer by 4GL - Microsoft Internet Explorer

Student: EIGHT FORMS   ID: B0899

Admin | Return to last search | Select new student | Logout

* Special Ed | Intervention | Student Profile

Meeting | Events

Details

06/10/2002 [Draft]   Lock   442

Check: PASSED   Compliance: Check

Clear Window

EXEC ListMeetingForm S1,1,0,1

IEPT Post-Initial   ▶* ADD EVENT TO THIS MEETING   Delete Event

| | Form Name | Form Rule | Form Status |
|---|---|---|---|
| ✓ | Notice Of Meeting (06/10/2002)  Lock | ◆ Required | Compliant |
| ✓ | IEPT Report Pages 1 & 2 | ◆ Required | Compliant |
| ✓ | IEPT Report Pages 2 & 4 | ◆ Required | Compliant |
| ✓ | IEPT Report Pages 5 & 6 | ◆ Required | Compliant |

SETS Form Writer by 4GL - Microsoft Internet Explorer  _ □ ×

Student: BUGS BUNNY   ID: 9999999

Admin | Return to last search | Select new student | Logout

* Special Ed

Student Profile

🗐 Meeting | Events

📋 Details                                                    Compliance: ☐ Check 03/25/2002 [Draft 📄]

Check: PASSED   ☐ Lock ⟶ 452

📋 Clear Window                                               ▶* ADD EVENT TO THIS MEETING

Functional Behavior Assessment (only)                                Delete Event

| | Form Name | Form Rule | Form Status |
|---|---|---|---|
| 📄 | DEC Prior Notice/Invitation (03/25/2002) | ○ Optional | Released |
| 📄 | New DEC Prior Notice/Invitation | | blank form |
| ✓ | Functional Behavior Assessment | ◆ Required | Compliant |

Student: AMY FORMS   ID: 4566000                                    Admin | Return to last search | Select new student | Logout

Meeting | Events   Student Profile

Details

04/08/2002 [Released]

Re-Evaluation Prep

| | Form Name | Form Rule | Form Status |
|---|---|---|---|
| | DEC Prior Notice/Invitation (04/08/2002) | ◇ Required | Released |
| | DEC 3 RAT | ◇ Required | Released |
| | DEC 2 | ◇ Required | Released |
| * | SETS Meeting Datasheet | ◆ Required | Non-Compliant |

Re-Evaluation

| | DEC 3 | ◇ Required | Released |
|---|---|---|---|
| | DEC 5 Prior Notice | ◇ Required | Released |

Annual Review

| | DEC 4 Page 1 - Special Factors | ◇ Required | Released |
|---|---|---|---|
| | DEC 4 Page 2 - Goal Page #1 - Money | ○ Optional | Released |
| | DEC 4 Page 3 - Service Delivery | ◇ Required | Released |
| | DEC 4 Page 4 - Signature | ◇ Required | Released |
| | Transition Statement / Plan | ◇ Required | Released |
| | Transition Plan Page 2 | ◆ Required | Released |
| | Progress Report | ◆ Required | blank form |
| * | SETS IEP Datasheet | ◆ Required | Non-Compliant |

SETS Form Writer by 4GL - Microsoft Internet Explorer

Student: EIGHT FORMS   ID: 80899

Admin | Return to last search | Select new student | Logout

| ✶ Special Ed | Intervention | |
|---|---|---|
| | Student Profile | |

482

⬛ Meeting | Events

▦ Details

06/10/2002 [Draft ▤ ]   Compliance: ☐ Check

Check: PASSED   ☐ Lock

📋 Clear Window

EXEC ListMeetingForm 51,1,0, 1
IEPT Post-Initial

▶ ✶ ADD EVENT TO THIS MEETING

Delete Event

| | Form Name | Form Rule | Form Status |
|---|---|---|---|
| ✓ | Notice Of Meeting (06/10/2002) | ◆ Required | Compliant |
| ✓ | IEPT Report Pages 1 & 2 | ◆ Required | Compliant |
| ✓ | IEPT Report Pages 2 & 4 | ◆ Required | Compliant |
| ✓ | IEPT Report Pages 5 & 6 | ◆ Required | Compliant |

* Special Ed

Meetings / Events | Student Profile | Access Log

Details

06/30/2003 [Draft]

Check: FAILED

1. PK DEC 3 is not compliant.
2. DEC Prior Notice/Invitation - must be locked individually before locking entire set.
3. PK DEC 4 Page 3 is not compliant.
4. PK DEC 4 Page 4 - Signature is not compliant.
5. BIP - Behavioral Intervention Plan is not compliant.
6. DEC 5 Prior Notice is not compliant.
7. DEC 6 is not compliant.
8. DEC Prior Notice/Invitation - must be locked individually before locking entire set.
9. Because you selected [Student requires assistive technology devices] on DEC4_1, ASSISTIVE TECHNOLOGY must be reflected on a Goal Page. [DEC4_2]
10. Because you selected [Student has special Communication needs in DEC4_1]. You must fill out a COMMUNICATION goal page. [DEC4_2]
11. Because you selected [Student has behavioral problems] in DEC4 Page 1. You are required to fill out a BIP - Behavioral Intervention Plan. [BIP]
12. Because you selected [Student impedes the learning of others] in DEC4_1. You must fill out a BEHAVIOR Goal Page. [DEC4_2]
13. DEC 4 Page 2 - Goal Page #1 for Behavior is not complete.

Clear Window

Step 4. Create help, warning or error messages

Select a message below to modify    Team Meeting Message    aka Rule02

Purpose Of Meeting
Team Meeting Message
Click to Name Rule 03
Click to Name Rule 04
Click to Name Rule 05
Click to Name Rule 06

← 881

Update Rule Name

Clear All Rules

Choose fields to apply the message to

Save

← 880

→ 883

Attach message to field(s)

Hearing Left

When to fire business logic
Message Part 1
Field or Calculation Result
Insert Value
Message Part 2
Field or Calculation Result
Insert Value
Message Part 3
Field or Calculation Result
Insert Value

← 882

Validate
Meeting on
Field
Purpose1
complete by
Field
Team Mtg Date

FIG. 56

Automatic Specification Documentation

Group to change Address, City State Zip. If Control Field Purpose has the value Invitation Set Control Color to required Set Group Color to required Set Group Visibility to visible Set Group Value to same Else Set Control Color to optional And Set Group Color to optional And Set Group Visibility to visible And Set Group Value to same

*Javascript Created*

ObjectControls([TargetObjectArrayOrPrefix:
[ostrAddress,ostrCityStateZip],ControllingField:chkPurpose],TheControlValue:"Invitation",ControlColorIfTrue:"required",TargetColorIfTrue:"required",TargetDisplayIfTrue:"visible",TargetValueIfTrue:"same",ControlColorIfFalse:"optional",TargetColorIfFalse:"optional",TargetDisplayIfFalse:"visible",TargetValueIfFalse:"same"])

PRIOR WRITTEN NOTICE TO PARENTS

Date:

This is to notify you of the district's action regarding Sara educational program.

1. Description of the action:
   - ☑ Refusal to initiate an evaluation
   - Initial evaluation
   - Reevaluation
   - Expedited evaluation
   - Change of placement
   - Graduation from high school
   - IEP Issues/meetings where the parent(s) disagree with the District
   - Due process hearing, or an expedited due process hearing, initiated by the district
   - Other (Describe action taken).

2. An explanation of why the school district is taking the action:

| Help with Why | 6/29/2003 |
   4GL Type: Multi Line Text
   Default Color: Yellow
   Label: Why
   Multiline: Single
   Name: txtWhy
   Size: 101
   Type: text
   Visibility: Visible 3. A description of any other options the school district considered rejected:

Show Object Properties
Check Box Properties
Turn Validation on/Off
Turn Debugging On/Off

FIG. 60A

| FORM | FORM NAME/FIELD | Automated Compliance | WS/FCS | NC Page Directions | STATE PROCEDURES MANUAL | FEDERAL REGISTER |
|---|---|---|---|---|---|---|
| INVITATION | Modified day checkbox | X | | | | |
| | Transition to school age checkbox | X | | | .1501 Q | |
| | Purpose | | | | | |
| | -change in educational placement | X | | | .1507 E (2) | 300.345 (B) (1) (i) |
| | Date | X | | X | | 300.345 |
| | Student Invitation | X | X | | .1504 B (7) | 300.345 (b) (2) (3) |
| | Time | X | | | .1507 E (1)&(2) | 300.345(b)(1)(i) |
| | Location | | | | .1507 E (2) | 300.345(b)(1)(i) |
| | Attendees | X | | | .1504 B | .300.344 Appendix A #7 |

FIG. 60B

| FORM | FORM NAME / FIELD | Automated Compliance | WS/FCS | NC Page Directions | STATE PROCEDURES MANUAL | FEDERAL REGISTER |
|---|---|---|---|---|---|---|
| IEP DEC 4_1 | IEP Duration Dates | X | | | .1507 C(7) & G(1) | 300.347 (a) (6) |
| | Student's Disability | | | | .1507 A | 300.347 (a) |
| | # of Disabilities | | | | .1501 A | 300.7 (b) & (c) |
| | Specific Factors | | | | | |
| | - student strengths | | | | .1507 B(2) | 300.346 (a) (2) |
| | - parent concerns | | | | .1507 B(1)a | 300.346 (a)(1)(i) |
| | - behaviors impede | X | X | | .1507 B(1)a | 300.346 (a)(1)(i) |
| | | | | | .1507 B(2)a | 300.346 (a)(2)(i) 300.346 (c) |
| | - limited English | | | X | .1507 B(2)b | 300.346 (a)(2)(ii) |
| | - use of Braille | X | | | .1507 B(2)c | 300.346 (a)(2)(iii) |
| | - communication needs | X | X | | .1507 B(2)d | 300.346 (a)(2)(iv) |
| | - deaf or hard of hearing | X | | X | .1507 B(2)d | 300.346 (a)(2)(iv) |
| | -assistive technology | X | X | | .1507 B(2)e | 300.346 (a)(2)(v) |

FIG. 60C

| FORM | FORM NAME / FIELD | Automated Compliance | WS/FCS | NC Page Directions | STATE PROCEDURES MANUAL | FEDERAL REGISTER |
|---|---|---|---|---|---|---|
| | Other Factors | | | | | |
| | - Adaptive Physical Education | X | | X | .1501 B | 300.307 |
| | - 17 and informed of rights | X | | X | .1512 R | 300.347(c) |
| | - Transition | X | | X | .1507 C(8) & (9) | 300.347 (b) |
| DEC 4 Attachment | Special Factors to Be Considered For a Student Who is Deaf or Hard of Hearing | X | | | .1507 B(2)(d) | 300.346 (a)(2)(iv) |
| | - language and communications skills | | | | .1507 B(2)(d) | 300.346 (a)(2)(iv) |
| | - opportunities for direct communication with peers and professional personnel in the student's language communication mode | | | | .1507 B(2)(d) | 300.346 (a)(2)(iv) |
| | - academic levels | | | | .1507 B(2)(d) | 300.346 (a)(2)(iv) |
| | - full range of needs, including direct instruction in the student's language and communication mode | | | | .1507 B(2)(d) | 300.346 (a)(2)(iv) |
| DEC 4_2 | Present Level of Performance | | | | .1507 C(1) | 300.347 (a)(1) |
| | Specific Need | | X | | | |
| | Annual Goal | | X | | .1507 C(2) | 300.347 (a)(2) |
| | Objectives/Benchmarks | X | X | | .1507 C(2) | 300.347 (a)(2) |
| | Measures of Progress | X | | | .1507 (12)(a) | 300.347 (a)(7)(i) |

FIG. 60D

| FORM | FORM NAME / FIELD | Automated Compliance | WS/FCS | NC Page Directions | STATE PROCEDURES MANUAL | FEDERAL REGISTER |
|---|---|---|---|---|---|---|
| DEC 4_3 | Appropriate supplementary aids.... | | | | .1507 C(3) | 300.347 (a)(3) |
| | Regular Program Participation | | X | | .1507 C(3)(b) | 300.347 (a)(3)(ii) |
| | Testing Program | X | | | .1507 C(5) & (6) | 300.347(a)(5)(i)(ii) |
| | Anticipated Frequency and Location of Special Education and Related Services | | | | .1507 C(7) | 300.347 (a)(6) |
| | - related services | X | | | .1501 L | 300.24 |
| DEC 4_4 | Change in Placement checkbox | X | | | | |
| | Modified Day checkbox | X | | | | |
| | 4 Period HS checkbox | X | | | | |
| | Continuum of Alternative Placements | X | X | X | .1510 D | 300.551 |
| | The extent the student will be removed from regular peers | | | | .1507 C(4) | 300.347(a)(4) Appendix A #1 |

FIG. 60E

| FORM | FORM NAME / FIELD | Automated Compliance | WS/FCS | NC Page Directions | STATE PROCEDURES MANUAL | FEDERAL REGISTER |
|---|---|---|---|---|---|---|
| | How and When parents will be informed of student's progress toward annual goals | X | X | | .1507 (12)(b) | 300.347(a)(7)(ii) |
| | ESY | X | | X | .1507 D | 300.309 |
| | IEP Team Signatures | X | | X | .1504 B | 300.344 |
| Transition | 14+ years = statement | X | X | | .1507 C(8) | 300.347(b)(1) |
| | 16+ years = plan | X | X | | .1507 C(9) | 300.347(b)(2) |

FIG. 60F

| FORM | FORM NAME / FIELD | Automated Compliance | WS/FCS | NC Page Directions | STATE PROCEDURES MANUAL | FEDERAL REGISTER |
|---|---|---|---|---|---|---|
| Transition page 1 | Transition Statement | | | | | |
| | Present level of Performance for Transition (preferences and interest) | | | | .1501 P | 300.29 |
| | Where and how info was obtained | | X | | | |
| | Desired Post-School Outcomes | | | | .1501 P | 300.29 |
| | Standard Course of Study | | | | .1501 P | 300.29 |
| Transition Page 2 | Transition Plan (combined w/page 1) | | | | | |
| | Instruction | | | | .1501 P | 300.29 |
| | Employment Functional Vocational Evaluation | | | | .1501 P | 300.29 |
| | Community Experiences | | | | .1501 P | 300.29 |
| | Daily Living Skills/Adult Living | | | | .1501 P | 300.29 |
| | Related Services | | X | | .1501 P | 300.29 |
| | - yes/no fields for each area | | | | | |
| | - services needed for each area | | | | .1507 C(8) | 300.347(b)(1) |
| | - agency responsible for each area | | | | .1507 C(9) | 300.347(b)(2) |
| BIP | Behavior Intervention Plan | X | | | .1507 B(2)(a) .1516 D(2) | 300.346 (c) Appendix A #38 |
| PK Dec 4_3 | For preschool children describe how the child is involved in a regular program | | | X | | 300.347(a)(1)(ii) &(a)(2)(i) |
| | Anticipated Frequency and Location of Time.... | | | | .1507 C(7) | 300.347(a)(6) |
| | Continuum of Alternative Placements | | | | .1510 F | 300.551 |
| | The extent to which the student will be removed from regular peers, if any. | | | | .1507 C(4) | 300.347(a)(4) Appendix A #1 |

FIG. 60G

| FORM | FORM NAME / FIELD | Automated Compliance | WS/FCS | NC Page Directions | STATE PROCEDURES MANUAL | FEDERAL REGISTER |
|---|---|---|---|---|---|---|
| PK DEC 4_4 | How and When parents will be informed of student's progress toward annual goals | x | | | .1507 C(12)(b) | 300.347(a)(7)(ii) |
| | ESY | x | x | x | .1507 D | 300.309 |
| | EP Team Signatures | x | | x | .1508 B | 300.344 |
| WSFCS' Progress Report | Progress Report | x | | | .1507 C(12) (b) | 300.347(a)(7)(ii) |
| RE 1 | Parent Contact Record Classroom Observation | | | x | BED .1505 D(1)(a)(i)(iii) LD .1505 D 8)(b)(i)(iii) | |
| RE 1(a) | Attendance/Grades Previous Testing Health Screening Vision/Hearing Screening | | | x | BED .1505 D(1)(b)(iv)(v)(vi) LD .1505 D(8)(b)(iv)(v)(vi) | |
| RE 1(b) | Intervention Strategies | | | x | BED .1505 D(1)(a)(i) LD .1505 D(8)(b)(ii) | |
| RE 1(c) | Referral Committee Decision Referral Committee Members | | | x | BED .1505 D(1)(b)(i)(iii) | |

FIG. 60H

| FORM | FORM NAME / FIELD | Automated Compliance | WS/FCS | NC Page Directions | STATE PROCEDURES MANUAL | FEDERAL REGISTER |
|---|---|---|---|---|---|---|
| RE 2 | Parental Notification of Screening Procedures | | | X | .1501 M | |
| RE 2(a) | Parent Consent for Individual Screening(s) | | X | | | |
| DEC 1 page 1&2 and PK DEC 1 page 1&2 | Reason for Referral Strengths Needs | X | | | .1503 | |
| | Referral Received Date | X | | X | .1505 F(3) | |
| DEC 1_3 and PK DEC 1_3 | Referral Committee Decision | | | X | | |
| DEC 2 | Consent for Evaluation/Reevaluation | | X | | .1505 A .1512 C(2) .1506 E | 300.505 |
| | Description of evaluation procedures | | | | .1505 A (1) | 300.500(b)(1)(i) |
| | Parent Absent button | X | | | | |
| DEC 3/RAT | Report for Additional Testing / Reevaluation Review | | X | | .1506 A & B | |

FIG. 60I

| FORM | FORM NAME / FIELD | Automated Compliance | WS/FCS | NC Page Directions | STATE PROCEDURES MANUAL | FEDERAL REGISTER |
|---|---|---|---|---|---|---|
| DEC 3 and PK DEC 3 | Summary of Evaluation Results And Eligibility Determination | | | | | |
| | Under Check Purpose | | | | | |
| | Initial Evaluation | | | | .1505 F(2) | 300.534 |
| | - Suspected Category | X | | | | |
| | | X | | | .1505 E | |
| | Reevaluation | X | X | | | |
| | - Suspected Category | X | X | | | |
| | Change in Category | X | | | | |
| | - Suspected Category | X | | | .1505 E | |
| | - Current Category | X | X | | | |
| | Exit SLI (Articulation) | | | | | |

FIG. 60J

| FORM | FORM NAME / FIELD | Automated Compliance | WS/FCS | NC Page Directions | STATE PROCEDURES MANUAL | FEDERAL REGISTER |
|---|---|---|---|---|---|---|
| | Related Service | X | | | | |
| | Additional Assessment | X | X | | | |
| | Exit PT, OT, Artic. | X | | | | |
| | Eligibility Statement | X | | | | 300.535 |
| DEC 3 (a) | Eligibility Report/Specific Learning Disabilities | | | | .1505 D(8)(d)(e) | 300.543 |
| | Ability Achievement Discrepancy | X | | | .1505 D(8)(c)(ii) | |
| | Information Processing | | | | .1505 D(8)(e)(iii)a | 300.543 (a)(4) |
| | Substantial Learning Difficulties | | | | .1505 D(8)(e)(iii)c | 300.543 (a)(6) |
| | Relevant Medical Findings | | | | .1505 D(8)(e)(iii)b | 300.543 (a)(5) |
| | Effects of environmental, cultural, or economic disadvantage. | | | | .1505 D(8)(e)(iii)e | 300.543 (a)(7) |
| | Relevant Behaviors noted during observation | | | X | .1505 D(8)(e)(iii)a | 300.543 (a)(3) |
| | Does the student have a learning disability? | | | | .1505 D(8)(e)(iii)f | 300.543 (a)(1) |

FIG. 60K

| FORM | FORM NAME / FIELD | Automated Compliance | WS/FCS | NC Page Directions | STATE PROCEDURES MANUAL | FEDERAL REGISTER |
|---|---|---|---|---|---|---|
| DEC 3 (b) | Eligibility Report/Behaviorally Emotionally Disabled | | | | | |
| | A student must show evidence of one or more of the following characteristics of the Definition of BED.... | | | | .1501 A(2) | 300.7(c)(4) |
| | A student must meet all 5 criteria listed below in order to.... | | | | .1505 D(1)(d) | |
| DEC 3 (c) | Eligibility Report/Other Health Impaired | | | | .1501 A(8) | 300.7(c)(9) |
| | Strength/Vitality/Alertness | | | | .1501 A(8) | 300.7(c)(9) |
| | Behaviors adversely affecting educational performance | | | | .1501 A(8) | 300.7(c)(9)(ii) |
| DEC 5 | Prior Written Notice | | | | .1512 D | 300.503 |
| | Description of the action proposed | | | | .1512 D (1) (a) | 300.503 (b)(1) |
| | Explanation of the action proposed | | | | .1512 D (1)(b) | 300.503 (b)(2) |
| | Options rejected | | | | .1512 D (1)(c) | 300.503 (b)(3) |
| | Description of evaluations and other relevant factors | | | | .1512 D (1)(d)(e) | 300.503 (b)(4)&(5) |
| | | | | | .1512 D (1)(f) | 300.503 (b)(6) |
| | Sources for parents to contact | | | | .1512 D (1)(f) | 300.503 (b)(7) |
| DEC 6 | Consent For Initial Placement For Special Education Services | | | | .1512 C(2) | 300.505 |
| | Parent Absent button | X | | | | |
| DEC 7 | Reevaluation Determination Form | | | | .1506 | 300.533 |
| | Review of existing evaluation data | | | | .1506 A | 300.533 (a)(1) |
| | Summary of evaluations provided by parent | | | | .1506 A(1) | 300.533 (a)(1)(i) |
| | Summary of classroom assessments and observations | | | | .1506 A(2) | 300.533 (a)(1)(ii) |
| | Summary of observations by teachers and service providers | | | | .1506 A(3) | 300.533 (a)(1)(iii) |
| | Is additional data needed to determine: | | | | .1506 | 300.533 (a)(2)(i) |
| | - If the student continues to have a disability | | | | | |

FIG. 60L

| FORM | FORM NAME / FIELD | Automated Compliance | WS/FCS | NC Page Directions | STATE PROCEDURES MANUAL | FEDERAL REGISTER |
|---|---|---|---|---|---|---|
| | - Present levels of performance and needs | | | | .1506 | 300.533 (a)(2)(ii) |
| | - Continued need for special education | | | | .1506 C | 300.533 (a)(2)(iii) |
| | - additions or modifications to special education | | | | .1506 | 300.533 (a)(2)(iv) |
| | Determination of need for additional assessment | | | | .1506 D | 300.533(c)(d) |
| | Parent Request for additional assessment | | | | .1506 E | 300.533(d)(2) |
| FBA | Functional Behavior Assessment | | | | .1516 D(2) | 300.520(b)(1) |
| MDW | Manifestation Determination Worksheet | | | | .1516 F & G | 300.523<br>300.524 |
| | Questions for Discussion | | | | | |
| | - IEP was appropriate | | | | .1516 F(4)(b)(i) | 300.523 (c)(2)(i) |
| | - Placement was appropriate | | | | .1516 F(4)(b)(i) | 300.523 (c)(2)(i) |
| | - Supplemental aids and related services were provided | | | | .1516 F(4)(b)(i) | 300.523 (c)(2)(i) |
| | - Appropriate BIP was implemented | | | | .1516 F(4)(b)(i) | 300.523 (c)(2)(i) |
| | - Student's disability did not impair the ability to understand consequences of the behavior | | | | .1516 F(4)(b)(ii) | 300.523 (c)(2)(ii) |
| | - Student's disability did not impair the ability to control the behavior | | | | .1516 F(4)(b)(iii) | 300.523 (c) (2)(iii) |
| | - Misconduct is Not a Manifestation | | | | .1516 G | 300.524 (a) |
| | - Misconduct is a Manifestation | | | | .1516 F | 300.523 (d) |

METHOD AND SYSTEM FOR COMPLIANCE FORMS AND COMPLIANCE FORMS USER INTERFACE

This application claims priority to applicants' U.S. Provisional Application Ser. No. 60/406,046 titled "METHOD AND SYSTEM FOR EZ COMPLIANCE FORMS" filed Aug. 27, 2002, and to applicants' U.S. Provisional Patent Application Ser. No. 60/477,346 titled "MANAGEMENT TRACKING AND FORMS SYSTEM AND METHOD OF USE" filed Jun. 11, 2003. The entirety of each of these patent applications is incorporated herein by reference.

BACKGROUND OF THE INVENTION

1. Field of the Invention

The present invention relates to a method and system for providing automated forms for compliance and other purposes, as well as a user interface (UI) relating thereto, and in particular to a method and system for providing user-friendly automated forms, and completion assistance therefore, via a network, for use with compliance with legal or other requirements, such as requirements under the Individuals with Disabilities Education Act (IDEA), and for providing a UI allowing simple development of templates and corresponding code and code documentation for such forms.

2. Background of the Technology

There is an unmet need in the art for methods and systems for tracking information, supporting compliance with regulatory and other requirements, expertly assisting with completing forms, developing code and code documentation therefor, and otherwise providing assistance in meeting requirements for the complex and sophisticated management schemes that institutions need to use in order to effectively and efficiently manage mandated individualized instructional paths, disciplinary/rehabilitative paths, or social intervention paths for hundreds if not thousands of students, juveniles, etc., simultaneously, all with different start and end dates, and different internal individualized management requirements.

For example, looking at mandated individualized instructional paths, it is not uncommon to find that a U.S. public K-12 school district may need to manage 30% or more of its student population under individualized instructional programs, such as Special Education, 504, English Second Language, Early Intervention/Student Support Team, Gifted and Talented, or At Risk of Failing High Stakes Exit Exams. Each of these programs includes requirements involving events or meetings (e.g., Referrals, or Annual Meetings or Reevaluation Meetings), associated timelines, linked paperwork, and mandated outcomes. There are two key challenges for school districts in managing these programs—one is meeting the many mandated Federal and State timelines that must be met for each child, and the second challenge is filling out in a compliant manner all of the paperwork mandated for each child. On the timeline front, successful, consistent, legally compliant execution of these individualized programs by a school district requires the tight coordination of dozens of action steps across multiple team members for each affected child within relatively short time periods. Failure to effectively manage, what in many school districts may be thousands of individualized instructional paths occurring simultaneously, significantly diminishes the education effectiveness of these interventions, exposes the district to serious legal liability for violating Federal and State law, risks loss of full Federal and State funding, and drives up a districts' administrative overhead.

On the second front, managing the paperwork creates a different set of issues. In these programs, such as Special Education, it is not just simple paperwork that district staff are spending their time filling out, but rather it is paperwork with embedded legal procedural requirements. These requirements include compliance rules, such as the following: district staff check one box which immediately mandates the filling out of additional pages; when a child hits a certain birthday in the coming year, other paperwork is mandated for a transition plan for the child. Other built-in rules might be checking to see if parents are given adequate advance notice of meetings, or checking to see if a child needs a behavioral intervention plan. In Special Education, there is governing Federal law, and then each state has implemented its own interpretation of that Federal law at the state level. So every school district in this country is operating under a state specific blend of Federal and state law. It is not uncommon that there may be 200 or more compliance rules covering a district's paperwork. Many of these rules are quite sophisticated, and frequently less than 5% of the district's staff fully and accurately understand all of the relevant rules. This lack of understanding is understandable, as these staff were typically hired to teach, not to be paralegals. In addition, the situation is exacerbated by high staff turnover in districts, lack of fully certified Special Education teachers, and inadequate professional training by school districts of their own staff.

School staff incorrectly observing these compliance rules create huge legal liabilities for their districts. As one Special Educator director has observed "Parents and their attorneys are leveraging our small failures in paperwork into substantial settlements against us". Nationally, school districts are paying out settlements ranging from the tens of thousands to hundreds of thousands of dollars for failures related to filling out the paperwork noncompliantly. Districts have responded to these failures in many cases by adding more administrators, and by hiring staff known as "compliance officers," who basically read every set of Special Education paperwork generated in a district, manually noting the most serious compliance errors, and who then return the paperwork to the Individualized Education Plan (IEP) teams to rehold meeting that have substantial compliance problems in their paperwork. This is an incredibly costly approach for school districts to take.

All of these individualized instructional paths (or behavioral/rehabilitative/social intervention paths such as managing juvenile services) point to the unmet need for a software based method and system for tracking and supporting compliance with a management scheme around events, outcomes, timelines, and associated paperwork, including assisting with completion of forms. The appropriate needed database structure, and needed forms for production therewith, could simplistically be said to track the "Who needs to do what? When do they need to do it by? Did they do it? When did they do it? And if they were late, why were they late?" At the teacher or staff level, such a database structure and forms assistant needs to support staff at any point in time in knowing explicitly what they need to do, in determining when do they need to do it by, and assisting them with timely completing any forms relating thereto. At the administrator level, such a database and forms structure needs to let administrators manage to district standards for performance, allowing transparent accountability of district wide performance, regional performance, building or site performance, and even down to the individual provider performance.

SUMMARY OF THE INVENTION

The present invention provides a database structure and platform that embodies an effective method and system for assisting with completing forms with embedded legal, procedural rules, and otherwise meeting management requirements, such as institutionally-provided and/or legally mandated requirements for individualized instruction, behavioral intervention or rehabilitation, or social work or judicial intervention and/or tracking. The present invention supports staff in easily meeting any such embedded compliance rules, even without conscious knowledge on their part of what all the possible rules might be, while simultaneously significantly cutting affected staff's paperwork burden. In addition, the present invention includes a code authoring tool, referred to interchangeably herein as a "workbench," for assisting users with developing code in an automated fashion for use with the database structure and platform.

One embodiment of the present invention provides a method and system that include a number of functionally and interactively integrated components for assistance with meeting requirements for entities (e.g., individuals) within organizations (e.g., institutions) to which the requirements apply, also referred to interchangeably herein as "management entities" (and further interchangeably referred to herein as "clients"), such as school districts, counties, or states seeking to ensure compliance with IDEA, or with English Second Language, or with 504, or with other mandated programs for special populations within a school district or state. In one embodiment, the method and system include the capability to access one or more data repositories (e.g., databases) associated with the components, which allow entry and interrelation of data among the components, and identification and completion of forms relating thereto. In one embodiment, the components are directed to activities relating to compliance, tracking, or other functions. In one embodiment relating to implementation for compliance with the IDEA, the components include the following: 1) compensatory/violations; 2) school and codes information; 3) event/meeting timelines and outcomes, planning, and other information; 4) Individual Education Plan (IEP) tracking and information maintenance; 5) discipline information; and 6) student master information.

One embodiment of the present invention further provides a method and system for rapidly tailoring or customizing compliance requirements for all of the associated paperwork for a process such as Special Education, and other functions for each management entity (i.e., a code authoring tool). The present invention provides a database structure and platform for rapidly configuring/customizing the database structure to mirror the school district's or county's or state's agreed upon business process surrounding meeting/events, timelines, outcomes, and associated paperwork. This approach cuts staff needed by a client to achieve full paperwork legal and procedural compliance, and in fact allows a client to achieve a higher level of compliance than is possible with manual methods, while simultaneously cutting staff time spent on filling out paperwork, thus freeing staff up to focus on their original job function (such as teaching), which in turn, for example, helps to increase staff morale by allowing staff to refocus on their core mission.

For example, school districts or other management entities have traditionally tried to manage these special populations with their thousands of individualized instructional paths by throwing more staff at the problem, and by using home grown solutions, such as spreadsheets or tickler files, along with paper forms. No national solution was emerging, because although there was Federal Law (IDEA), each state had a different interpretation of that law, as permitted by state's rights, and many districts had yet another level of interpretation, as permitted under local autonomy. As a result, no "one size fits all", hard coded database and forms solution was possible, because timelines, events, outcomes, forms, and even terminology were each different from district to district all over the U.S. Further complicating the picture is that the rules and timelines are changing constantly all over the country, due to Federal, state, or local law or procedural changes. For example, Federal changes to the IDEA law this year will take several years to trickle down to the district level as they pass through the different layers of government. This has a tremendous impact on the necessary database structure to adequately manage these special populations, because it must allow the preservation of the historical data and the governing rules, while simultaneously allowing for correct processing under new law. The present invention solves these challenges, as well as others, and allows a national solution, by allowing for rapid configuration/customization of the invention's data structure and forms to mirror a district's business process. The present embodiment also allows the rules governing a special population to change across time, while preserving the historical data/process.

Yet another addressed complication for the necessary database and forms structure in an example implementation for educational related requirements compliance is that an individual student, with the present invention, may be managed under more than one path simultaneously. For example, a student going through the Special Education process may also simultaneously be going through the English Second language instructional path, or though a behavioral intervention process. The database or other repository (including forms) design of the present invention accommodates multiple processes, and allows individual students to be included in more than one work flow simultaneously.

The present invention also includes the database structures or other repository to accommodate transparent accountability so that, among other things, the management entity can view data entity wide, or drill down to regional views of data, or to site views, or to individual provider views, in order to evaluate compliance with entity management standards.

A second aspect of the present invention allows a business analyst to accomplish tasks that would otherwise only be able to be performed by, for example, a programmer. One exemplary embodiment of the present invention includes providing effective "translation" of coding, such as Java script code, into English language using, for example, drop-down menus that allow point and click selection. Users are thus able to build business logic, and this feature of the present invention translates the English description into appropriate code, such as Java script code. The present invention also concatenates the produced logic into documentation that is provided at the field level and also to a spreadsheet, allowing tracking of all activity performed in a document.

Thus, the present invention allows a user who does not have programming skills to develop a form using simple natural language input in conjunction with a step by step interface. All the code needed is automatically generated and documented for the user. The forms begin to work immediately as a stand alone application container, and the user is able to view instantly the results of the input, and adjust the forms as needed. The present invention thus allows an analyst to become a real time programmer, creating a form and the particular specifications of an implementation at the same time.

The present invention also allows modification on the fly by users of the interface created. The present invention supports such features as Multi-version Tracking (e.g., if a user makes changes to the form input rules, all open versions of that form may be set to "non-compliant" status to ensure users revisit their forms and make them compliant with the adjusted rule).

The user interface for creating code, in one embodiment of the present invention, involves the superimposition of a second graphical user interface (GUI) over the general forms GUI to be used by users completing forms. Thus, for example, the user interface for creating codes includes a number of popup or pulldown menus, or other selectable options, that are superimposed on an existing template of a forms GUI.

Additional advantages and novel features of the invention will be set forth in part in the description that follows, and in part will become more apparent to those skilled in the art upon examination of the following or upon learning by practice of the invention.

BRIEF DESCRIPTION OF THE FIGURES

In the drawings:

FIGS. 5-7 are sample GUI screens containing example indicators (color shading) reflecting various levels of requirements for information, in accordance with an embodiment of the present invention;

FIGS. 8-43 illustrate GUI screens for a first exemplary implementation of a system for providing automated forms for compliance and other purposes, in accordance with an embodiment of the present invention;

FIGS. 45-59 present a various screens of an exemplary user interface for developing code for use for forms with regard to implementation under the IDEA, in accordance with an embodiment of the present invention; and FIGS. 60A-60L show an example chart of various requirements and other features incorporated into an exemplary implementation of the present invention.

DETAILED DESCRIPTION

Figure 1:
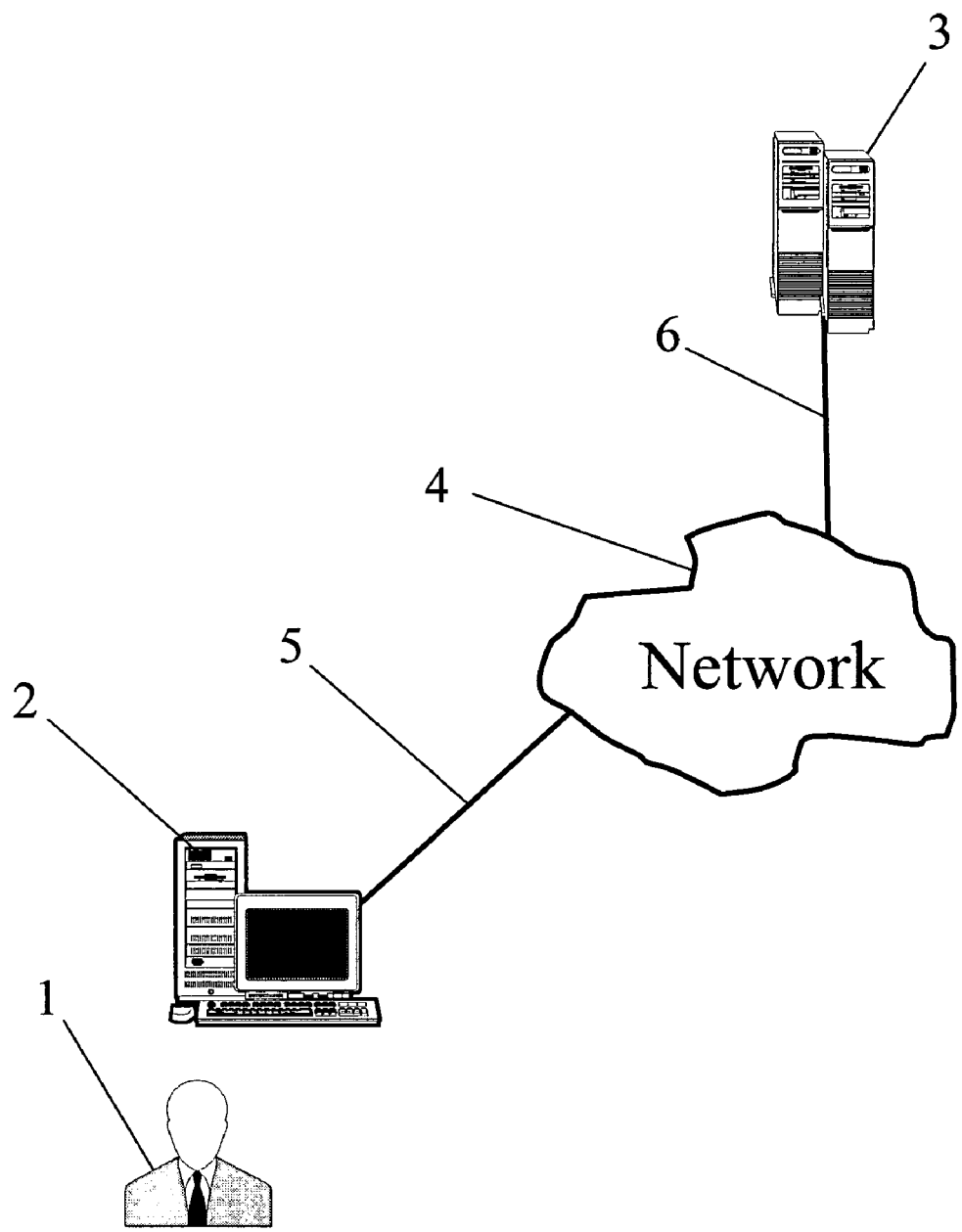
FIG. 1 presents an exemplary system diagram of various hardware components and other features in accordance with an embodiment of the present invention.

The present invention includes a method and system for providing interactive and automated forms for use by users in complying with requirements or otherwise performing functions for which automated forms are useful, such as in relation to meeting requirements under the IDEA, and a user interface for a code authoring tool to support development, customization, and revision of such forms.

Various features of this application are disclosed in or interact with one or more features of applicant's following copending provisional and utility patent applications: U.S. patent application Ser. No. 10/406,246 filed Apr. 4, 2003, titled METHOD AND SYSTEM FOR ONLINE ANALYTICAL PROCESSING FOR EDUCATIONAL AND OTHER OUTCOMES; U.S. Patent Application Ser. No. 60/422,869 filed Nov. 1, 2002, titled ENCOUNTER TRACKER AND SERVICE GAP ANALYSIS SYSTEM AND METHOD OF USE; and U.S. patent application Ser. No. 10/455,804 filed Jun. 6, 2003, titled MANAGEMENT TRACKING SYSTEM AND METHOD OF USE. The entirety of each of these patent applications is incorporated herein by reference.

Interactive Forms Feature

In an embodiment of the present invention, the forms are presented via an interactive and automated viewer that allows the user to view the forms identically or very similarly to their printed format. Among other advantages, this approach greatly eases user orientation to the present invention from non-automated form processing.

In one representative application, the present invention is useful in assisting users with filling out, in full legal compliance, reoccurring sets of paperwork associated with their job that have embedded legal requirements, such as the paperwork mandated under Federal and state laws for children with disabilities, known as the IDEA. For example, a typical school district might have 50+ pages of forms for their Special Education process, and those forms might have in excess of 150 embedded legal requirements associated with them. Training school staff to remember all of these embedded requirements and to apply them correctly is often difficult, particularly given high staff turnover and the lack of certification for many teachers. In the application of this embodiment, the present invention builds "artificial intelligence" into the online paperwork in order to automatically support school staff in applying correctly and consistently all of the embedded procedural requirements in the paperwork. As a result, it is possible for procedural violations in the paperwork to be virtually eliminated by use of the present invention. In addition to this example, the present invention has applicability for many other activities for which reoccurring sets of paperwork are required that have embedded legal requirements associated therewith.

In an embodiment of the present invention, data, including preloaded data and data that is stored from user and/or other input, is accessible via a network, such as the Internet, using a client terminal, such as a personal computer (PC) coupled to the network.

Example user activity in accordance with embodiments of the present invention will now be described in greater detail.

In an embodiment of the present invention, prior to access of data and use of forms, the user must log into the system (e.g., provide a recognized user name and one or more passwords) or otherwise meet security requirements. The user then selects record identifier information (e.g., selects a student participating in IDEA requirements) or inputs a search criterion for a record, either solely within the system to create forms or via links with other systems relating to other requirements applicable to the entities and/or organization. In addition, the user may initiate a new record. The user then selects a record (or begins work on the new record), for which, for example, new input or revision is to be made.

As part of the input or revision, the user typically selects activities to be performed (e.g., selecting a meeting or other event). Appropriate forms for the selected activity are automatically determined and presented to the user (e.g., via a list), along with status indication for the various items. For example, a number of forms may be required for a planned meeting with a student to be performed in conjunction with providing particular services for the student. The name and the status of each form are provided, such as indication as to whether the form is completed and whether the form is required. In one embodiment of the present invention, a list of forms and status information are provided in a tabular format.

Embodiments of the present invention include many features or links to other systems for assisting the user with form selection or creation. For example, in one embodiment, a list of possible meetings or events is presented, from which the user may choose, and the user is automatically presented with a list of the appropriate forms (e.g., required and optional forms) to be completed. The user then, for example, selects a form for input or revision following, for example, automatic population of items for information already contained in the system.

In embodiments of the present invention, the user is able to select to have a compliance check performed on forms in the system to determine the status of the forms. The system evaluates information completed and missing or incomplete for each form, and forms for which outstanding items remain to be completed fail the compliance check. For forms passing the compliance check, the user is provided with the option to lock the form (e.g., release the form and place it in read-only mode) to prevent further changes to information in completed and compliant forms. In embodiments of the present invention, all meetings are automatically released (locked) after a certain amount of time has passed (e.g., on the fourth day after the meeting) or after certain events occur. In embodiments of the present invention, the user also has the option to unlock forms under certain circumstances, such as to add details for items previously not completed.

In embodiments of the present invention, color shading or other indicators are provided that reflect various levels of importance (priority) of the items or other information relating thereto. For example, one embodiment of the present invention includes four levels of compliance checking: field level, section level, page level and document set. The first two levels have an immediate impact on the color changes in the page. The third level runs every time a page is saved, and also provides the capability to create color changes.

The various features of these levels, in accordance with this embodiment, further include the following:

Field Level. Each field has a default status when the page is opened. The status is indicated by the color. In one embodiment, green fields are pre-filled and read only; purple (or salmon) fields are required; and yellow fields are optional. Once a purple field has been filled, the focus moves to another field (e.g., tab, mouse click). Entry is then validated. For example, a particular entry may be required to meet the definition of a date or a number. In some embodiments, entry is optionally checked for compliance. In other embodiments, once a validation rule is in place for a particular object, a compliance check automatically occurs. For example, verification can be made that a meeting date cannot be earlier than notice date. If information entered is valid and compliant, the field color changes to yellow.

Any rules that need to be applied based on the entry are applied. The entry of information in some fields, can, for example, cause other fields to become required, optional, or read only, based on the value entered. For example, selecting the checkbox labeled "Other" causes a text box for holding a description of the "Other" thing to change so as to have an appropriate indication (e.g., the text box becomes purple if input is required). In one embodiment of the present invention, each field is reevaluated every time the focus moves from field to field. In other embodiments, when an event occurs for which there is a validation rule (e.g., completion of a document), every field related to that event is reevaluated.

Section Level. There are cases in which entire sections, such as a group of check boxes, appear, for example, in purple (e.g., if input is required) when the page is opened. However, there may be logic applied to the entire section that can affect color changes. For example, in some cases, only one checkbox can be checked. In other cases, X of N check boxes must be checked (e.g., two of five must be selected). In this case, once one box is selected, the remaining checkboxes in the section remain purple. As another example, a requirement may be that at least one box be checked, but many can be selected. In this case, after one is selected, the rest of the section becomes optional (e.g., changes to yellow color). In one embodiment of the present invention, these rules are applied as the focus moves from field to field. In other embodiments, the rules are applied as the user triggers specific events, such as selecting or deselecting a checkbox, or by committing a value to a text field.

Page Level. On every save attempt, the user is prompted if the page is not yet compliant. The user is provided with the choice of saving the page noncompliant or of completing the form. If the user elects to complete the form, all required fields with no valid value change color (e.g., salmon). All non-required fields and required fields with a valid value change color to white.

Following completion of all work in the system, the user logs out.

Example embodiments will now be described in conjunction with the following figures.

As shown in FIG. 1, in an embodiment of the present invention, data for use in the system is, for example, obtained by a user 1 via a terminal 2, such as a personal computer (PC), minicomputer, mainframe computer, microcomputer, telephonic device, or wireless device, such as a hand-held wireless device coupled to a server 3, such as a PC, minicomputer, mainframe computer, microcomputer, or other device having a processor and a repository for data or connection to a repository for data, via a network 4, such as the Internet or an intranet, and couplings 5, 6. The couplings 5, 6 include, for example, wired, wireless, or fiberoptic links. In another embodiment, the method and system of the present invention operate in a stand-alone environment, such as on a single terminal.

In one embodiment, data is collected for formatting and use with a forms based system that displays views of forms presented via an interactive and automated viewer that allows the user to view the forms identically or very similarly to their printed format.

Figure 2:
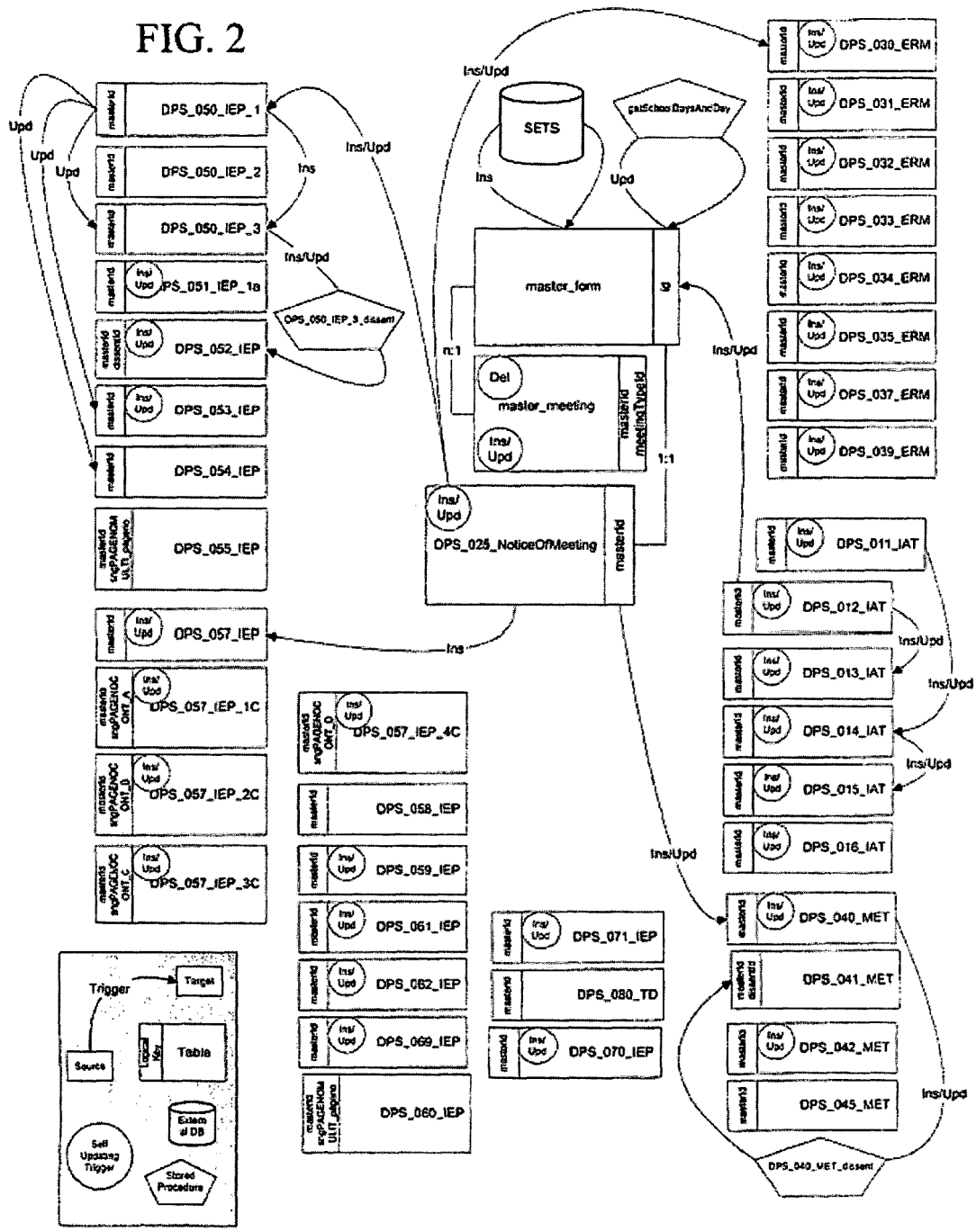
FIG. 2 is a block diagram of various system components, in accordance with an embodiment of the present invention.

FIG. 2 is a block diagram of various system components, in accordance with an embodiment of the present invention.

Figure 3:
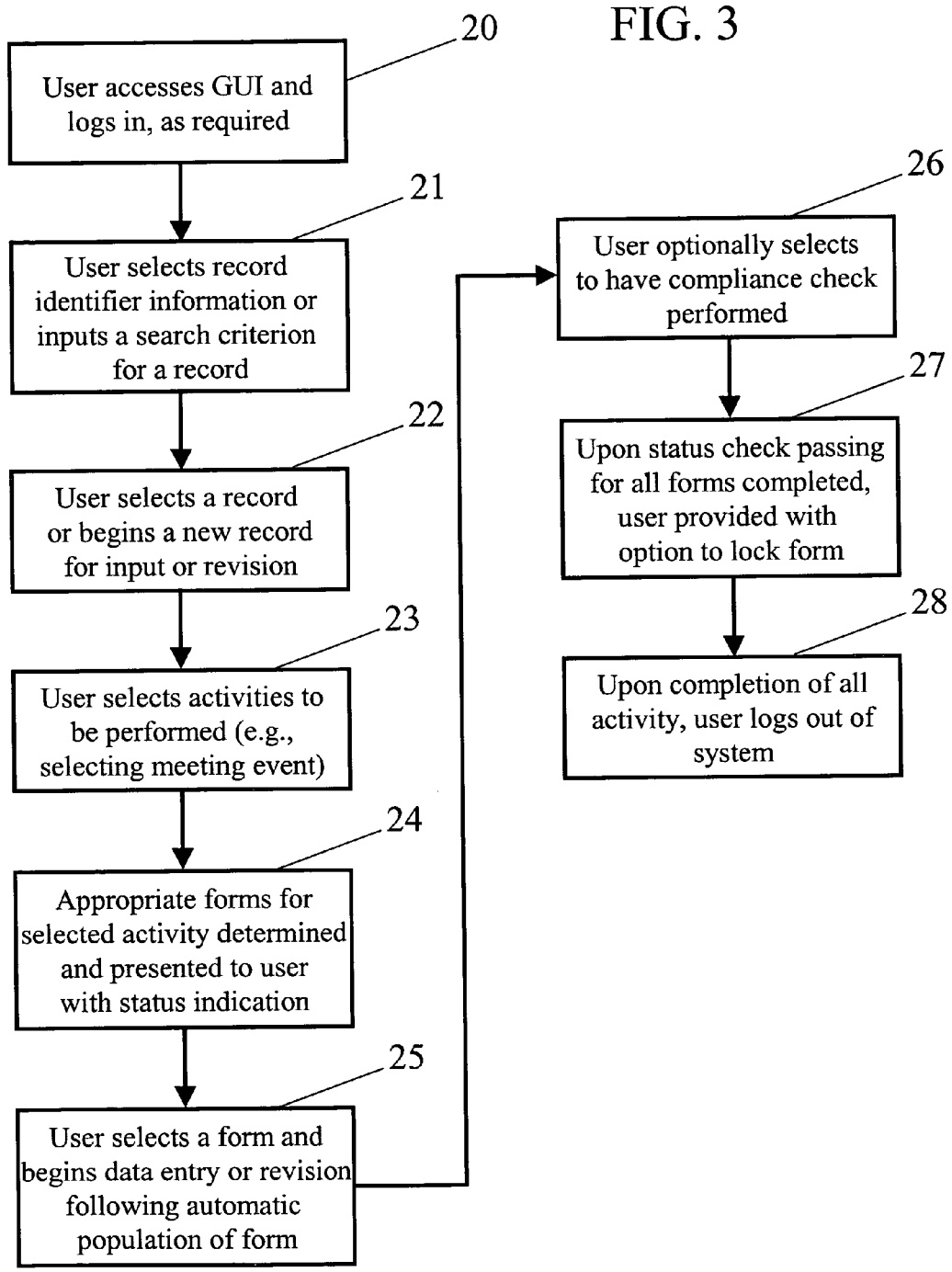
FIG. 3 presents an example flow diagram of functions performed in accordance with an embodiment of the present invention.

FIG. 3 presents an example flow diagram of functions performed in accordance with an embodiment of the present invention. As shown in FIG. 3, initially, a user accesses the GUI, including, for example, logging in or otherwise passing a security check 20. The user selects record identifier information or otherwise identifies a record, such as by inputting search criteria 21, and the user then selects from the search results or begins a new record (e.g., form) for input or revision 22.

Once the record is accessed, the user selects activities to be performed (e.g., selecting a meeting event for which to provide information) 23. Appropriate documents (e.g., forms) for the selected activity are identified and presented to the user with status indication (e.g., the user identifies a form type for access) 24. The user then selects the document to access and begins data entry or revision 25. The document may be automatically populated with data from an accessed repository, such as a repository for data for the present invention or maintained in other systems operating in conjunction with the present invention.

Once the document is revised, the user optionally selects to have a compliance check (also referred to as "status check") performed on the document 26. Upon passing the compliance check, the user is provided with the option to "lock" the form, thereby preventing further revision 27. Upon completion of all activity, the user logs out or otherwise exits the system 28.

Figure 4:
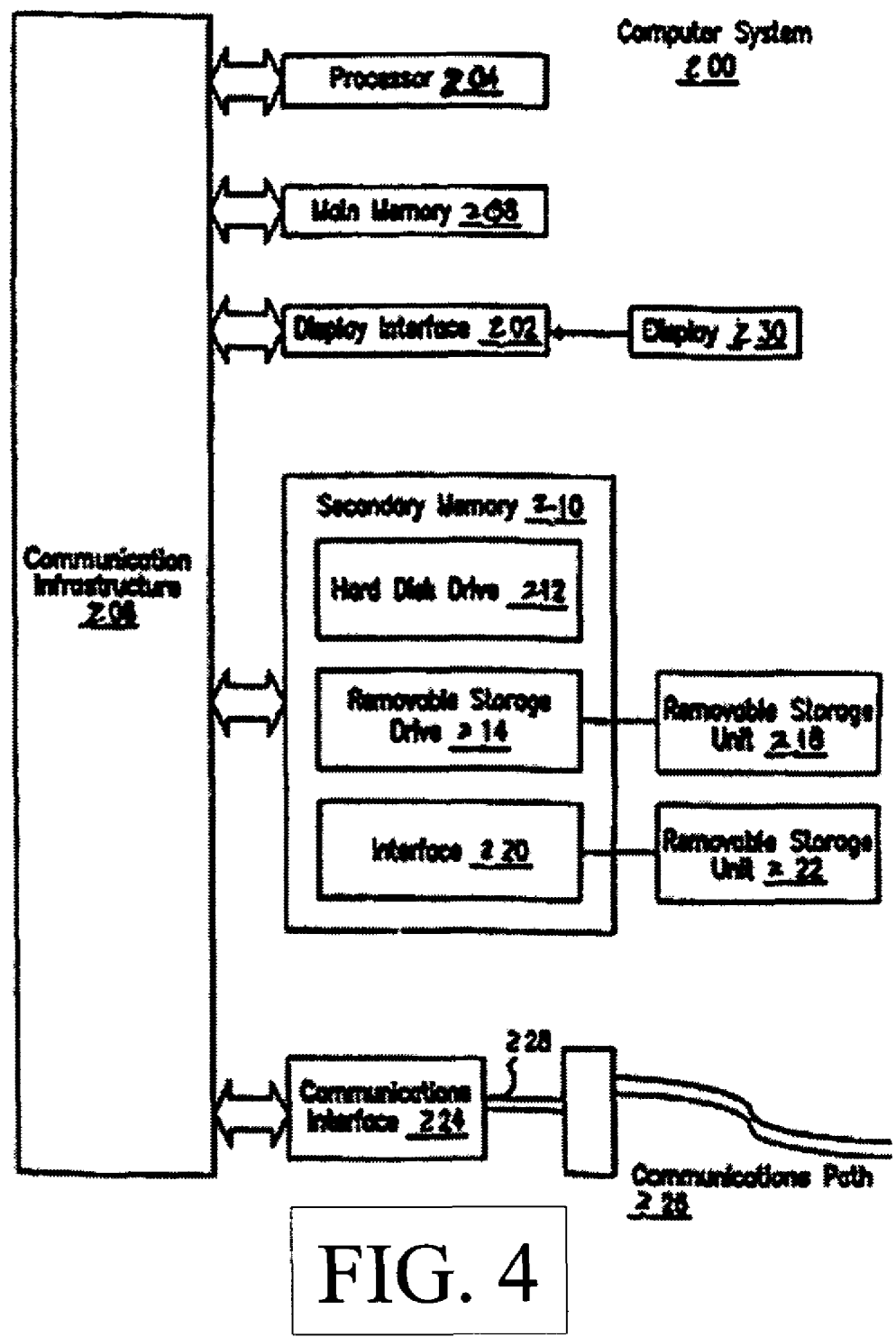
FIG. 4 shows various features of an example computer system for use in conjunction with embodiments of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 4.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 5:
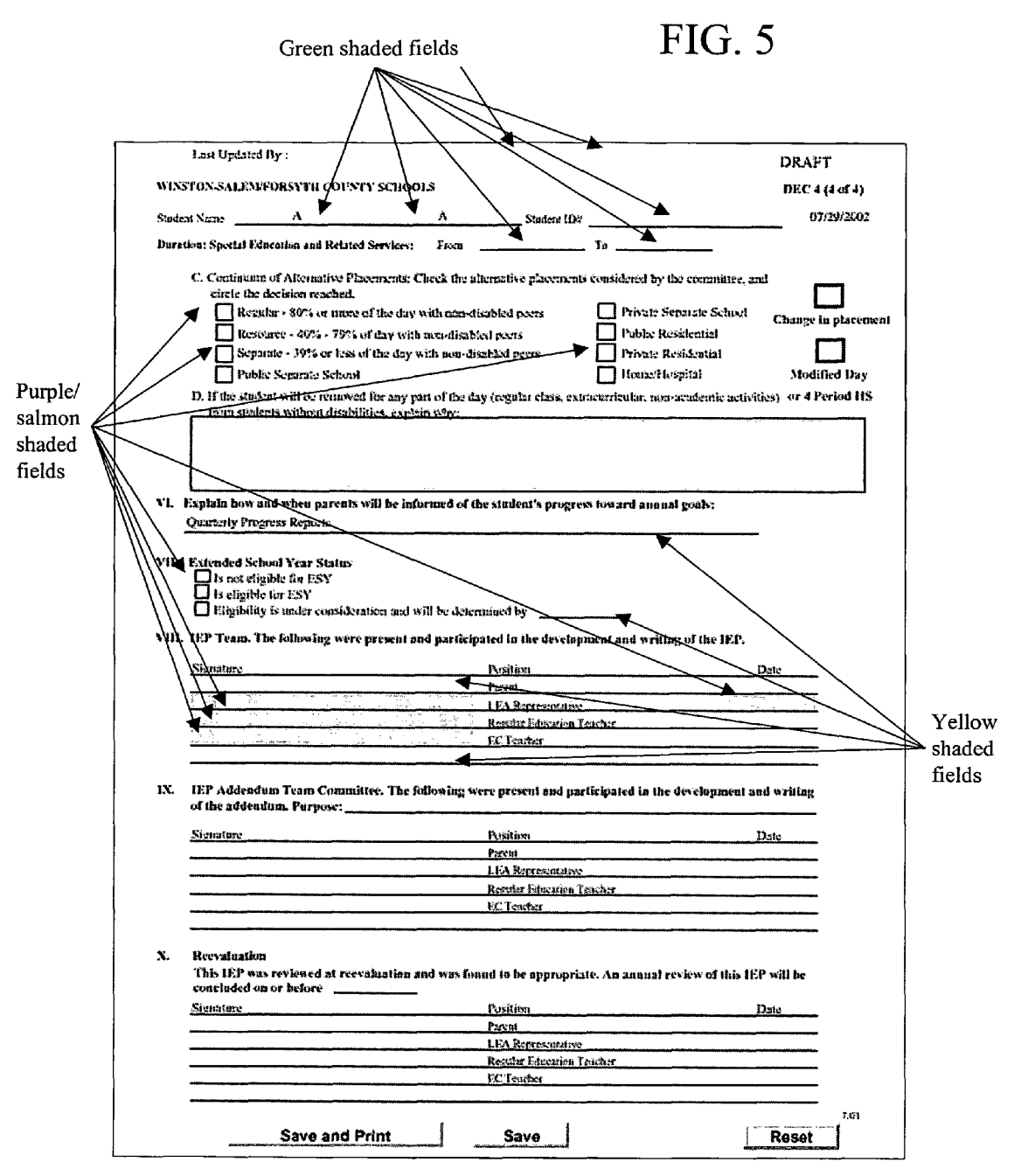
Figure 6:
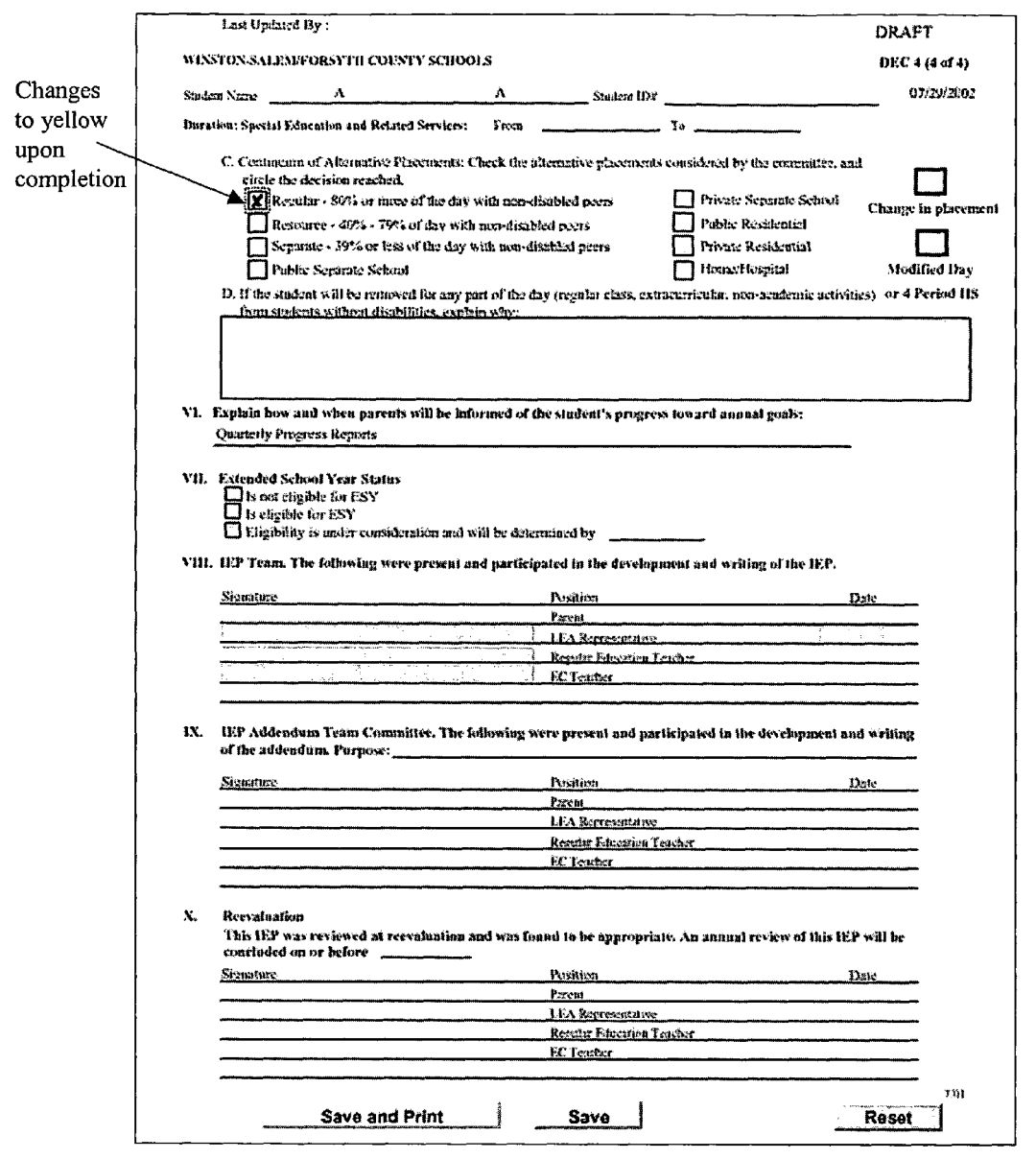
Figure 7:
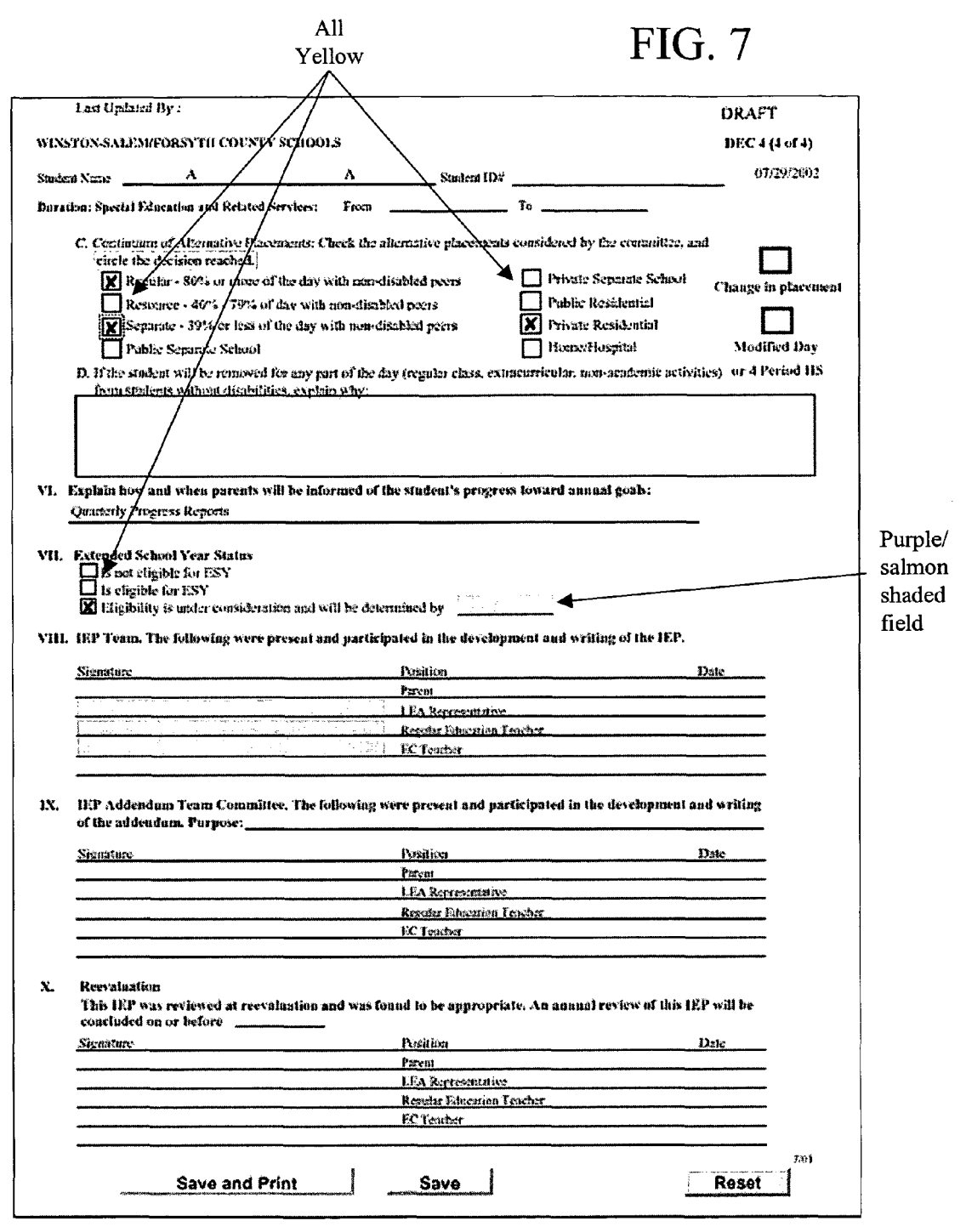

FIGS. 5-7 present sample GUI screens containing example indicators (color shading) reflecting various levels of requirement for information, in accordance with an embodiment of the present invention. As shown in the example of FIG. 5, when a user opens a form, prefilled information is displayed with a green shading, as read-only fields, as indicated. Required fields are displayed in purple or salmon shading, and optional fields are shown in yellow shading. As shown in the example of FIG. 6, when the user selects one of the required checkboxes in section C of the sample form, the shading of the selected checkbox changes to yellow. The remainder of the required fields remain purple in purple shading. As shown in FIG. 7, as the user continues to select checkboxes in Section C, the checkboxes change to yellow shading. Once three of the checkboxes have been selected, in this example, the entire section is satisfied, and all eight checkboxes change to yellow shading. As also shown in FIG. 7, once the user selects one of the checkboxes in Section VII of the example form, that section is satisfied, and all three of the checkboxes change to yellow shading. The date field associated with that checkbox changes to purple shading, to indicate that this field now requires an input.

FIGS. 8-41 illustrate a first implementation of a system for providing automated forms for compliance and other purposes. The system of FIGS. 8-41 has been tailored to the needs of a particular management entity for school district compliance with the IDEA. This exemplary system can be created, for example, using the workbench or code authoring tool to customize the system to comply with the needs of the management entity, described further below.

FIGS. 8-43 show only one example of a system in accordance with the present invention. It will be appreciated that this example is merely illustrative of the invention. Many variations and modifications will be apparent to those skilled in the art.

Figure 8:
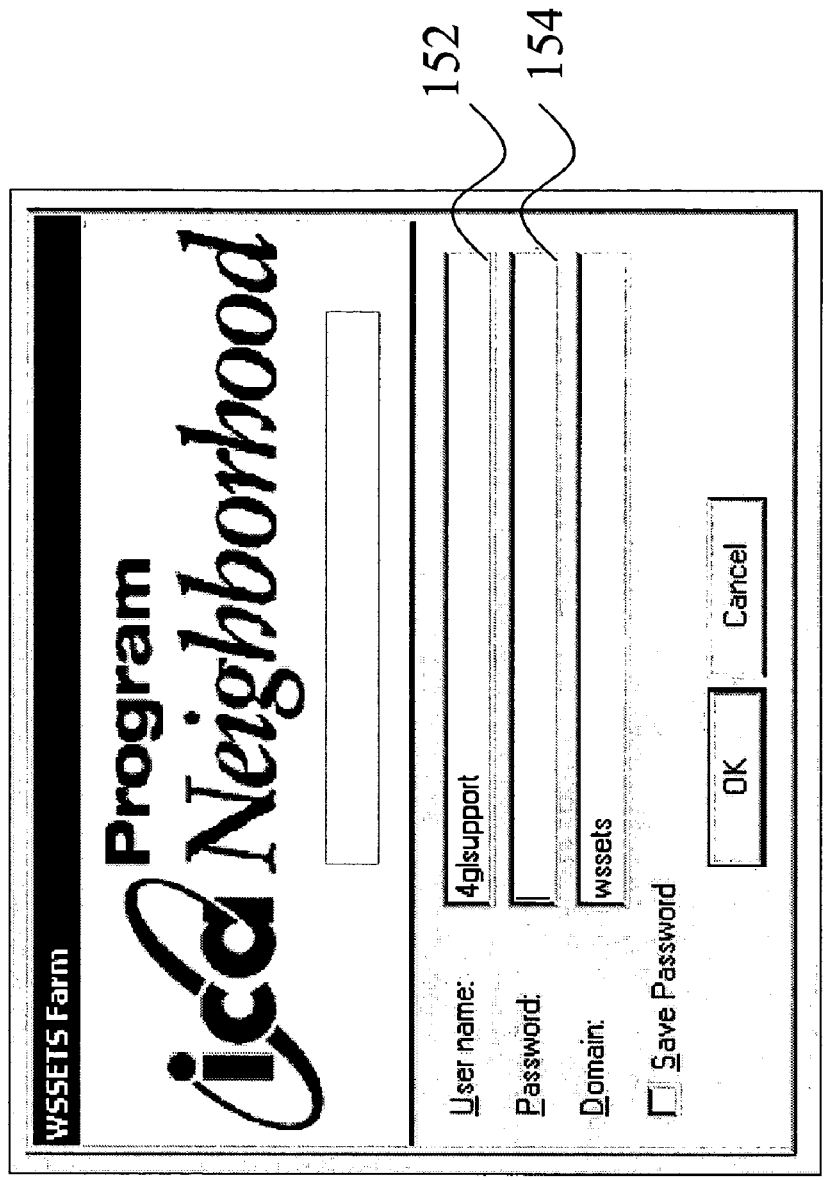

FIG. 8 presents a sample GUI screen 150 for a first login, in accordance with an embodiment of the present invention. A user logs in to the system by entering a first user name into the first user name field 152 and a first password into the first password field 154 of the GUI screen 150.

Figure 9:
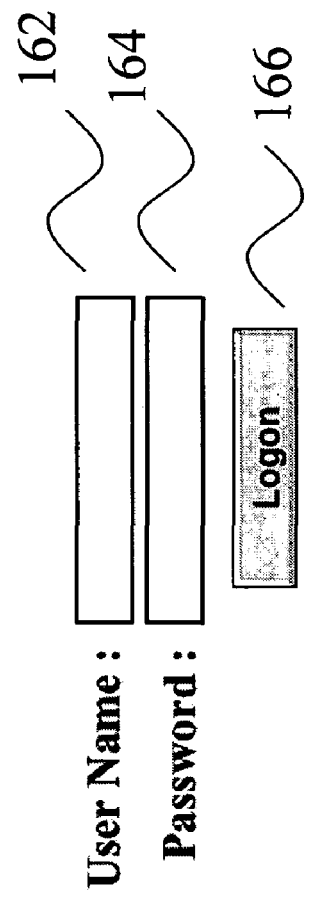

FIG. 9 presents a sample GUI screen 150 for a second login, in accordance with an embodiment of the present invention. A user logs in to the system by entering a second user name into the user name field 162 and a second password into the password field 164 of the GUI screen 160, and by selecting the logon button 166. The second user name entered into the second user name field 162 may be the same as or may be distinct from the first user name entered into the first user name field 152. The second password entered into the second password field 164 may be the same as or may be distinct from the first password entered into the first password field 154.

FIG. 10 illustrates a sample GUI screen 170 for student search in accordance with an embodiment of the present invention. A user can reach GUI screen 170 by selecting the "Select new student" link 172 from another GUI screen in the system. GUI screen 170 allows a user to search for a particular student by entering search criteria in various fields.

Figure 11:
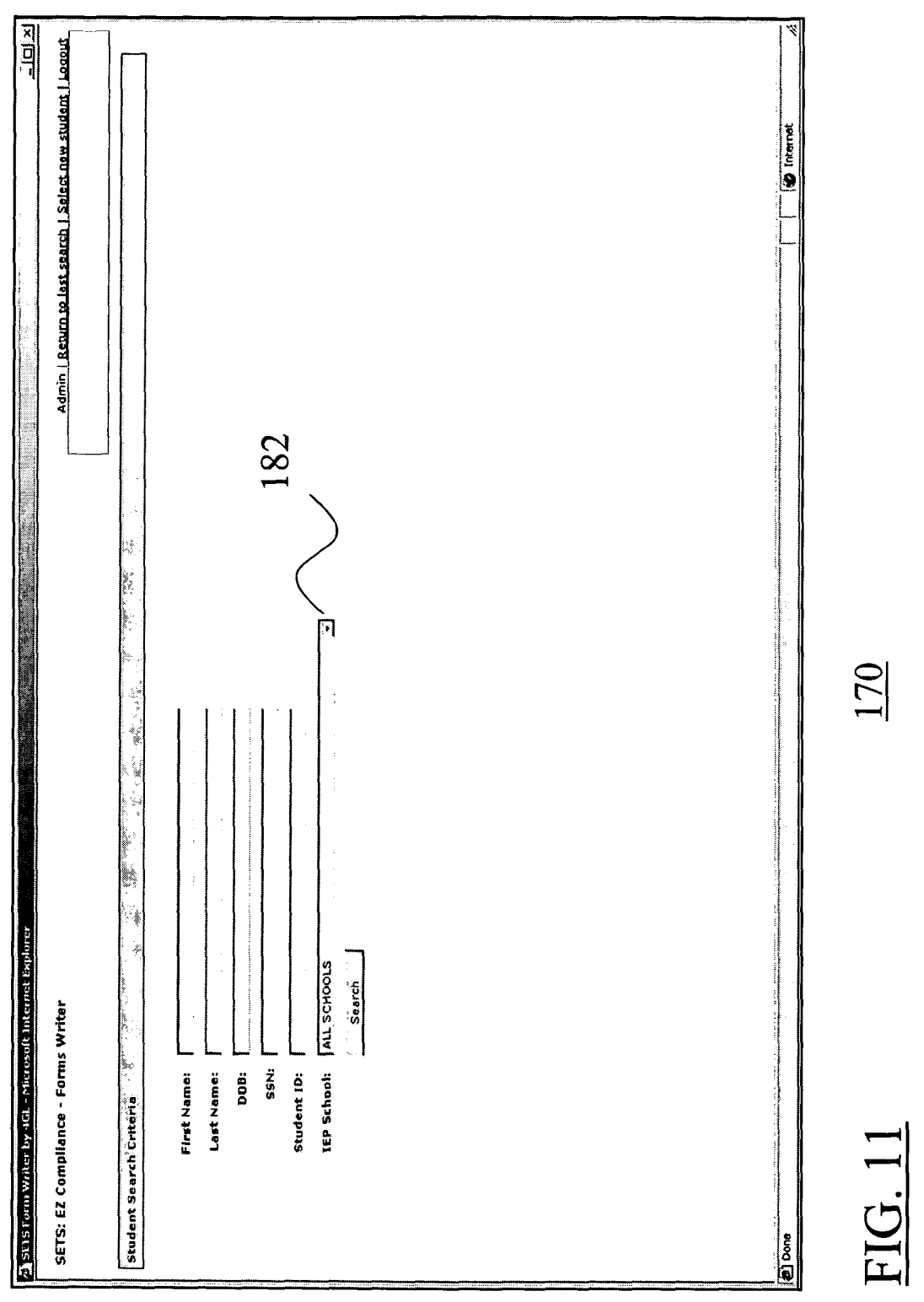

FIG. 11 illustrates the sample GUI screen 170 for student search in accordance with an embodiment of the present invention. As shown, GUI screen 170 allows a user to search for a particular student by entering search criteria in various fields. For example, GUI screen 170 allows a user to limit the search by school, or, alternatively, to search within all schools, by selecting an option from drop-down menu 182.

FIG. 12 illustrates a sample GUI screen 190 for returning student search results. GUI screen 190 may appear to a user, for example, after a user has submitted criteria for a student search in GUI screen 170. GUI screen 190 and other GUI screens include a "Return to last search" link 192 that will return a user to the previous search results. GUI screen 190 further includes a list of results 194. The results 194 correspond to students matching the search criteria specified by the user in GUI screen 170. Each item of the results 194 may contain a variety of data corresponding to a particular student. For example, each item of the result 194 may contain a student ID number, a social security number, and a student name. GUI screen 190 allows a user to select a particular student from the list of results 194. This is accomplished, for example, by selecting a student name.

Figure 13:
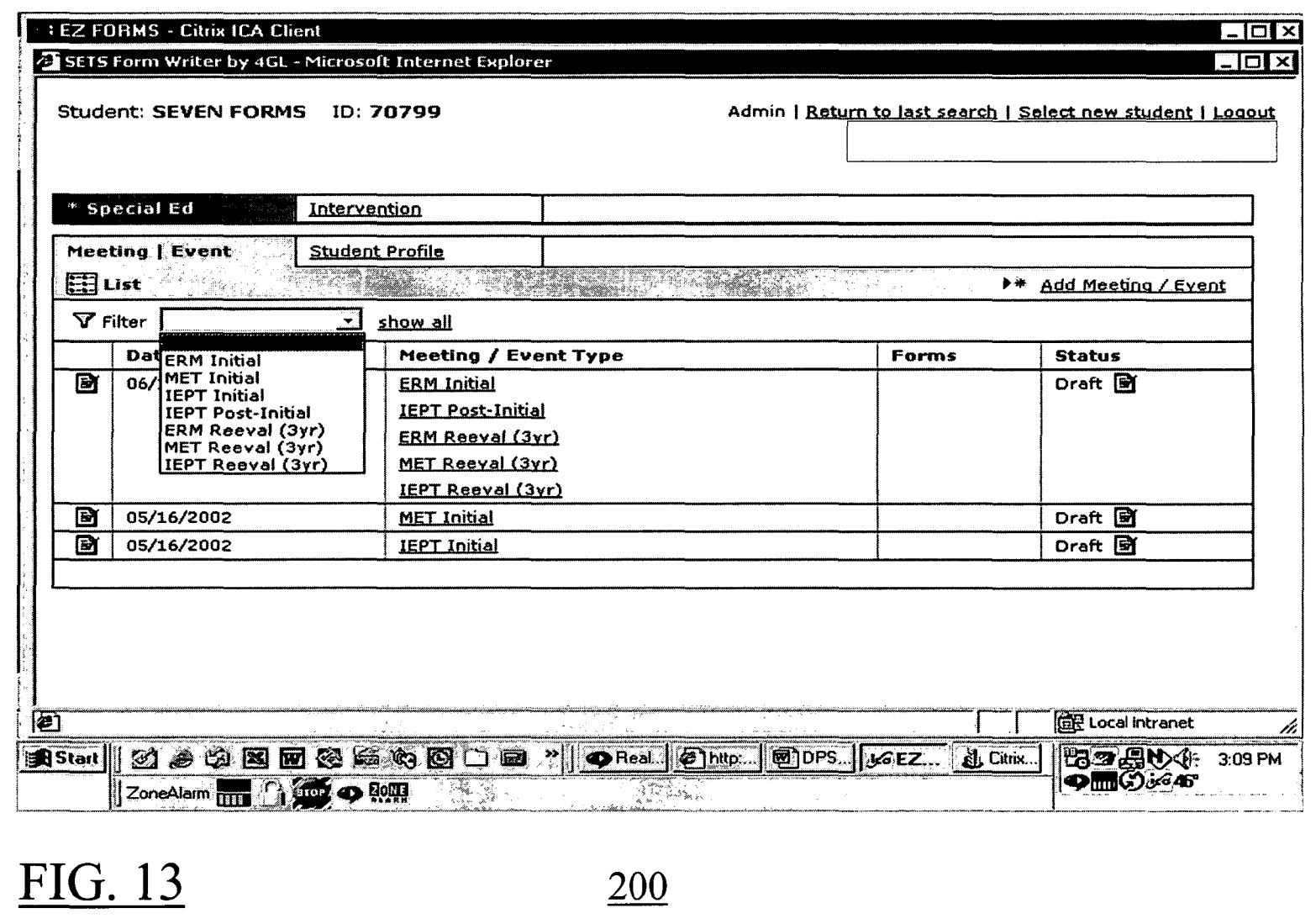

FIG. 13 illustrates a sample GUI screen 200 for displaying a meeting and events list. GUI screen 200 displays all of the current existing meetings for a particular student. GUI screen 200 may allow a user to add meetings and check on previous meetings.

FIG. 14 illustrates a sample GUI screen 210 for displaying detailed information about a particular meeting. GUI screen 210 may display the forms that are required for the meeting and their status. GUI screen 210 may also allow a user to run compliance checks by selecting the check button 212.

Figure 15:
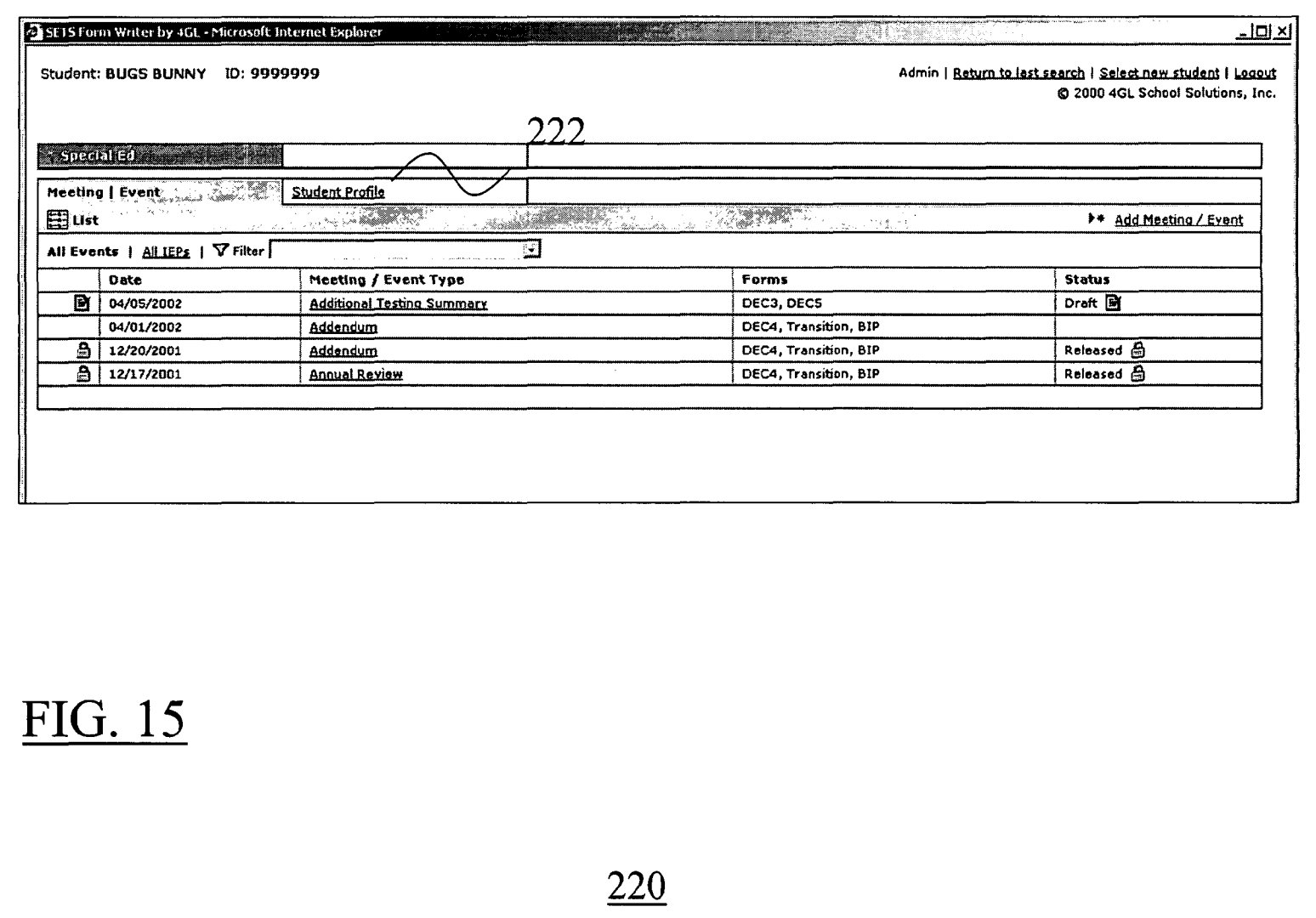

FIG. 15 illustrates a sample GUI screen 220 for viewing meetings and events for a particular student. From GUI screen 220, a user may access a student profile by selecting the "Student Profile" link 222.

Figure 16:
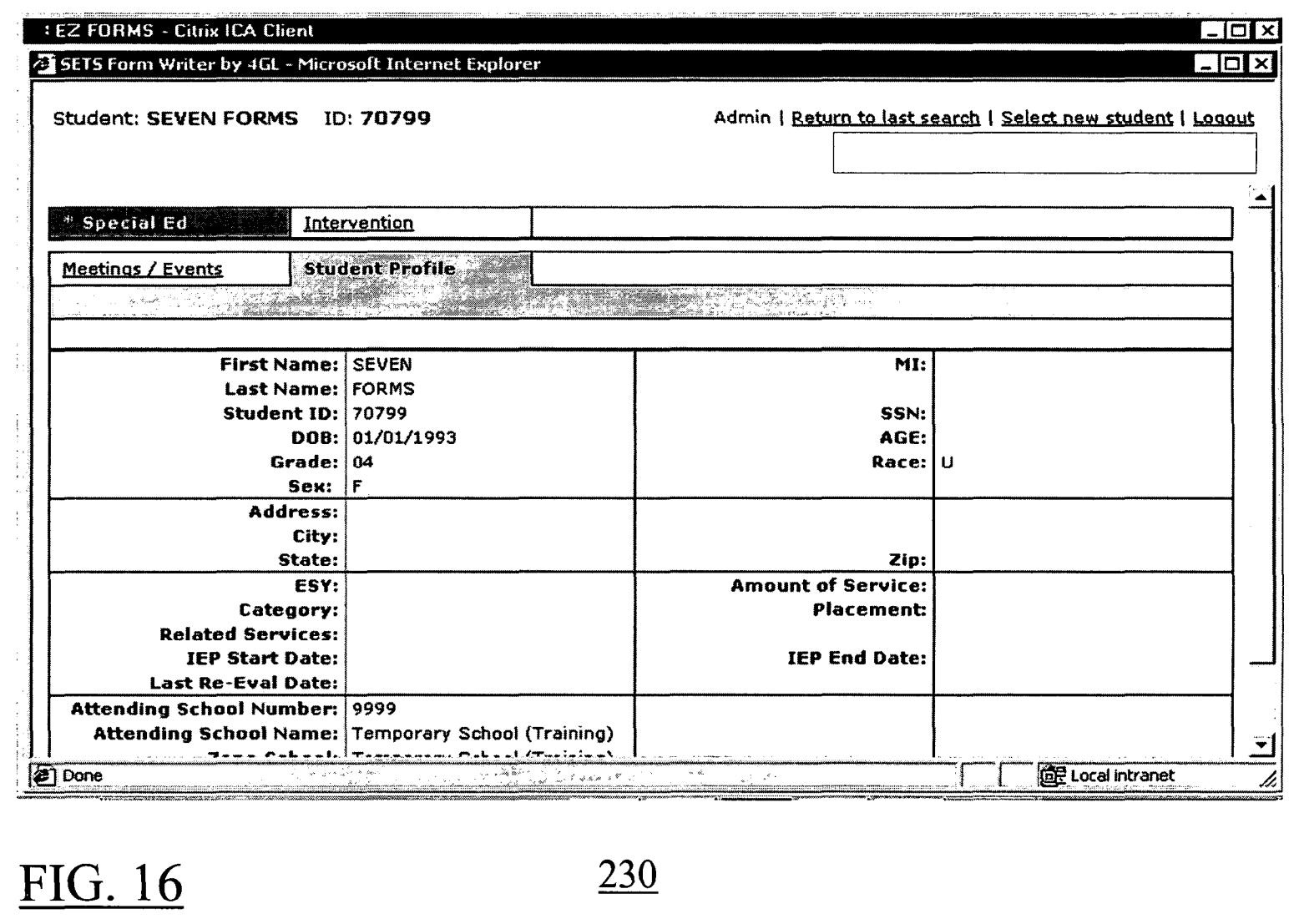

FIG. 16 illustrates a sample GUI screen 230 for viewing a student profile. A user can access GUI screen 230, for example, by selecting the "Student Profile" link 222 on GUI screen 220. The information displayed on the GUI screen 230 is obtained from a repository in the system. In some implementations, GUI screen 230 is a read only screen.

FIG. 17 illustrates a sample GUI screen 240 showing functions that can be found in the upper right hand corner of all screens in the system. One function available from all GUI screens in the system is an "Admin" link 242 that is available, for example, exclusively to particular users, such as administrators of the system for performing system administration tasks. User access may be limited, for example, by linking privileges to user login identification. Another function available from all GUI screens in the system is a "Return to last search" link 244 that directs a user back to the most recent search results GUI screen 190. Yet another function available from all GUI screens in the system is a "Select new student" link 246 that presents a user with a blank student search criteria GUI screen 170. An additional function available from all GUI screens in the system is a "Logout" link that logs a user out of the system.

Figure 18:
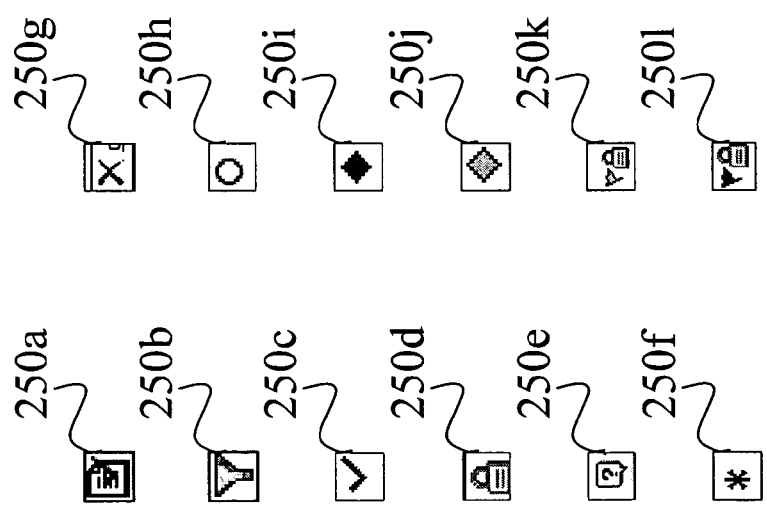

FIG. 18 illustrates example icons used throughout the system. Draft icon 250a shows that a form or meeting is incomplete. Filter icon 250b allows a user to filter forms to be viewed more easily. Compliant icon 250c shows that forms are acceptable and complete. Lock icon 250d shows that a form or meeting has been completed, released and is read only. Help icon 250f alerts a user to a help message. Non-compliant icon 250f identifies a form or meeting as incomplete. Delete form icon 250g allows a user to delete a form. Optional form icon 250h notifies a user that a form is optional. Purple diamond icon 250i signifies that a form is an incomplete required form. Green diamond icon 250j signifies that the form is a completed and required form. Locked amended icon 250k shows that a meeting was held to amend the non-compliant issues. Locked non-compliant icon 250l shows that a meeting is locked and not compliant.

Figure 19:
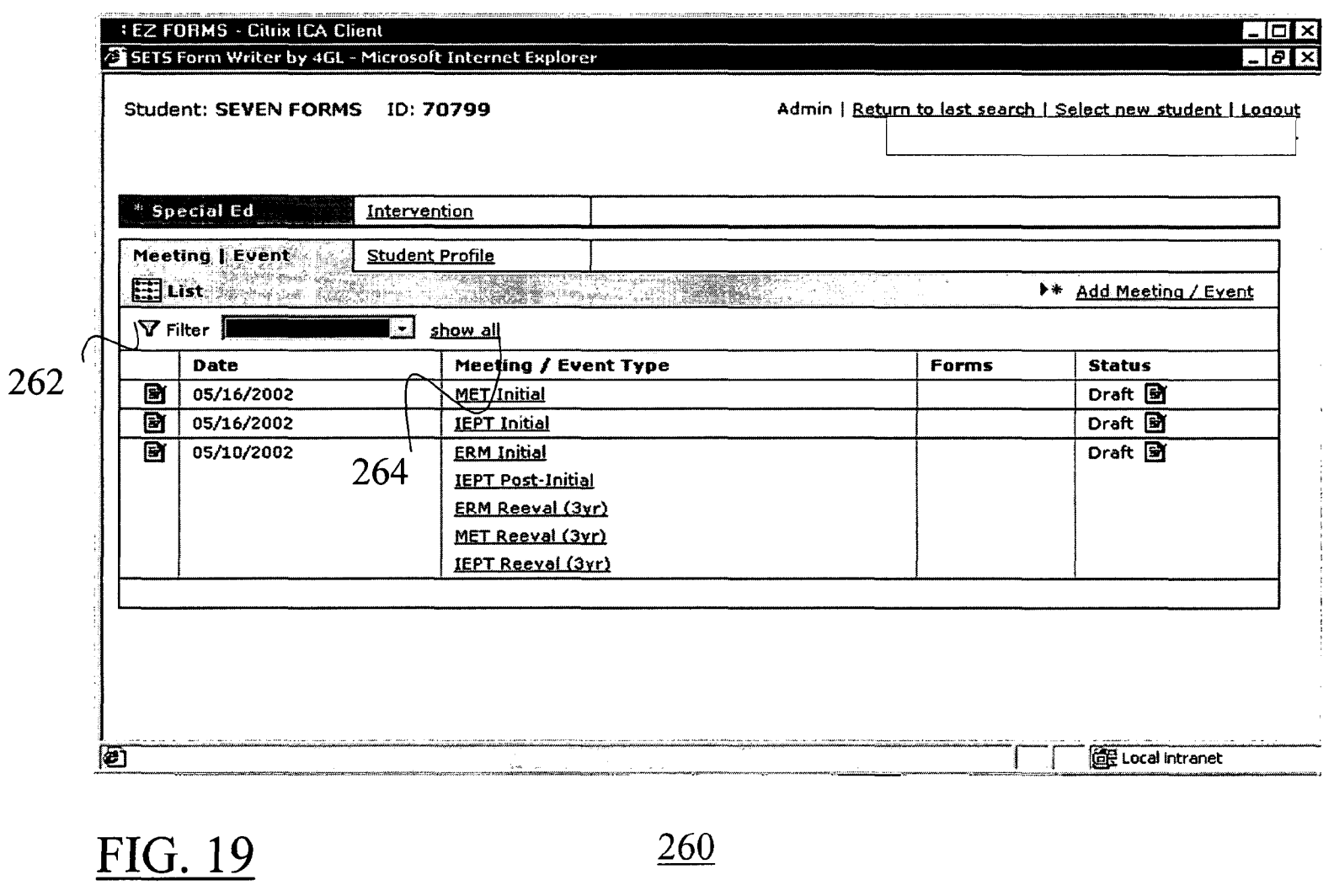

FIG. 19 illustrates a sample GUI screen 260 for displaying the meetings and events associated with a specific student. A user may select the "Show all" link 264 to display all the meetings and events for the student. Alternatively, a user can select the drop-down menu next to the funnel filter 262, and select a type of meeting to view. All meetings and events for the student matching the selected type of meeting will be displayed.

FIG. 20 depicts the GUI screen 260 and illustrates in detail selection of the filter button 262. The filter button 262 allows a user to view a student's meeting by type. For example, a user may wish to see all of the Individualized Education Program Team (IEPT) Post Initials for a specific student. The user may then select the arrow down box and may select the option "IEPT Post Initials" from the list in the pulldown screen 272. The system will then display only meetings of the selected type for the specific student.

Figure 21:
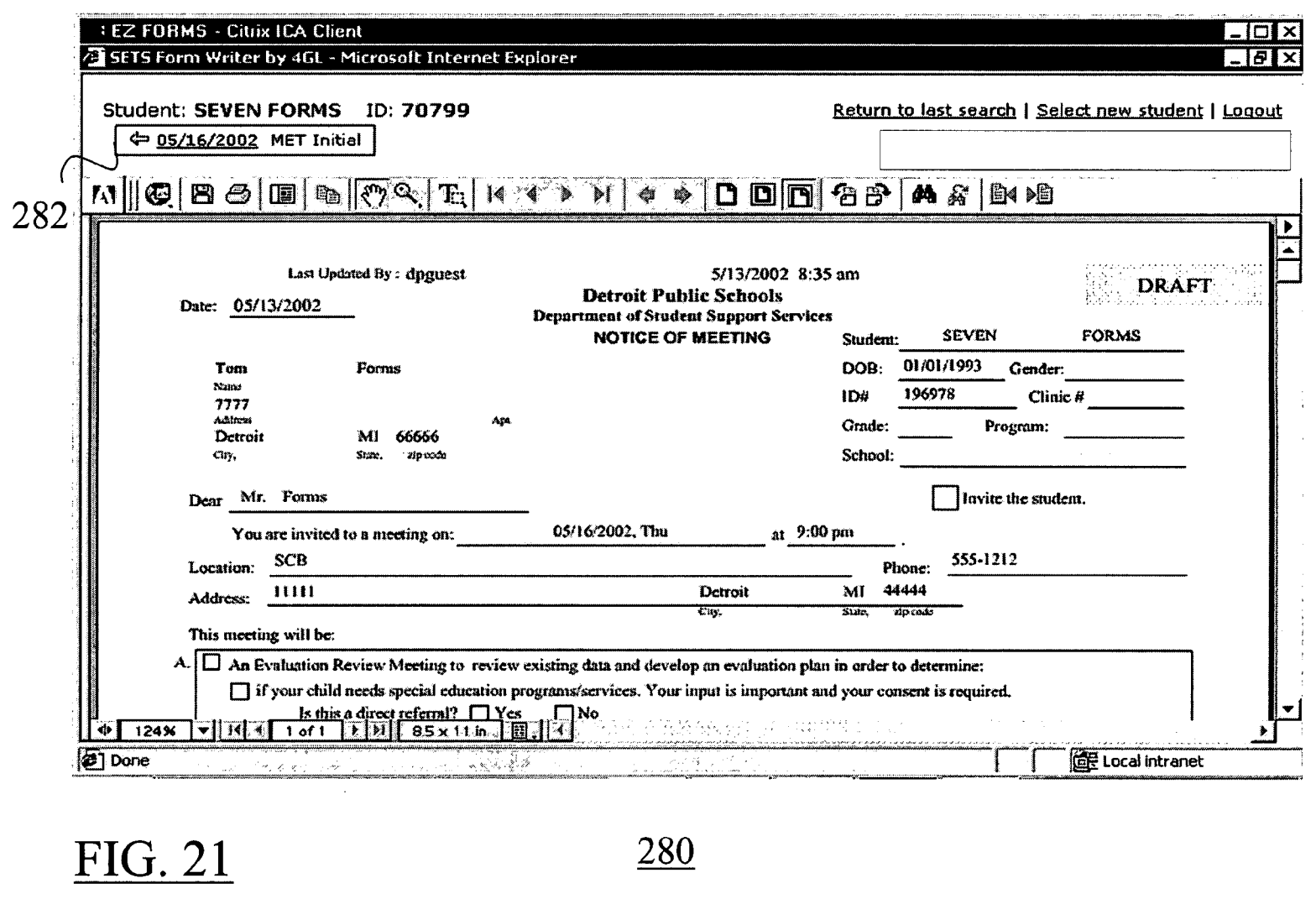

FIG. 21 shows a sample GUI screen 280 for creating forms. A user may select the date in the box 282 in the upper left hand corner of GUI screen 280 to return to the Meetings/Events GUI screen 260.

FIGS. 22-41 illustrate the sample GUI screens that a user might see navigating through the system performing tasks for a particular student.

Figure 22:
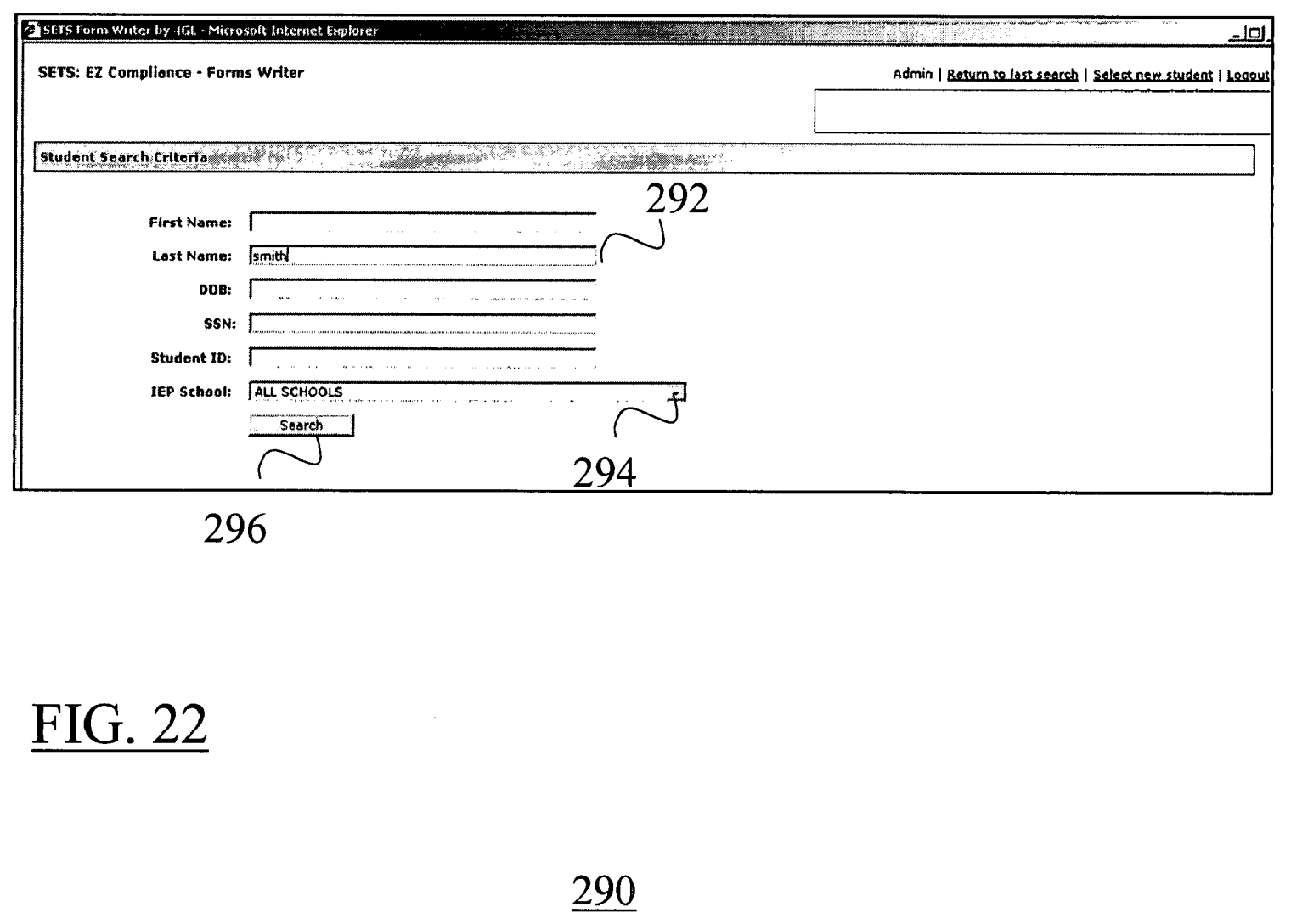

FIG. 22 shows a sample GUI screen 290 for student search. GUI screen 290 may be presented to a user upon login and may be similar to GUI screen 180. A user may enter one or more search criteria into the search fields 292 and may select a school or all schools from the drop-down menu 294. The user may then select the search button 296 to display the results of the search.

FIG. 23 illustrates a sample GUI screen 300 for returning student search results. GUI screen 300 may be similar to GUI screen 190. A list of results 302 is displayed. Each result may include a plurality of data for a particular student, such as student name, student identification (ID) number, or social security number. A user may select a particular student by selecting the student name. The user will then be directed to a see a GUI screen 310 for that student.

Figure 24:
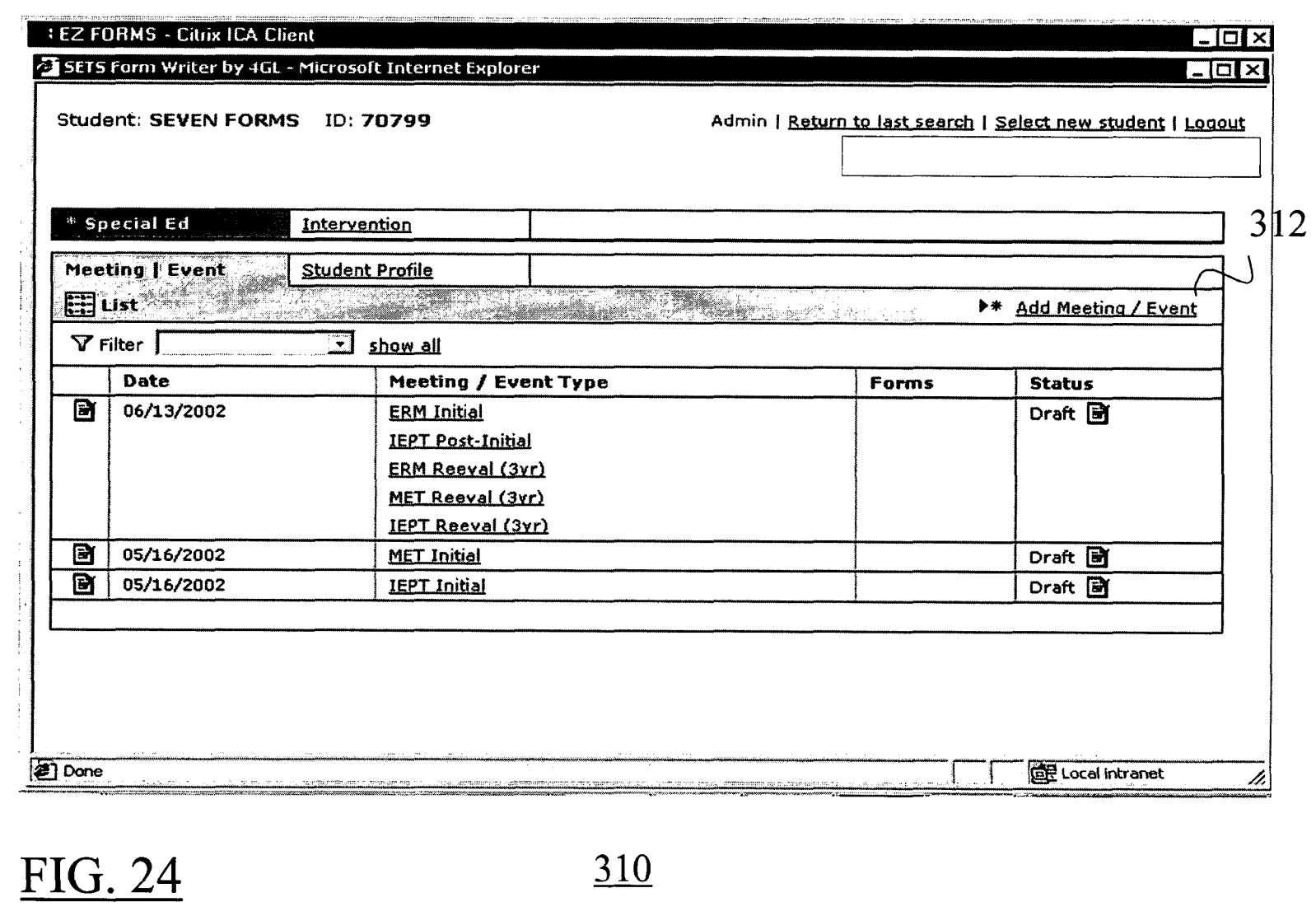

FIG. 24 illustrates a sample GUI screen 310 for displaying meetings and events associated with a particular student. GUI screen 310 may be displayed after a user selects a student from GUI screen 300. From GUI screen 310, a user may create a new meeting associated with the student by selecting the "Add Meeting/Event" link 312.

FIG. 25 illustrates a GUI screen 320 for adding a meeting. GUI screen 320 may be displayed after a user selects the "Add Meeting/Event" link 312 in the GUI screen 310 of FIG. 31. GUI screen 320 displays the types of meetings 322, 324 that may be added. The number of types of meetings 322, 324 will vary depending, for example, on where the student is in the process, what meetings have taken place to date, or other criteria.

FIG. 26 illustrates a sample GUI screen 330 for adding a meeting. GUI screen 330 may be the same as GUI screen 320. A user may select one or more types of meetings to add by selecting a check box 332 next to the desired type of meeting. A user may then select the "Create" link 334. The first form for the requested meeting(s) will then appear.

Figure 27:
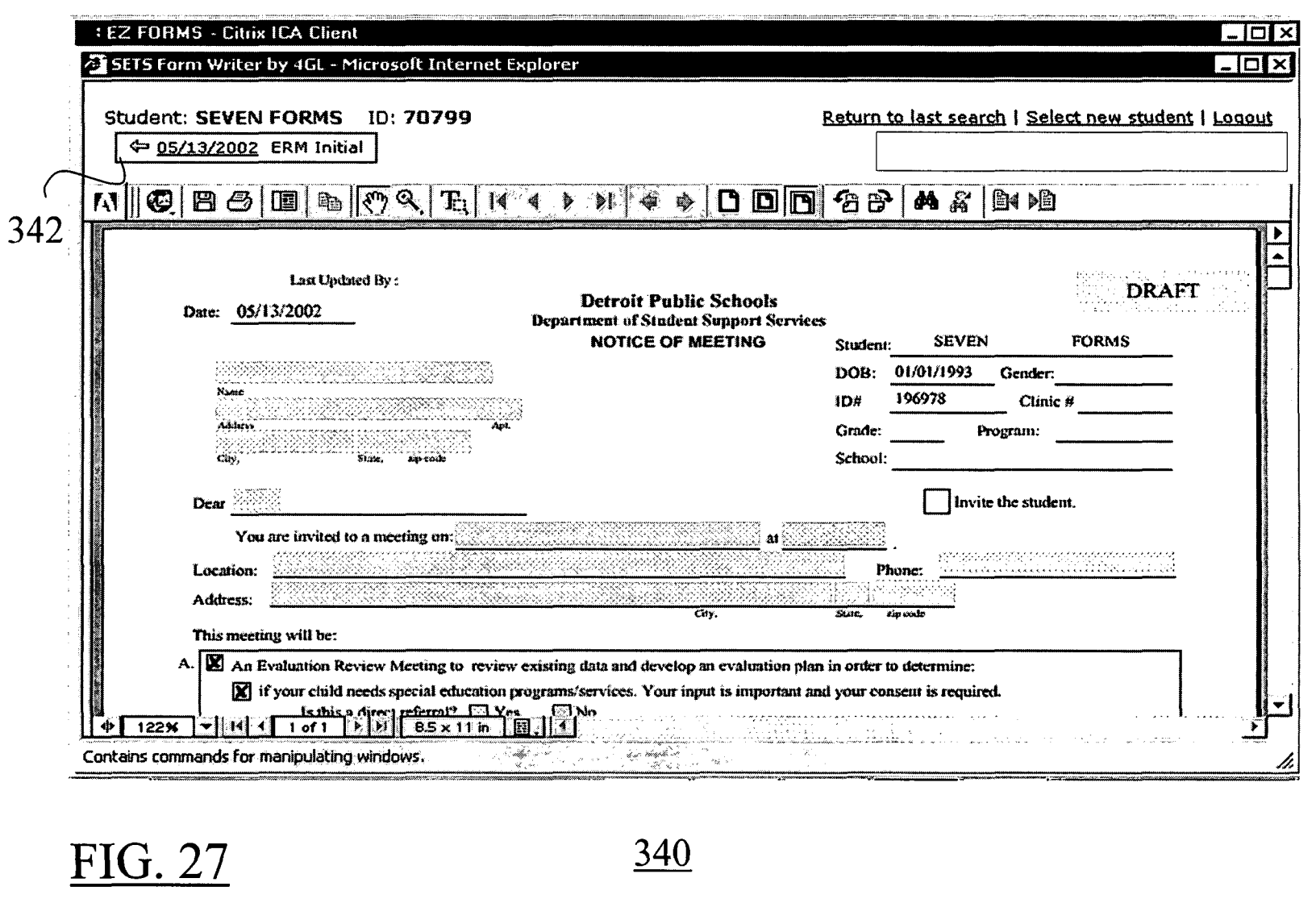

FIG. 27 illustrates a sample GUI screen 340 displaying a form required for a particular type of meeting. GUI screen 340 may be displayed after a user selects the "Create" link 334. Part of the form may already be automatically completed by the system and may not require user input. For example, the fields Student Demographics, Meeting Type (ERM), and Attendee Types may be automatically completed. In addition, the system may color code the fields to enable a user to easily determine, for example, which fields are automatically completed, which are optional, and which are required. A user may return to the details window by selecting the return link 342.

FIG. 28 illustrates a sample GUI screen 350 for displaying the meeting/events details for a particular meeting. From GUI screen 350, a user can add an additional event to the meeting by selecting the "Add Event to This Meeting" link 352. This will display a GUI screen 360, as shown in FIG. 29.

Figure 29:
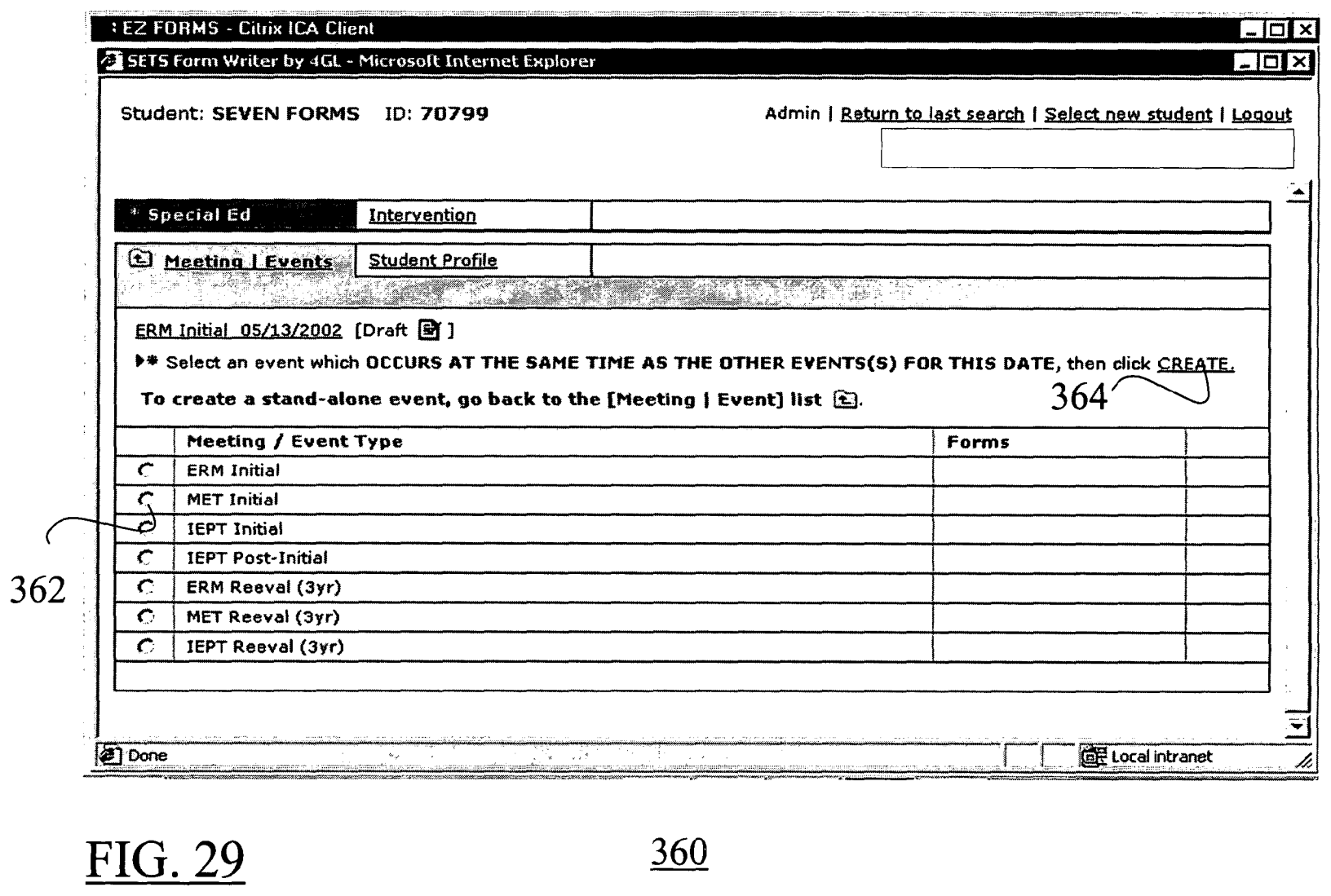

FIG. 29 illustrates the sample GUI screen 360 for adding an additional event to a selected meeting. GUI screen 360 may be displayed after a user selects the "Add Event to This Meeting" link 352. GUI screen 360 includes a list of new meetings/events. A user may select a desired meeting/event by checking the "radio" button 362 associated with the meeting/event. The user then selects the "Create" link 364 and the GUI screen 370 shown in FIG. 37 will then be displayed.

Figure 30:
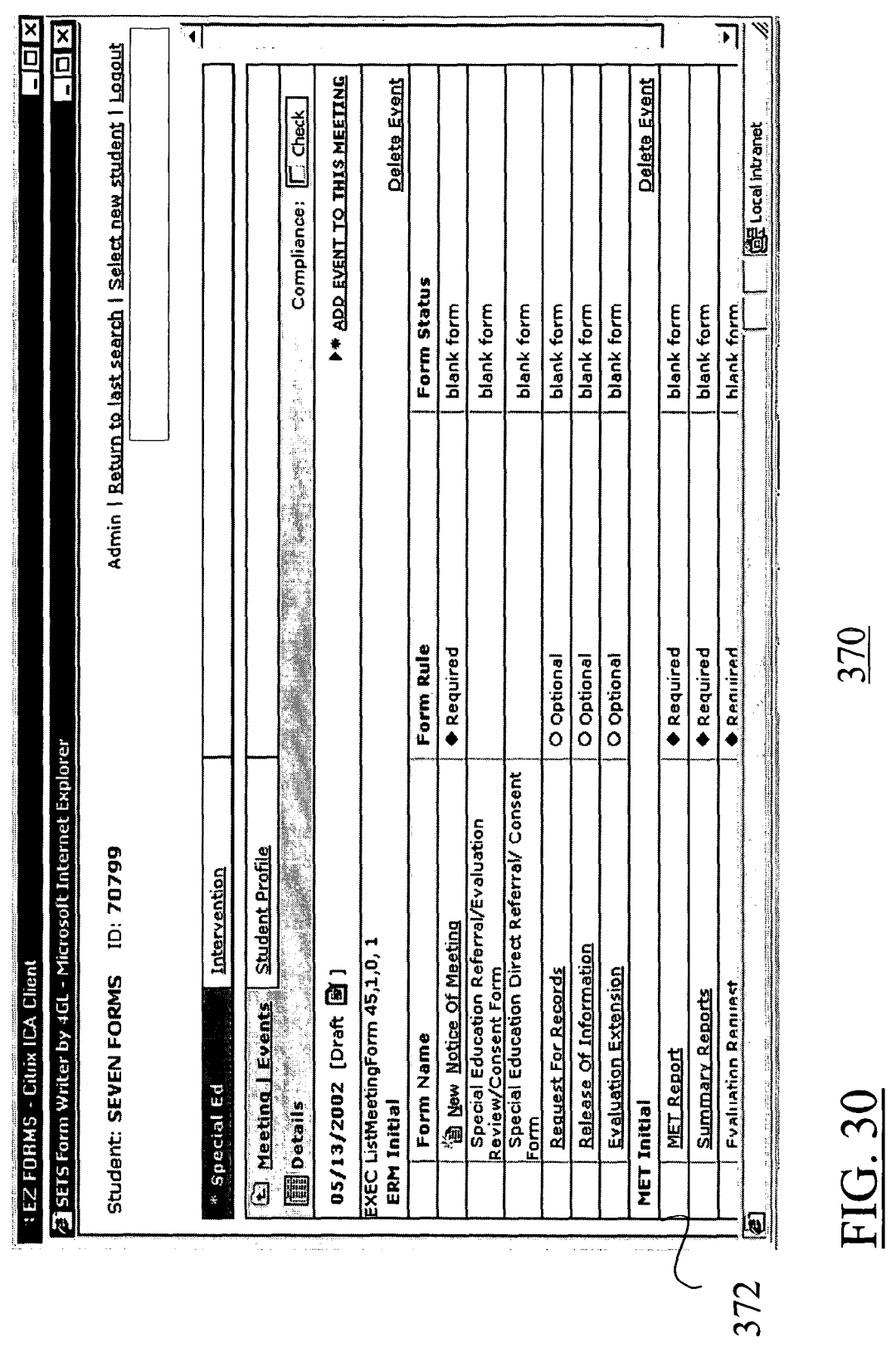

FIG. 30 illustrates the sample GUI screen 370 for displaying the meeting/events details for a particular meeting. A user may be returned to this screen, for example, after adding an additional event to a meeting using GUI screen 360. In this case, the newly added event 372 will be displayed on GUI screen 370. Forms 374 for the event 372 are also displayed. Forms that are required for the event 372 that have already been completed in conjunction with another event in the same meeting may be copied or referenced. In this way, common forms are utilized whenever possible, eliminating the necessity of completing duplicate forms.

Figure 31:
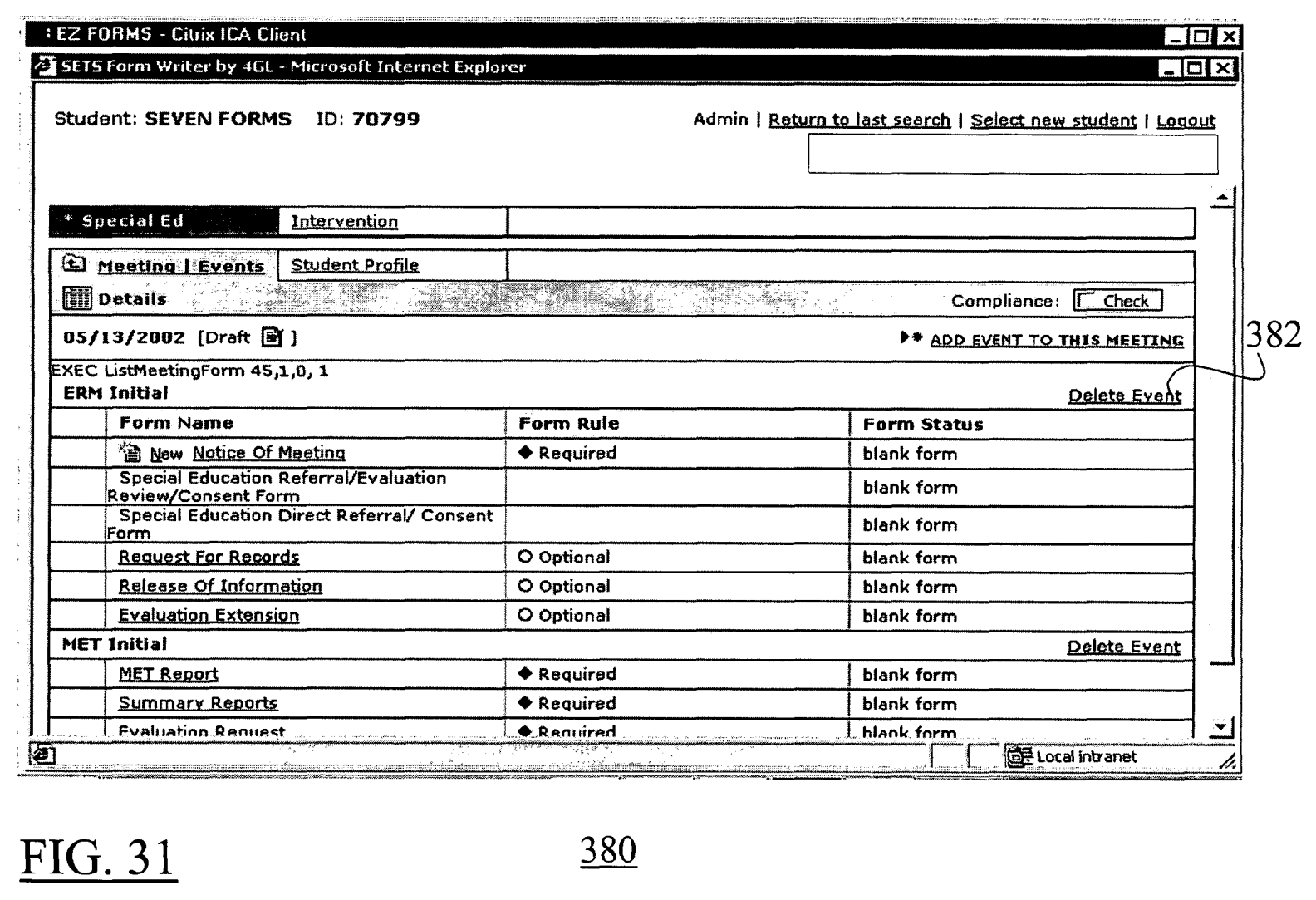

FIG. 31 illustrates a sample GUI screen 380 for displaying the meeting/events details for a particular meeting. From GUI screen 380, a user may delete an event by selecting the "Delete Event" link 382. If a meeting is not locked (locking can be selected, for example, once all information has been entered and a compliance check passed, as described further with regard to FIGS. 35-38, below), a user can delete all events for the meeting, thereby effectively deleting the meeting.

Figure 32:
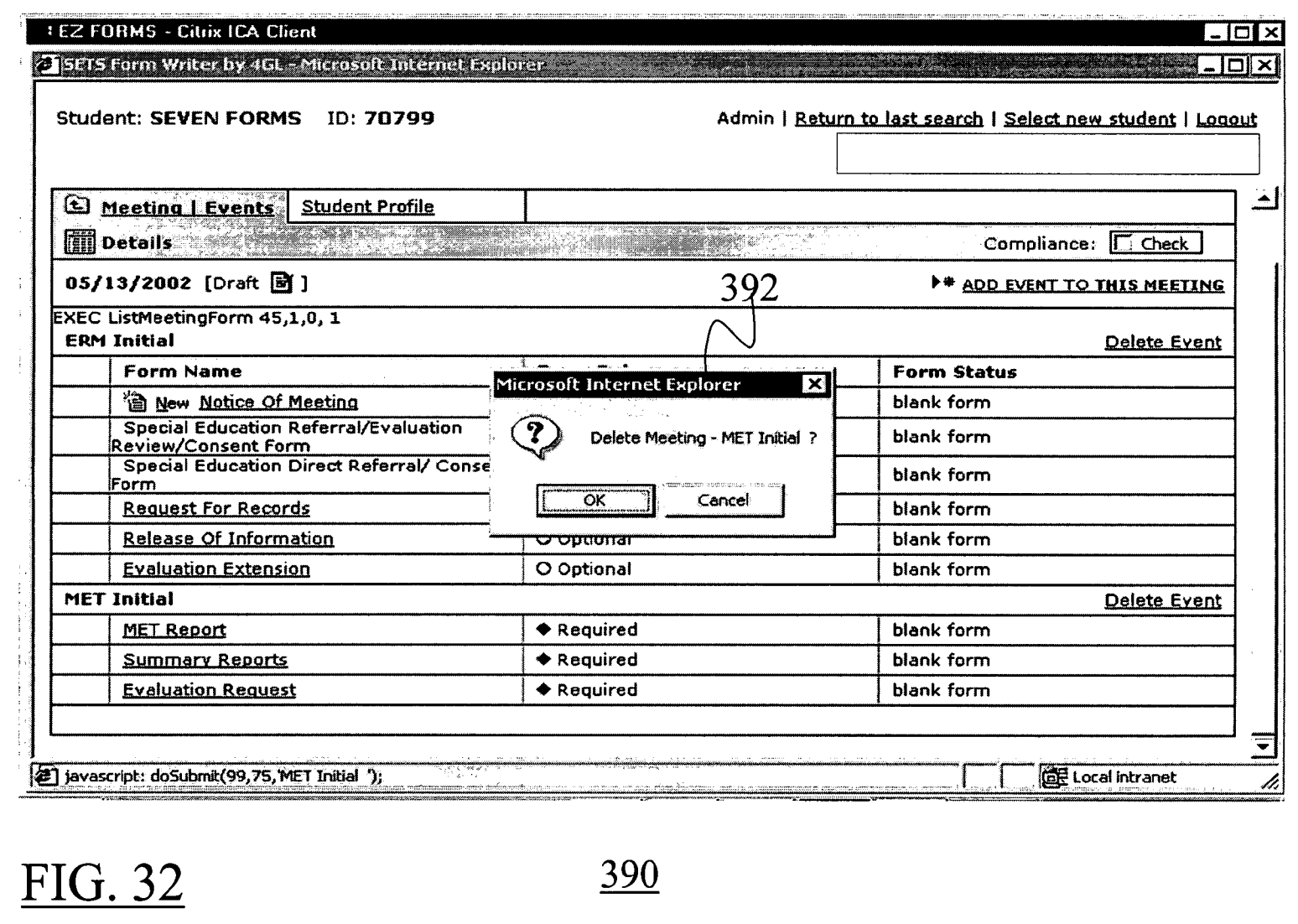

FIG. 32 illustrates a sample GUI screen 390 for displaying the meetings/events details for a particular meeting. GUI screen 390 may be displayed after a user selects the "Delete Event" link 382. GUI screen 390 is similar to GUI screen 380 but shows a pop-up check box 392 that allows a user to confirm the deletion of the Event. A user may select "OK" to delete the event or may select "cancel" to opt not to delete the event.

FIG. 33 illustrates a sample GUI screen 400 for displaying the meeting/events details for a particular meeting. GUI screen 400 may be displayed after a user cancels an event (e.g., by selecting "OK" in the pop-up check box 392 of FIG. 39). The cancelled event (MET) does not appear on the GUI screen 400 (compare with FIG. 32).

Figure 34:
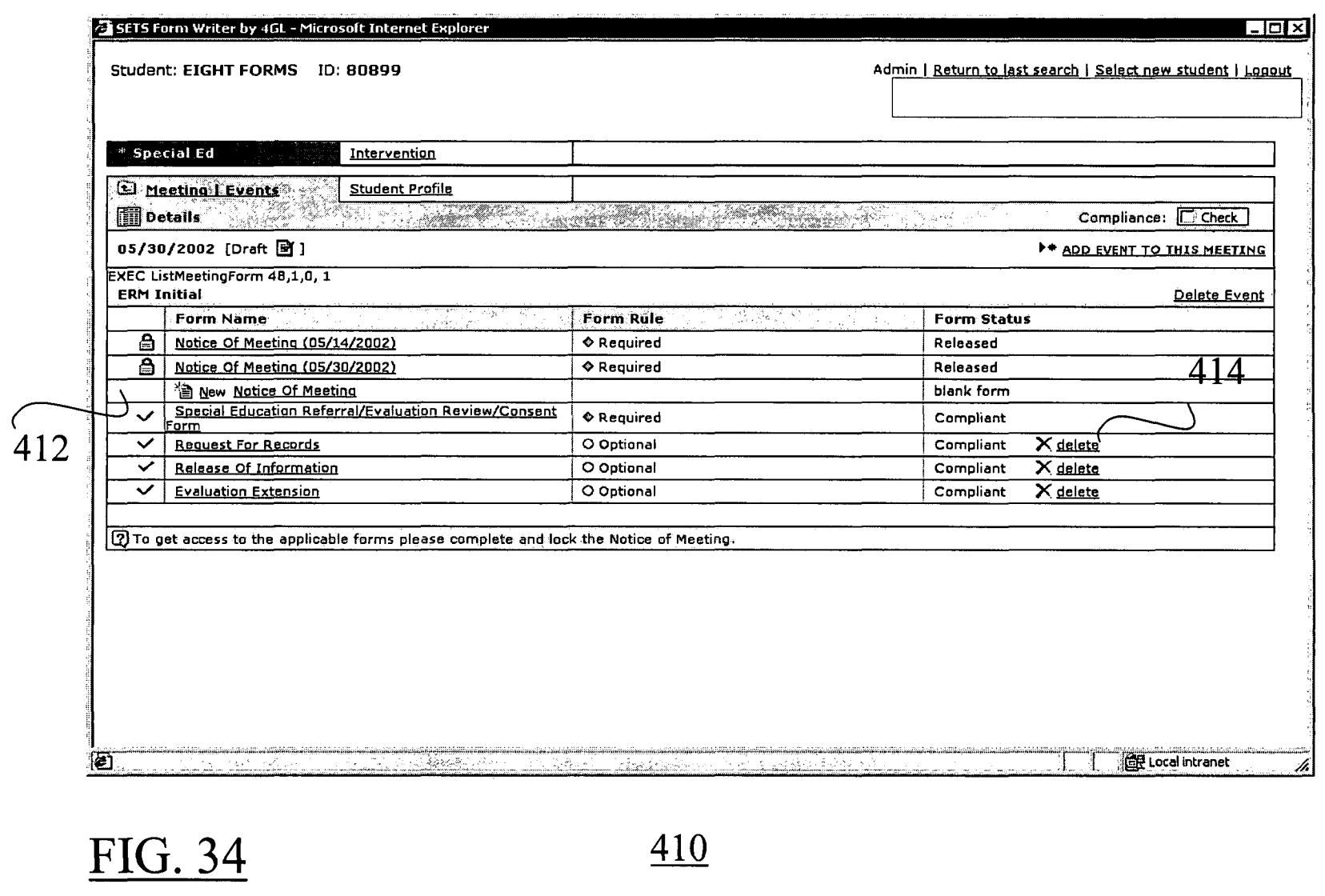

FIG. 34 illustrates a sample GUI screen 410 for displaying the meeting/events details for a particular meeting. GUI screen 410 displays a new notice of meeting form name 412. A user may select the notice of meeting form name 412 to add this page to the meeting. The form may then be displayed for the user to complete. From the GUI screen 410, a user may also delete any form marked "optional" by selecting the "Delete" link 414 associated with the form. A meeting/events detail screen may then be displayed. Deleted forms may still appear on the meeting/events detail screen, but their form status may be marked as "deleted." Deleted forms can be restored by selecting a restore link.

FIG. 35 illustrates a sample GUI screen 420 for displaying the meeting/events details for a particular meeting. GUI screen 420 includes a compliance check box 422 that allows a user to check whether all required forms for a meeting have been completed. A user may select the compliance check box 422, and GUI screen 430, shown in FIG. 36, may then be displayed.

FIG. 36 illustrates the sample GUI screen 430 for displaying the meeting/events details for a particular meeting. GUI screen 430 also displays the results of a status check performed for a particular meeting. If there are incomplete forms, the compliance check will fail; if all forms for the meeting have been completed, the compliance check will pass. The results of the check will be displayed 432. If the compliance check fails, a list of what remains to be completed will be displayed. The GUI screen 430 also includes a "Clear Window" link 434 that allows a user to erase the compliance check information.

FIG. 37 illustrates a sample GUI screen 440 for displaying the meeting/events details for a particular meeting. GUI screen 440 also displays the results 444 of a status check performed for a particular meeting. If the status check has passed, a "lock check" box 442 will be displayed.

FIG. 38 illustrates a sample GUI screen 450 for displaying the meeting/events details for a particular meeting. GUI screen 450 also displays a "lock check" box 452. A user may lock the forms associated with a particular meeting by selecting the lock check box 452. Locking the forms, also interchangeably known as "releasing the forms" in some embodiments of the present invention, converts the forms to read-only format. Once the forms have been locked, they can no longer be edited.

Figure 39:

FIG. 39 illustrates a sample GUI screen 460 for displaying the meeting/events details for a particular meeting. GUI screen 460 may be displayed to a user, for example, after the forms for a meeting have been locked.

FIG. 40 illustrates a sample GUI screen 470 for displaying the meeting/events details for a particular meeting. Forms that have been locked show a locked icon 472. Forms that have been locked also show a form status indicator 474, reading, for example, "released," which indicates that form is read-only and cannot be edited.

FIG. 41 illustrates a sample GUI screen 480 for displaying the meeting/events details for a particular meeting. A user who has completed work on the system may select the "Logout" link 482 to log out of the system.

Figure 42:
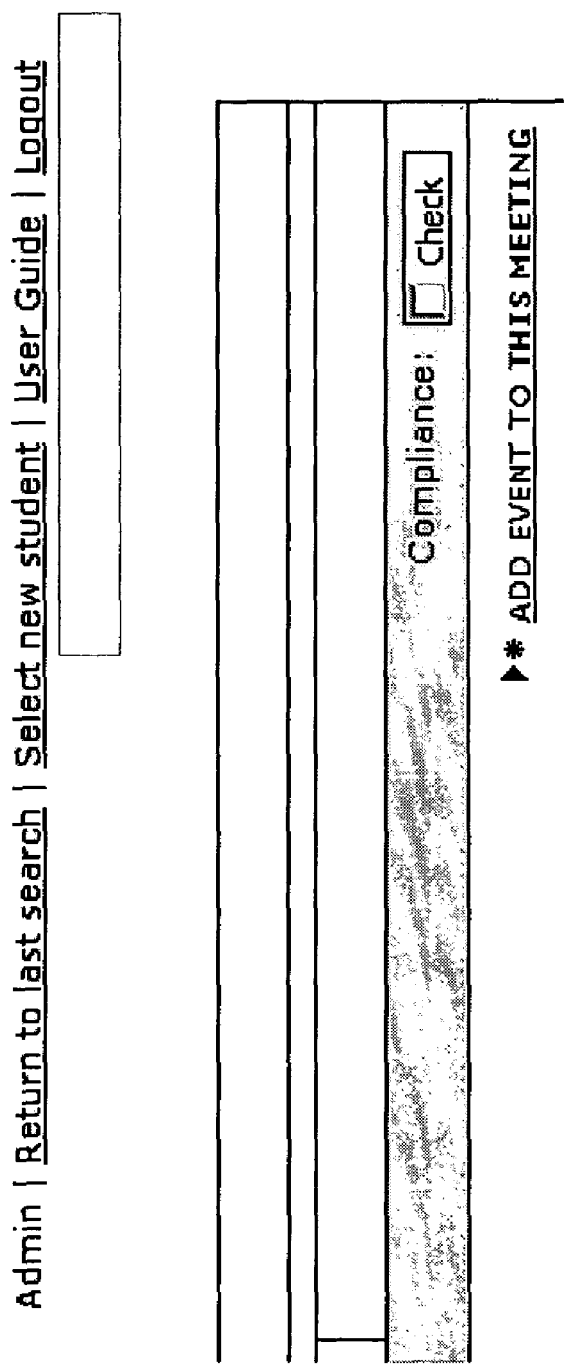

FIGS. 42 and 43 present closeup views of example selectable checkbox features for performing compliance checking and exemplary results of the check, in accordance with an embodiment of the present invention.

User Interface for Code Authoring Tool

One aspect of the present invention is that it allows a business analyst to accomplish tasks that would otherwise only be able to be performed by, for example, a programmer.

One exemplary embodiment of the present invention includes providing effective "translation" of coding, such as Java script code (developed by Sun Microsystems, Inc., of Santa Clara, Calif.), into English language using, for example, drop-down menus that allow point and click selection. Users are thus able to build business logic, and this feature of the present invention translates the English description into appropriate code, such as Java script code. The present invention also concatenates the produced logic into documentation that is provided at the field level and also to a spreadsheet, allowing tracking of all activity performed in a document (e.g., form).

Absent such tracking features, a programmer's work can easily become out of sync with the technical specification or with the documentation for software, and it may be difficult to tell what has been done. The present invention allows the user to maintain a consistent relationship between the business logic, the documentation, and the code.

Thus, the present invention allows a user who does not have programming skills to develop a form using simple natural language input in conjunction with a step by step interface. All the code needed is automatically generated and documented for the user. The forms begin to work immediately as a stand alone application container, and the user is able to view instantly the results of the input, and adjust the forms as needed. The present invention thus allows an analyst to become a real time programmer, creating a form and the particular specifications of an implementation at the same time.

Among other things, the present invention is thus able to reduce scope creep and dramatically reduce iterations, costs of customized programming, and support required from, for example, an information technology (IT) staff. The present invention also allows code to be generated automatically that is virtually error free, and quality assurance effort required is thus potentially dramatically reduced or eliminated. In addition, a new version of an interface can be deployed in minutes, rather than days, as may be necessary with existing methods.

Further, the present invention allows modification on the fly by users of the interface created. For example, if no fields are added or removed from a form, an authorized user may be able to change the formatting of forms or rules for form completion in real time (e.g., a dynamic link to a structured query language (SQL) database or other code repository may be used to determine who has permission to update a form using, for example, a simple object access protocol (SOAP) within image software, such as Adobe Acrobat, made by Adobe Systems Incorporated of San Jose, Calif.) The present invention also supports such features as Multi-version Tracking (e.g., if a user makes changes to the form input rules, all open versions of that form may be set to "non-compliant" status to ensure users revisit their forms and make them compliant with the adjusted rule).

The user interface for creating code, in one embodiment of the present invention, involves the inclusion or superimposition of a second GUI with a display of the general forms GUI to be used by users completing forms. Thus, for example, the user interface for creating codes includes a number of popup or pulldown menus, or other selectable options, that are superimposed on an existing template of a forms GUI, such as the forms GUI shown in FIGS. 8-43.

An embodiment of the present invention includes three levels of interaction for a user. A first level involves data formatting. For example, if a date field is provided, the user may select any of several formats for the date, including the month, day, and year, with a selected format for entry (e.g., two digits slash, two digits slash, two digits; each month required to be spelled out with the full year and day indicated).

Each required action to complete or select the various elements of a form is presented in a user friendly manner, such as by providing selectable options in a drop down menu that each explain the action that needs to occur. In one embodiment of the present invention, a user interface for creating code is selected for access (e.g., via a menu option within the forms GUI that is accessible only by users having appropriate privileges), and the user is presented with a GUI interface element, such as a popup or pulldown menu, to build form level compliance information.

In one embodiment of the present invention, a forms layout specialist cleans up the initial form, as necessary, within the second portion of the system, and names the fields so as to set the parameters for development in the first portion of the system. For example, the form may include two types of elements, a graphics portion to display the form appearance, and fields, having names, which are the areas in which the end user of the form is able to input information, and for which a user interface for code development is able to develop the field functionality.

The specialist thus is able to insert the form into the second portion of the user interface for code development. By switching between the two portions, the user is able to view in real time the results of the document design. Following form completion by the user, the layout specialist cleans up the form, as necessary, to place it in finalized form for use in a GUI for form completion (e.g., such as described above with regard to FIGS. 8-43).

Figure 44A:
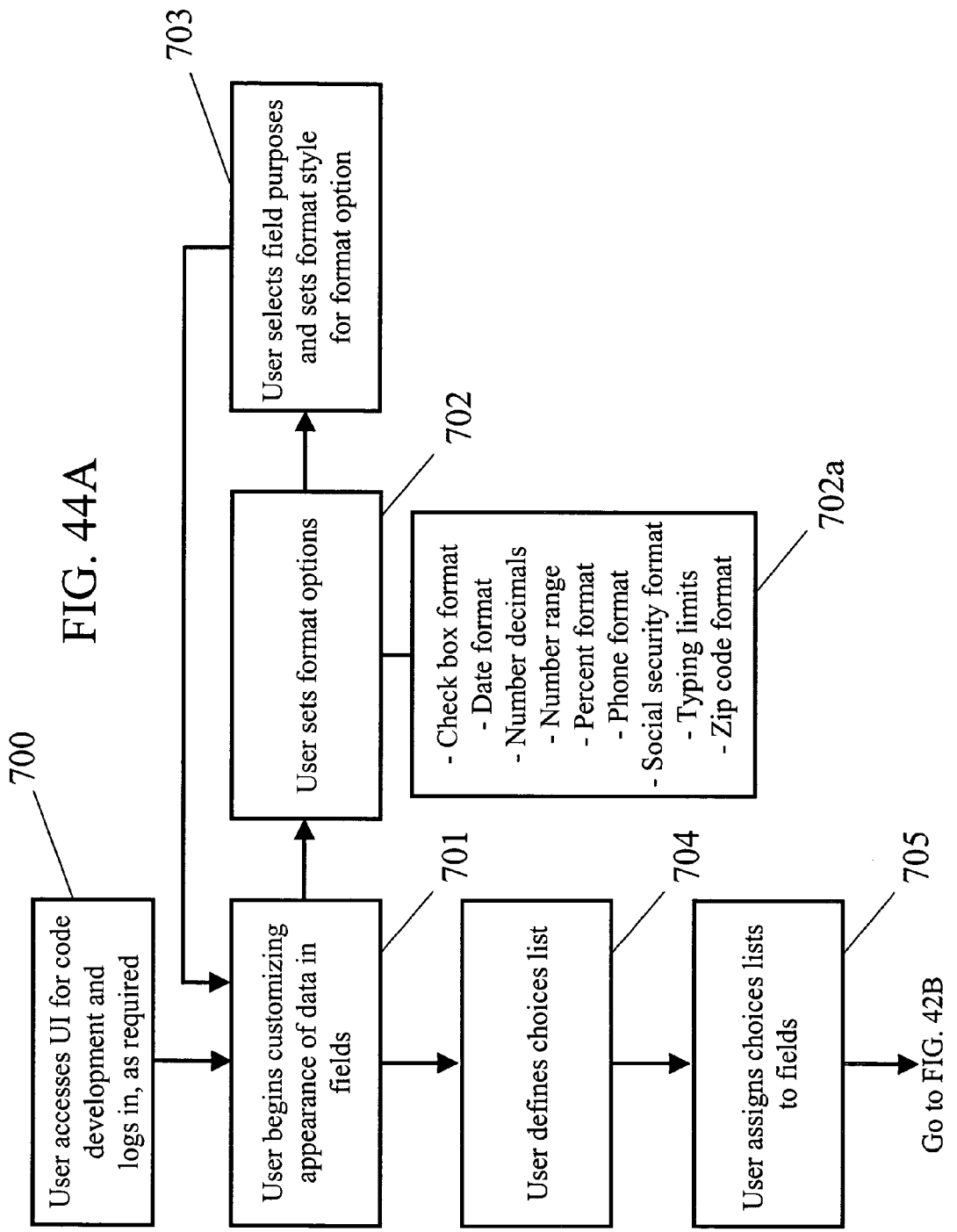
FIGS. 44A and 44B show a representative flow diagram of various actions in an exemplary user interface for developing code for use for forms with regard to implementation under the IDEA, in accordance with an embodiment of the present invention.
Figure 44B:
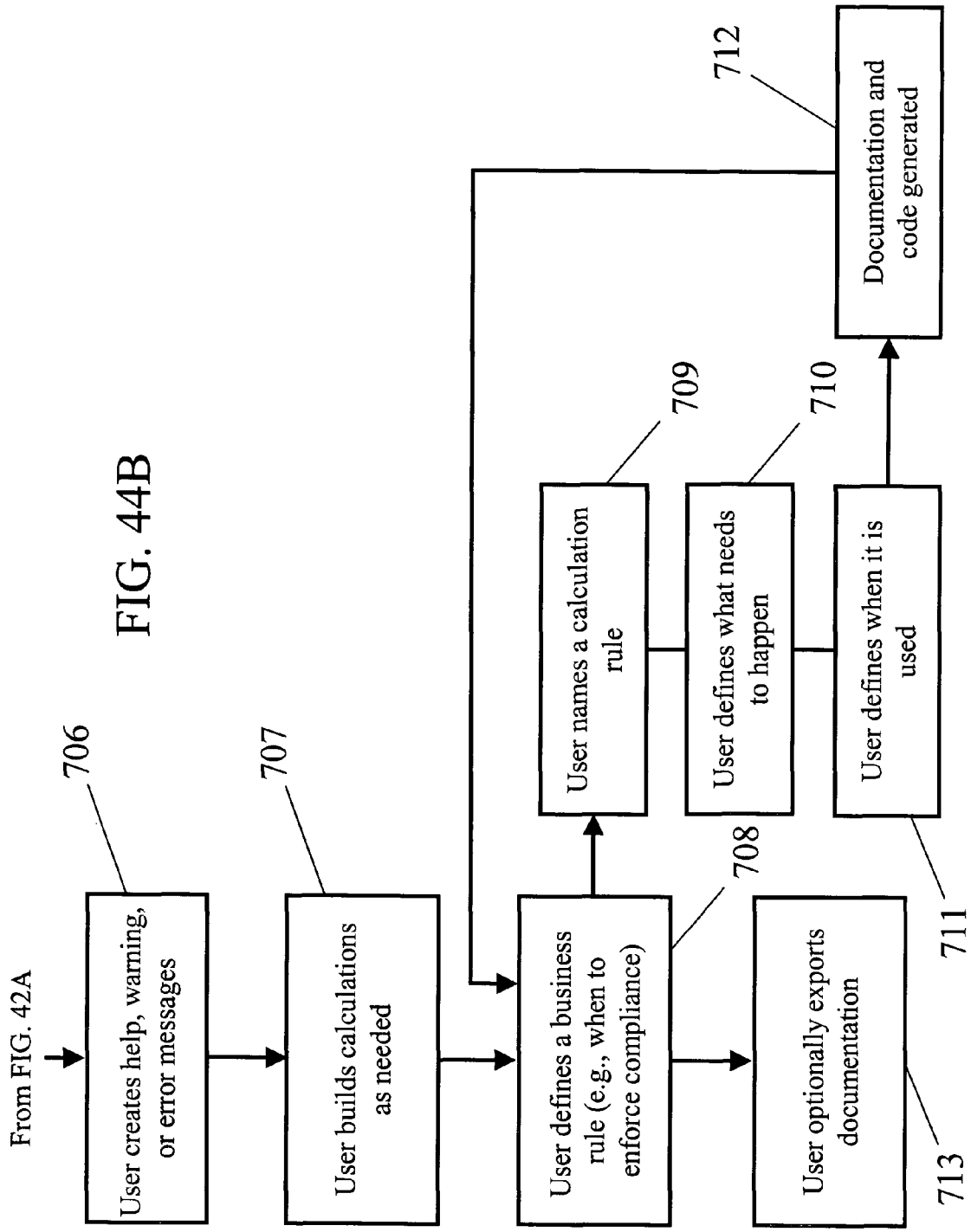

FIGS. 44A and 44B show a representative flow diagram of various actions in an exemplary user interface for developing code for use for forms with regard to implementation under the IDEA, in accordance with an embodiment of the present invention. As shown in FIGS. 44A and 44B, initially, a user accesses the user interface for developing code, following or in conjunction with logging in or otherwise meeting security requirements for access to the system 700. The user then begins customizing the appearance of data in the fields to be used in the forms 701. This customization includes, for example, the user setting format options 702, such as check box format, date format, number decimals, number ranges, percent format, telephone format, social security number format, typing limits, and zip code format 702a, and the user selecting field purposes and setting format styles for the selected format options 703.

The user then defines a choices list 704 and assigns a defined choices list to each field 705. As shown in FIG. 44B, the user then creates help, warning, or error messages 706, and builds calculations, as needed 707. Next, the user defines a business rule (e.g., when to enforce compliance) 708, including, for example, naming a calculation rule 709, defining what needs to happen 710, defining when the calculation rule is used 711, and generating documentation and code 712. The user then optionally exports the documentation generated 713.

FIGS. 45-59 present a various sample screens of an exemplary user interface for developing code for use for forms with regard to implementation under the IDEA, in accordance with an embodiment of the present invention. This portion of the present invention guides a user systematically through iterative development of the various items within a populatable document, such as a form, until completed.

Figure 45:
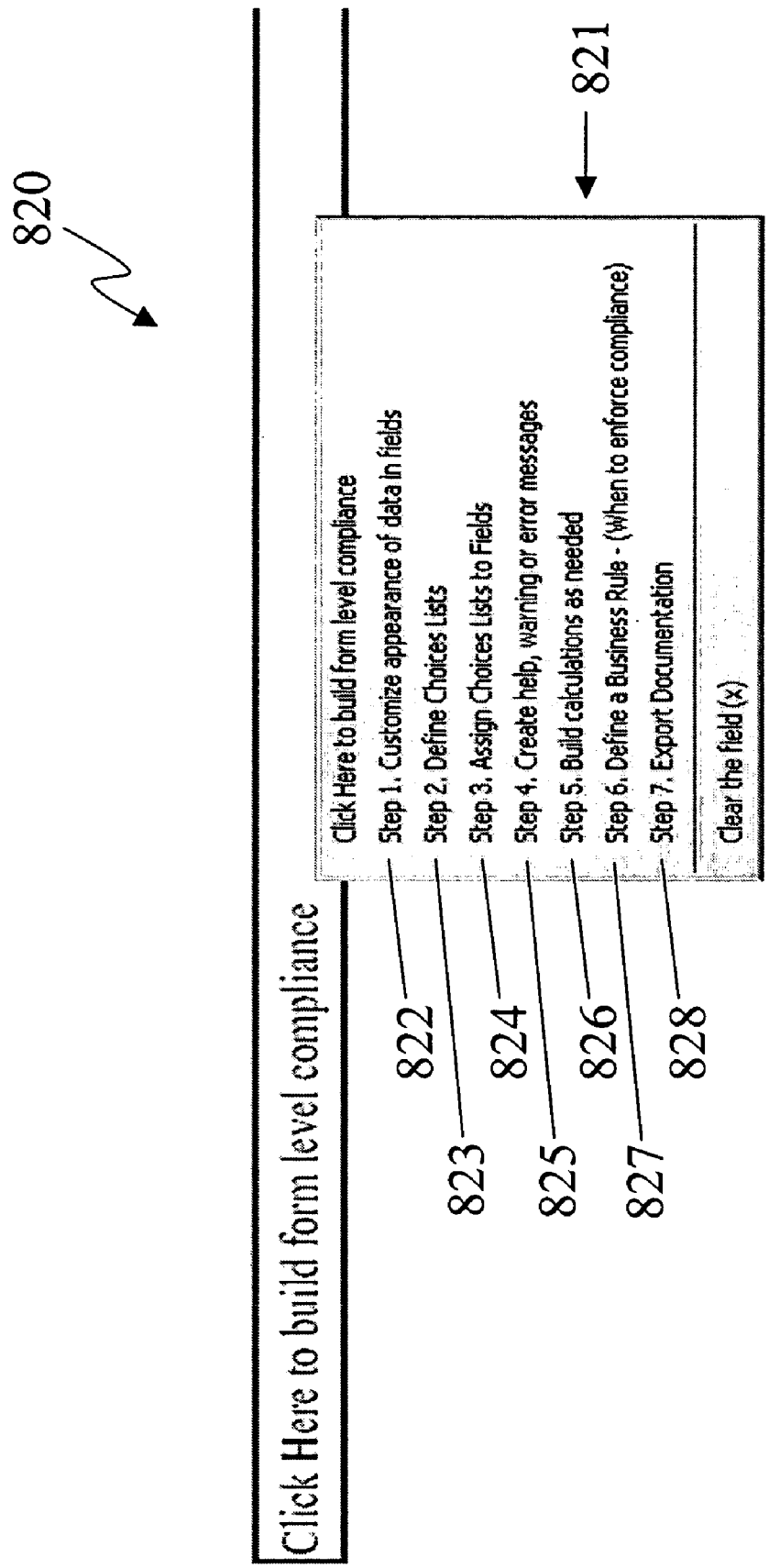

As shown in FIG. 45, in one embodiment of the present invention, once the user interface for creating code is selected for access, the user is presented with a GUI interface element 820, such as a popup or pulldown menu, to build form level compliance information. As shown in FIG. 45, a self-explanatory pulldown menu presents various actions for a user to perform to complete code development. In this example, the actions include the following: 1) customize appearance of data in fields 822; 2) define choices lists 823; 3) assign choices lists to fields 824; 4) create help, warning, or error messages 825; 5) build calculations as needed 826; 6) define a business rule (e.g., when to enforce compliance) 827; and 7) export documentation 828.

Figure 46:
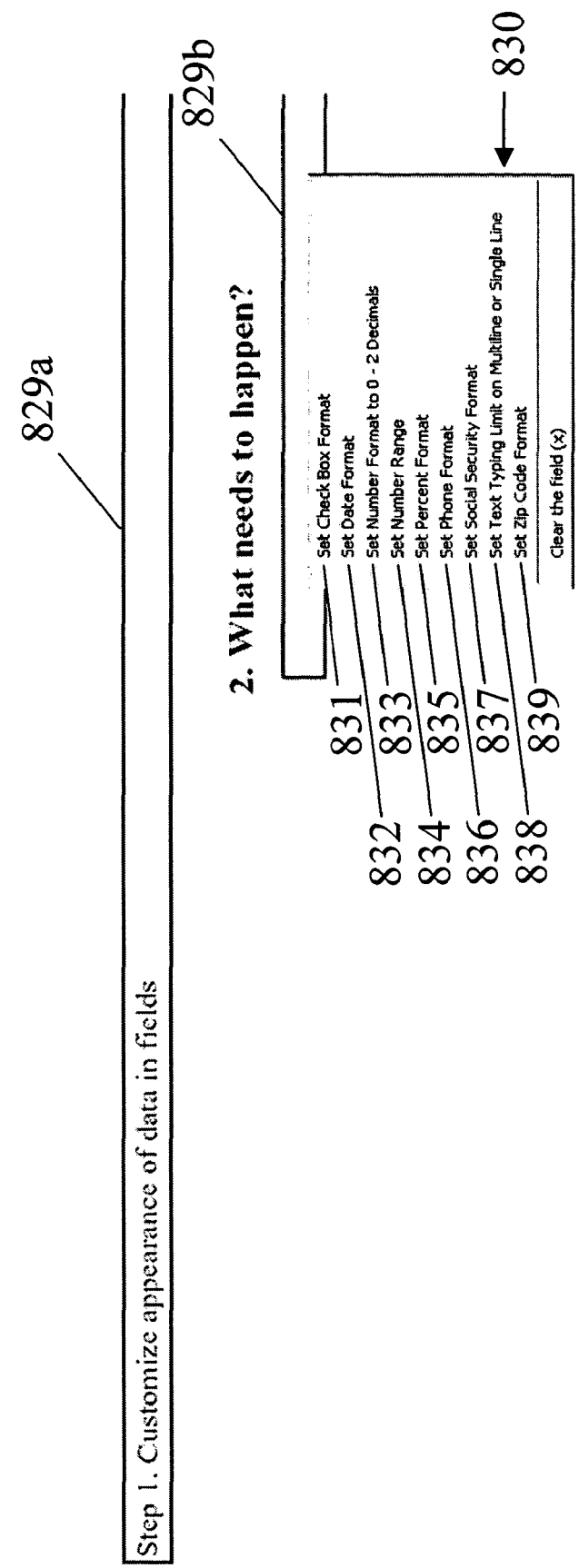

Upon selection of the first action of "customize appearance of data in fields" 822 in FIG. 45, a next set of optionally selectable actions appear for the user, such as in a pulldown menu 830 shown in FIG. 46. In one embodiment, each selectable option appears in a colored or other highlighted format. For example, in FIG. 46, the "customize appearance of data in fields" box 829a is blue, and the "what needs to happen" box 929b is green. Initially, in this example screen, selection of the blue box 829a produces a list of the items in the green box 829b, but with a blank selection, since the user has made no selection initially.

As shown in FIG. 46, once the user selects the green box 829b, selectable actions 830 appear, such as the following: 1) set check box format 831; 2) set date format 832; 3) set format to 0-2 decimals 833; 4) set number range 834; 5) set percent format 835; 6) set telephone format 836; 7) set social security format 837; 8) set text typing limit on multiline or single line 838; and 9) set zip code format 839.

Figure 47:
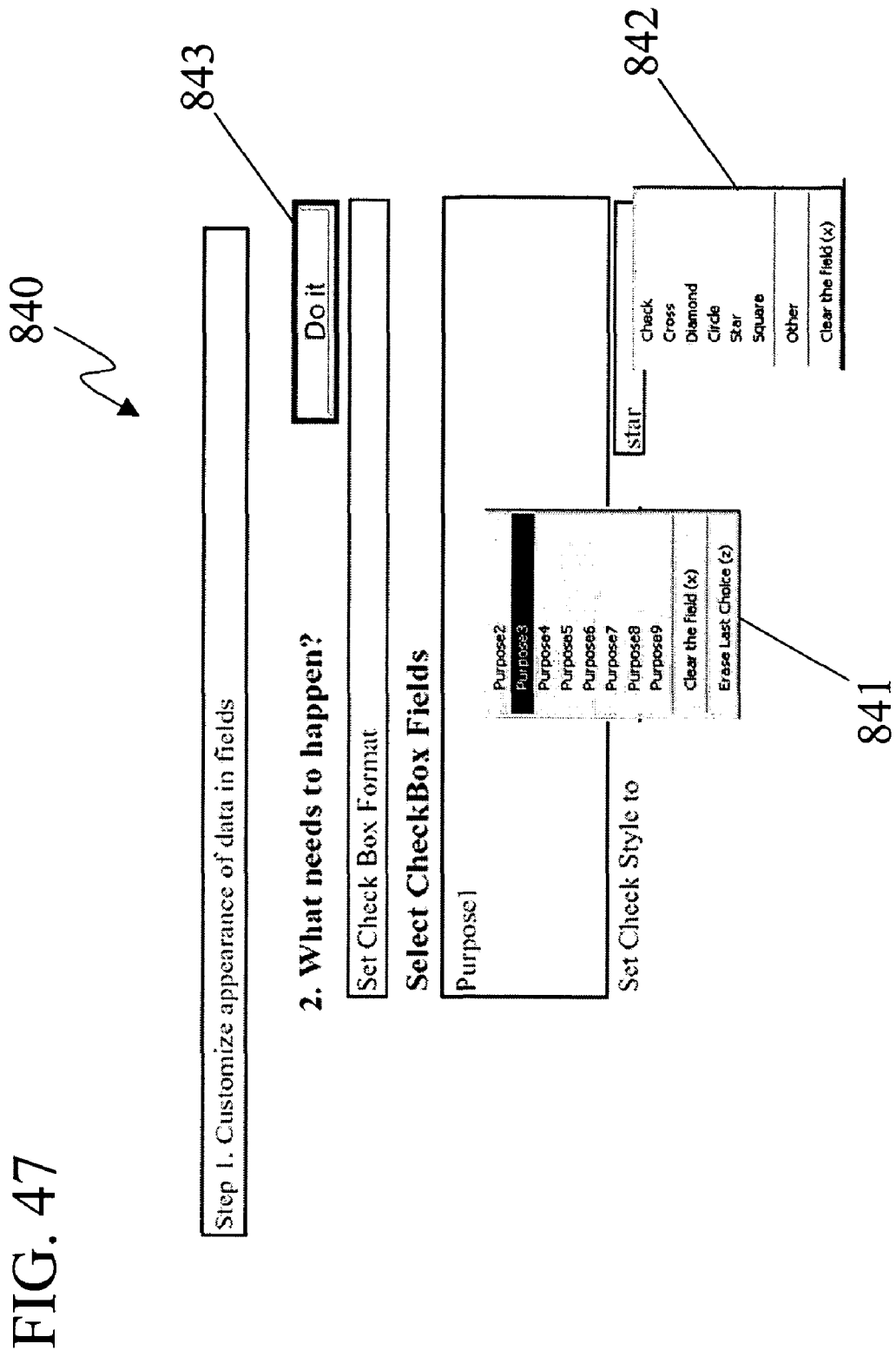
Figure 48:
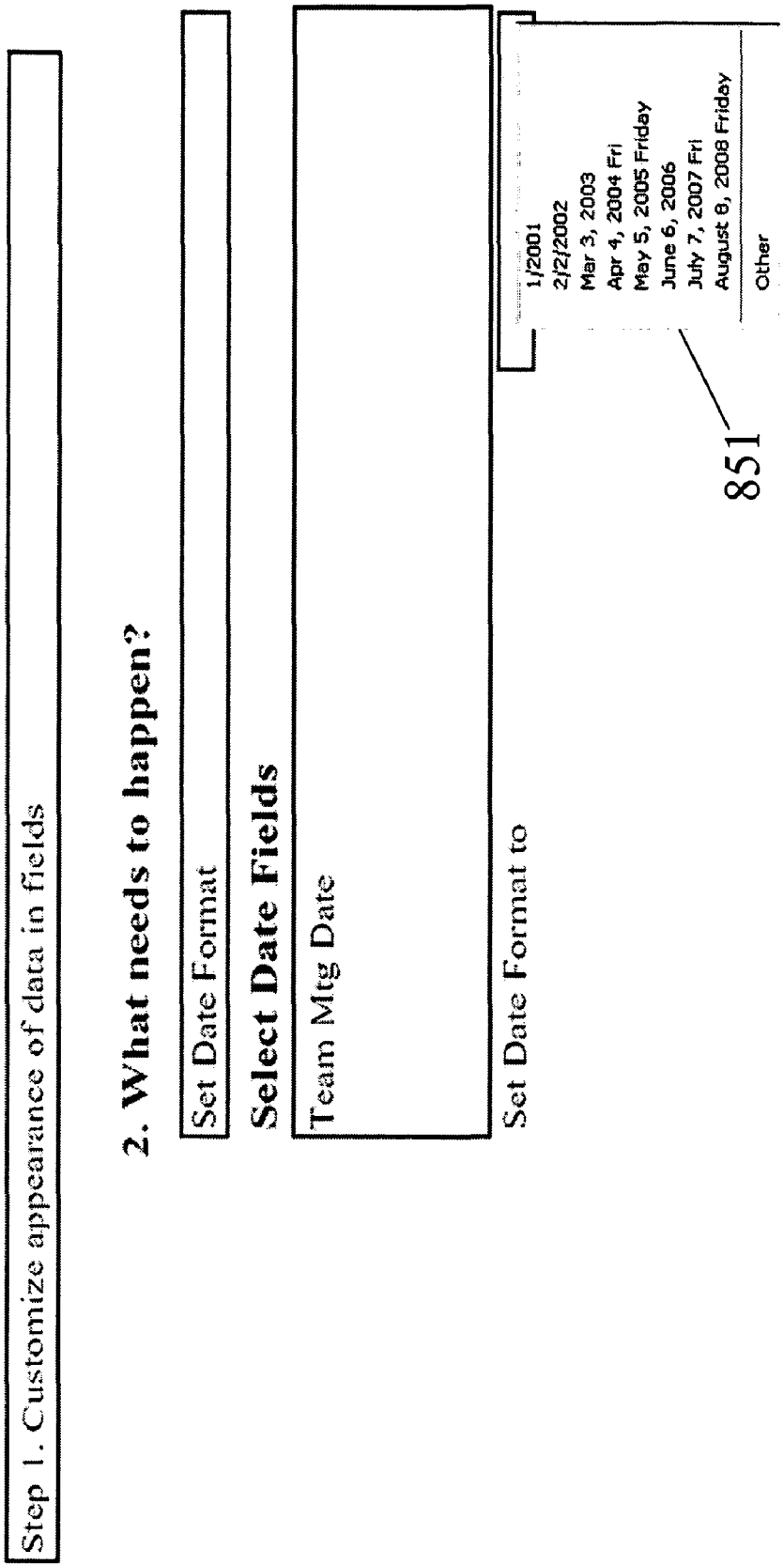

If "set check box format" 831 is selected in FIG. 46, additional select checkbox fields 840 appear, as shown in FIG. 47. Pulldown or popup menus 841, 842 are usable, for example, to select a purpose and check style, respectively. When a formatting option is selected, only those fields that are of a certain type appear in the popup. In one embodiment, the user interface for developing code evaluates the prefix (naming convention) of the field to determine its field type, such as is a checkbox, date, string field, etc. In the example shown in FIG. 47, the "Set Check Style to" dropdown 842 shows available styles for a checkbox. Selecting the "Do It" button 843 applies the changes, which become visible immediately on the form. If "set date format" 832 is selected in FIG. 46, select date fields selection features 840 appear, such as or including the pulldown menu for date 851, as shown in FIG. 48. In one embodiment, the field name is in simple English and the fields change color as their selected features are completed.

Figure 49:
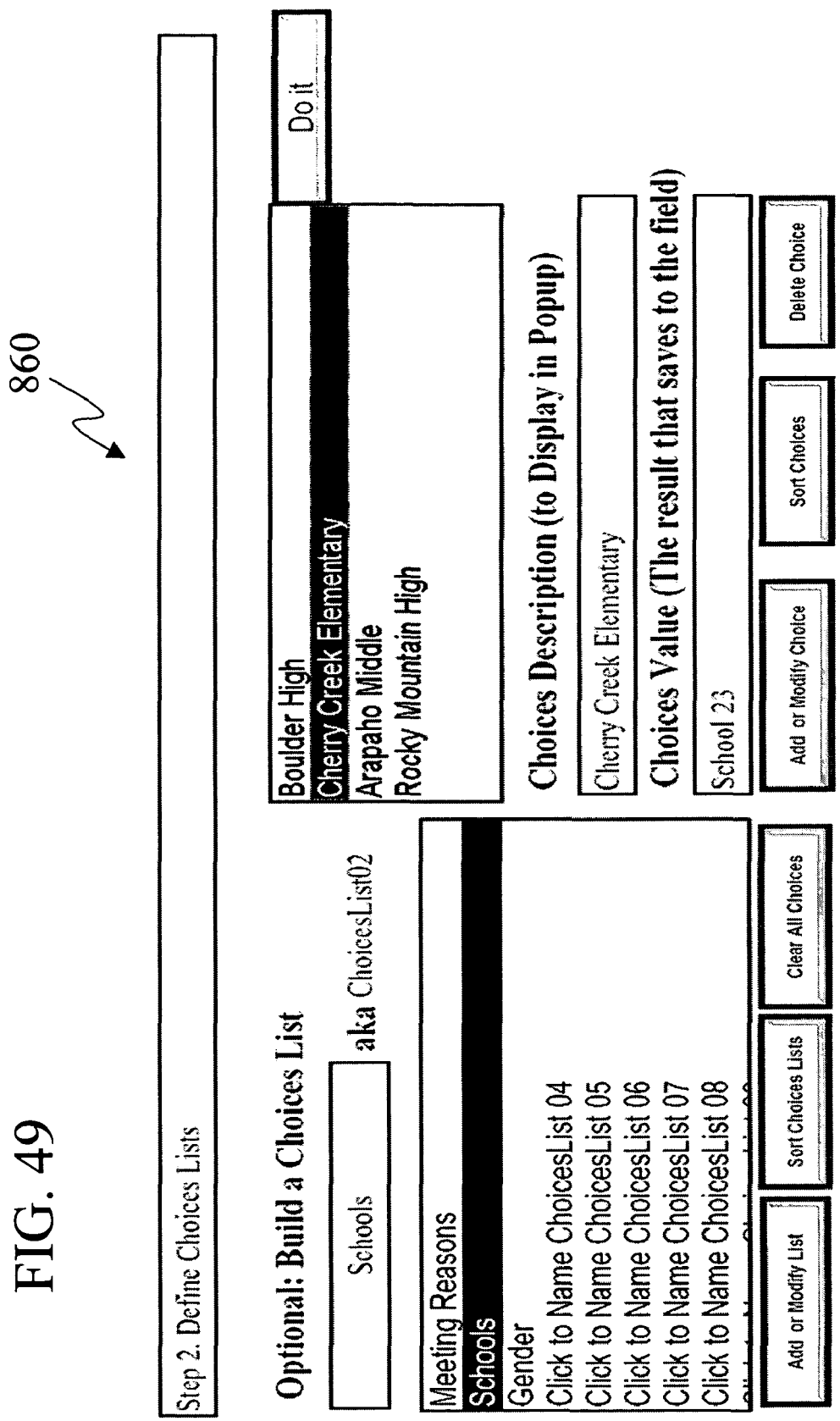

If the "define choices list" action 823 is selected in FIG. 45, selection options 860 appear for building a choices list 840, as shown in FIG. 47. As shown in FIG. 49, buttons, developable and modifiable lists, or other selection features allow building of the choices list. In one embodiment, the user can add choices lists that are not database driven by entering them directly on the form portion of the system.

Figure 50:
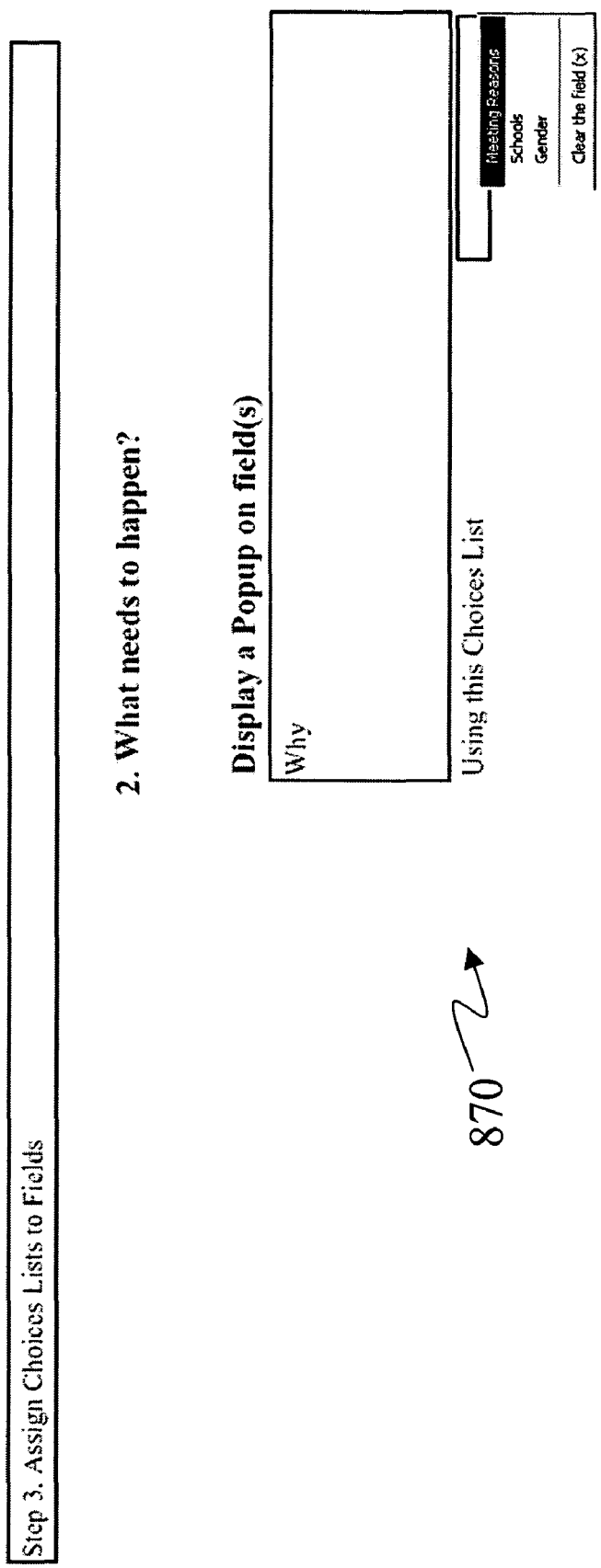

If the "assign choices list to fields" action 824 is selected in FIG. 45, selection options 870 appear for displaying popup or other selectable options, as shown in FIG. 50. As shown in FIG. 50, pulldown lists or other selection features allow building of the choices lists. In one embodiment, all of the choices lists that the user creates automatically appear in a list of "Choices Lists" that can be applied to any text field. If the "create help, warning, or error messages" action 825 is selected in FIG. 45, selection options 880 appear for selecting a message to modify 881, attaching a message to a field 882, and saving the message application 883, as shown in FIG. 51. In one embodiment, the user interface for creating code dynamically allows the user to create messages for one or more fields, which appear when the user enters, leaves, or changes data in a field (e.g., performs a validation action).

Figure 52:
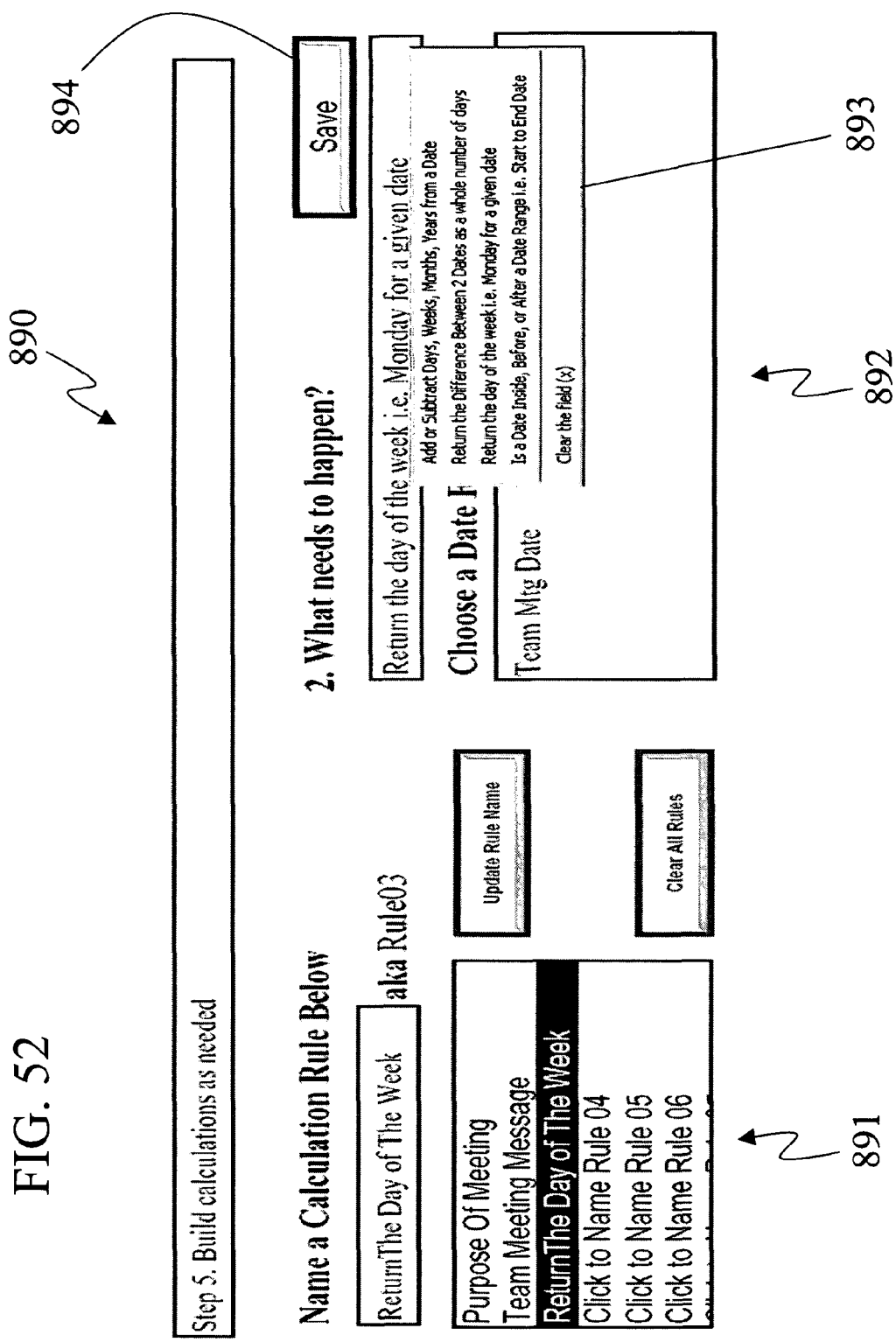

If the "build calculations as needed" action 826 is selected in FIG. 45, selection options 890 appear for naming a calculation rule 891, selecting an action to occur 892, including, for example, selecting from a list of actions 893, such as via a pulldown menu, and saving the selections 894, as shown in FIG. 52.

Figure 53:
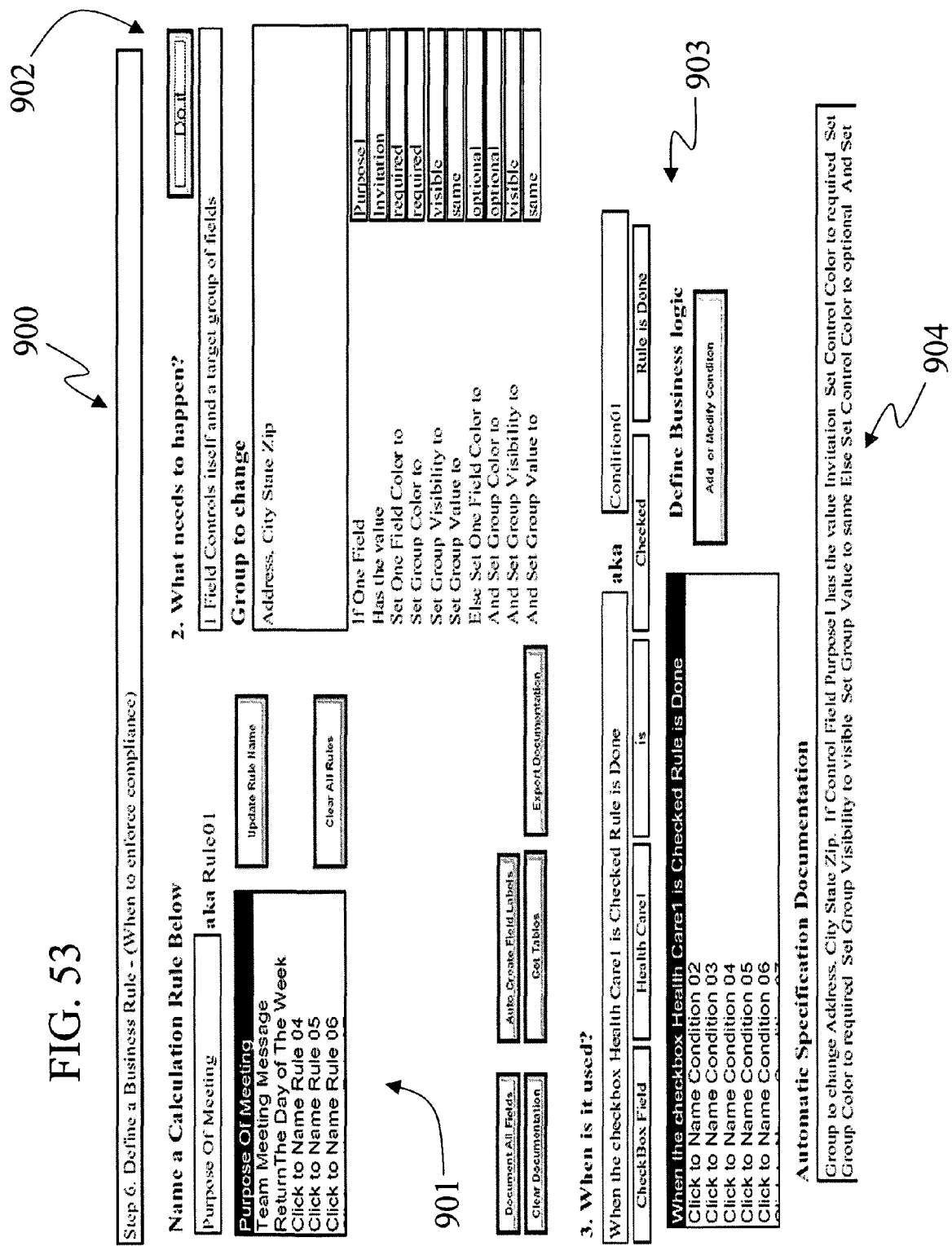

If the "define a business rule" action 827 is selected in FIG. 45, selection options 900 appear for defining a business rule, including portions for naming a calculation rule 901, indicating what needs to happen 902, indicating when the rule is used 903, and displaying the automatic specification documentation generated 904, as shown in FIG. 53. In some implementations of the present invention, business logic requires the performance of date math, retrieving the day of the week, or determining if a date is a valid date, each of which is performed within the "defining a business" portion of the system.

Figure 54:
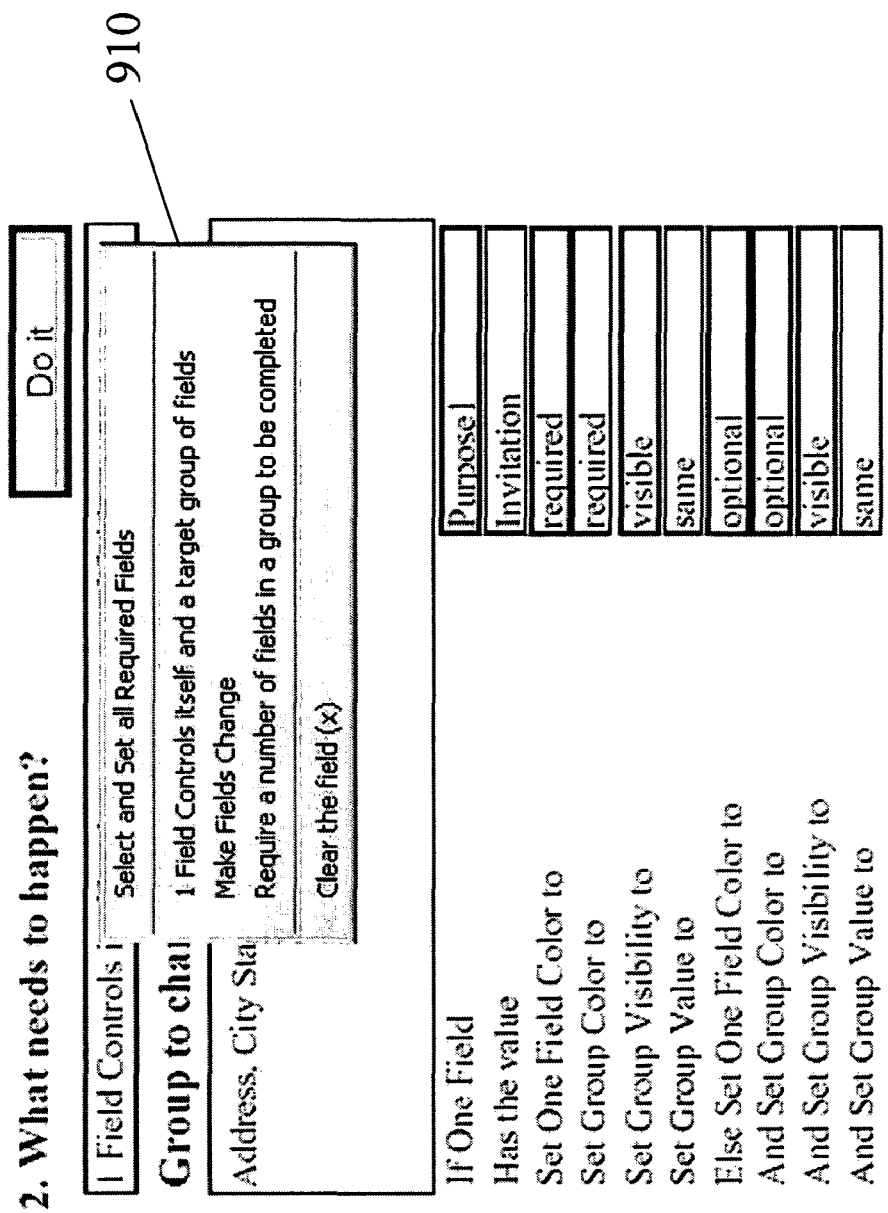

As shown in FIG. 54, within the portion for indicating "what needs to happen" 902, various options may be selected from, for example, a pulldown menu 910 (for selecting and setting all required fields). In particular, in the example shown, each field's visibility is controlled, each being optional or required based on, for example, values in the fields or additional business logic contained in the condition section, as described further in conjunction with FIG. 55.

Figure 55:
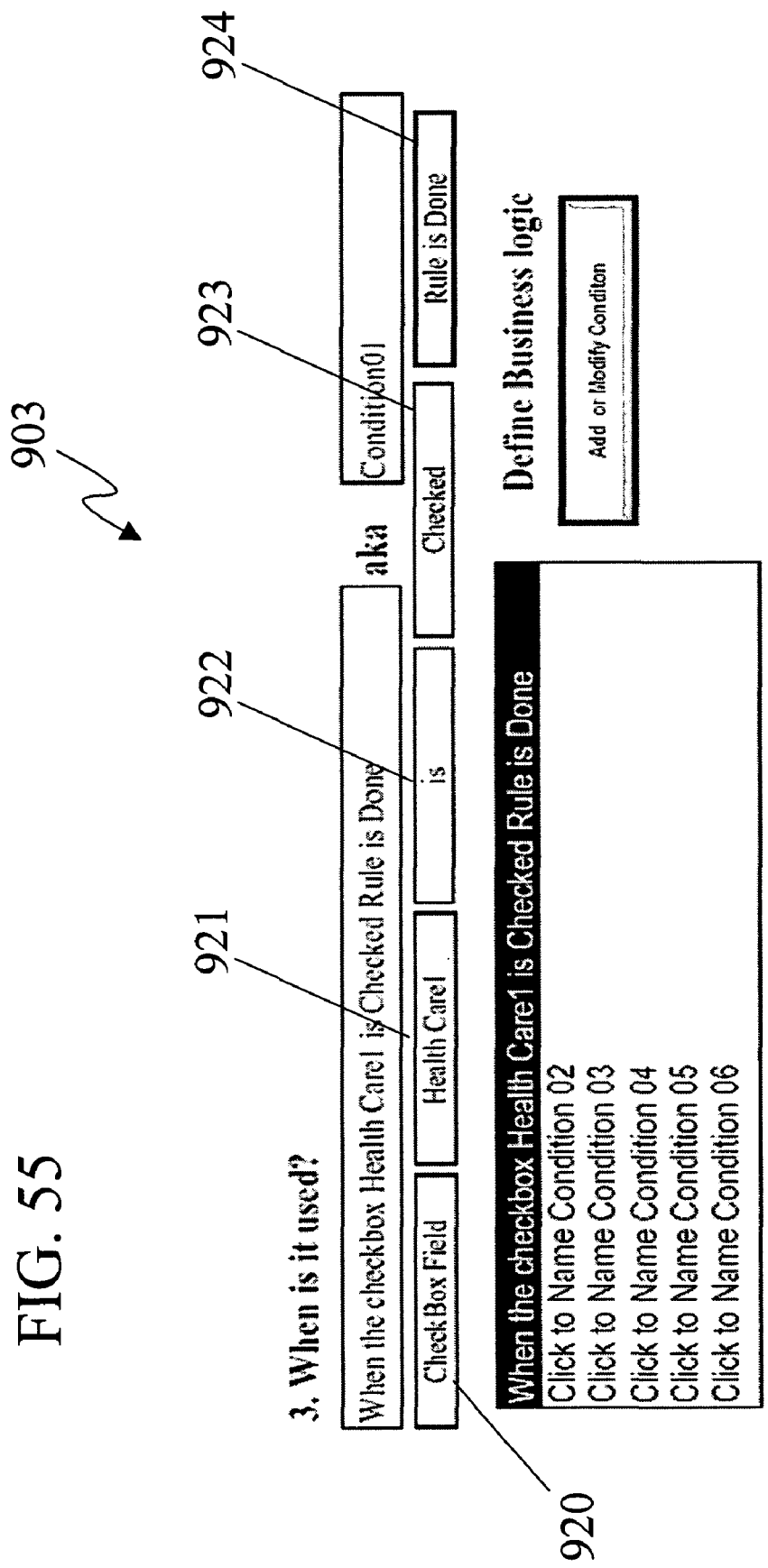
Figure 57:
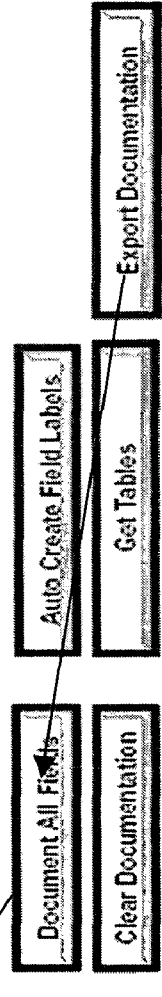

As shown in FIG. 55, within the portion for indicating "when the rule is used" 903, various options may be selected, such as defining rule portions and linking the rule portions to a listed condition, to produce business logic for the rule use. For example, as shown in the exemplary implementation of FIG. 55, the user first selects the box for the field type to be used 920. The second box 921 then displays all of the fields of that type. Once a field is selected, the third box 922 provides a list of all operators that are valid. The fourth field 923 allows selection or input of a value, such as, in this case, "checked" or "unchecked" (the only possible values for a checkbox in this example). In this example, the fifth box 924 then presents three choices for selection: AND, OR, or RULE IS DONE.

FIG. 56 details the automatically generated documentation portion 904 of the system, including displaying the documentation 930 and the corresponding code created 931, such as Javascript. As the user builds the business logic, this portion of the system automatically documents the work in simple English and actually writes the code needed.

Figure 58:
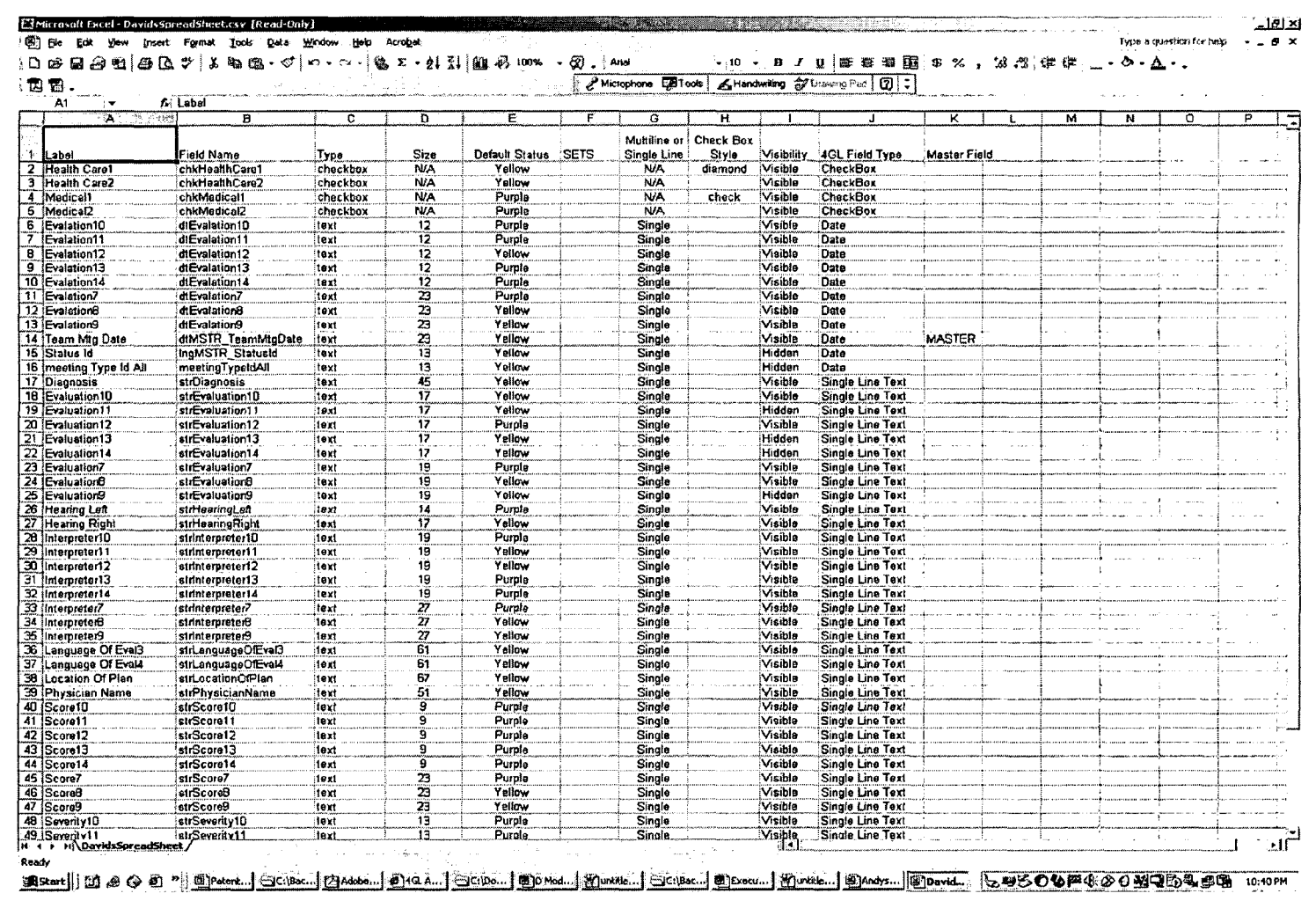

If the "export documentation" action 828 is selected in FIG. 45, selection options 940 appear for exporting documentation. For example, by selecting the Export Documentation button 941, the user is able to export spreadsheets. By then selecting the "document all fields" button 942, for example, each field may be viewed by itself. FIG. 58 shows an example spreadsheet of documented field properties completed by a user. FIG. 59 presents a sample form showing various features and selected options completed by a user, with documentation presented on the developed form.

Illustrative Implementation

An illustrative implementation of the present invention will now be presented. The approach of an embodiment of the present invention includes use of staff to work with school district staff at the beginning of an engagement to examine their paperwork and to identify all Federal and State rules that apply at the field level, at the page level, and at the document set level for their paperwork. FIGS. 60A-60L contain an exemplary analysis preformed for Winston-Salem Forsythe County school district, in which all of the relevant Federal and North Carolina rules were identified. As indicated, nearly 200 such rules were identified.

The spreadsheets shown in FIGS. 60A-60L identify each affected page of the paperwork, the state and Federal legal code that affects that page, and the compliance check that needed to be built into the software application to support full compliance. Other aspects of the present invention were then used to build those almost 200 rules into online paperwork that looked exactly like the district's existing paperwork, but that tutored school district staff in real time on what they had to do to be fully compliant for a particular student. This approach in Winston-Salem allowed the district to go from 6 compliance officers to 1 and ½, while simultaneously dramatically increasing the overall district level compliance of the paperwork.

Use of the present invention also cut the average length of IEP meetings by over 50% by focusing district staff on exactly what was required to complete the paperwork. The staff time freed up by this has been estimated by Winston-Salem to be about 7 hours per child per year. This result is valued by the district at $150 per child per year in staff saving. This process has also dramatically cut the need for Winston-Salem to rehold meetings due to non-compliant paperwork. Excessive paperwork burden has been identified nationally as one of the key reasons that Special Educators quit the field, which they do at twice the rate nationally as regular education teachers. Winston-Salem this year saw their Special Education staff turnover rate drop significantly, reversing a long time trend. This kind of approach will work with any work flow process that has associated paperwork with embedded legal requirements in it.

Example embodiments of the present invention have now been described in accordance with the above advantages. It will be appreciated that these examples are merely illustrative of the invention. Many variations and modifications will be apparent to those skilled in the art.

The invention claimed is:

1. In a computer system, a method for providing interactive assistance with populating an automated document that includes at least one field, the computer system comprising a processor, a data repository, and a user interface, the method comprising:
    selecting, via the processor, an entity to which the automated document applies;
    assigning, via the processor, a prioritization to each of the at least one field, the prioritization stored in the data repository;
    prompting, via the user interface, for a response for each of the at least one field, the prompting varying based on the prioritization of each of the at least one field;
    varying, via the processor, a color of each of the at least one field based on the prioritization;
    performing, via the processor, a compliance check of each response for the at least one field to determine if the response complies with predetermined legal requirements, wherein a validation rule triggers the compliance check to occur as the response for the at least one field is being entered;
    iteratively revising, via the processor, the prioritization of all of the at least one field upon receiving the response to each of the at least one field;
    prompting varying based on the iteratively revised prioritization of all of the at least one field;
    identifying data from an accessible repository responsive to any of the at least one field of the automated document;
    automatically populating each of the at least one field of the automated document for which the responsive data from the accessible repository are identified;
    highlighting each of the at least one field containing automatic populating; and
    displaying, via the user interface, the populated automated document.

2. The method of claim 1, wherein the populated automated document is a form.

3. The method of claim 2, wherein the form is used for compliance with educational requirements.

4. The method of claim 3, wherein the educational requirements include requirements under the Individuals with Disabilities Education Act.

5. The method of claim 1, wherein the predetermined legal requirements are legal requirements under the Individuals with Disabilities Education Act.

6. The method of claim 5, further comprising:
    if the compliance check passes, providing an option to lock the automated document.

7. The method of claim 6, further comprising:
    receiving a selection of a response to the option to lock the populated automated document; and
    if the selection is to lock the populated automated document, preventing revision of each of the responses to the at least one field.

8. The method of claim 1, further comprising:
    prompting a user for security information.

9. The method of claim 1, wherein the entity is an individual.

10. The method of claim 1, further comprising:
    storing the automated document with the response to each of the at least one field.

11. The method of claim 1, wherein prompting for a response to each of the at least one field is selected from a group consisting of prompting for a required response, and prompting for an optional response.

12. The method of claim 1, wherein selecting an entity to which the automated document applies includes:
    searching the data repository containing at least one entity.

13. The method of claim 1, further comprising:
    providing an option to select the automated document form a plurality of documents.

14. The method of claim 13, further comprising:
    generating the plurality of documents via a search.

15. The method of claim 1, wherein the automated document is associating with a meeting.

16. The method of claim 15, wherein the meeting includes at least one event.

17. A computer system for providing interactive assistance with populating a automated document that includes at least one field, the computer system comprising a processor, a data repository, and a user interface, the computer system further comprising:
    means for, via the processor, selecting an entity to which the automated document applies;

means for, via the processor, assigning a prioritization to each of the at least one field, the prioritization stored in the data repository;

means for prompting, via the user interface, for a response for each of the at least one field, the prompting varying based on the prioritization of each of the at least one field;

means for varying, via the processor, a color of each of the at least one field based on the prioritization;

means for performing, via the processor, a compliance check of each response for the at least one field to determine if the response complies with predetermined legal requirements, wherein a validation rule triggers the compliance check to occur as the response for the at least one field is being entered;

means for iteratively revising, via the processor, the prioritization of all of the at least one field upon receiving the response to each of the at least one field;

means for prompting, via the user interface, for a response to at least one field, the prompting varying based on the iteratively revised prioritization of all of the at least one field;

means for identifying data from an accessible repository responsive to any of the at least one field of the automated document;

means for automatically populating each of the at least one field of the automated document for which the responsive data from the accessible repository are identified;

means for highlighting each of the at least one field containing automatic populating; and means for displaying, via the user interface, the populated automated document.

18. The system of claim 17, wherein the predetermined legal requirements are legal requirements under the Individuals with Disabilities Education Act.

19. A system for providing interactive assistance with populating a automated document that includes at least one field, the system comprising:

a processor;
a user interface functioning via the processor; and
a repository accessible by the processor;
wherein an entity to which the automated document applies is selected by the processor;
wherein a prioritization to each of the at least one field is assigned, the prioritization stored in the data repository;
wherein a response for each of the at least one field is prompted for, the prompting varying based on the prioritization of each of the at least one field;
wherein a color of each of the at least one field varies based on the prioritization;
wherein the response for each of the at least one field is checked for compliance with predetermined legal requirements;
wherein a validation rule triggers the compliance check to occur as the response for the at least one field is being entered;
wherein the prioritization of all of the at least one field is iteratively revised upon receiving the response to each of the at least one field;
wherein data from an accessible repository responsive to any of the at least one field of the automated document is identified;
wherein each of the at least one field of the automated document is automatically populated for which the responsive data from the accessible repository are identified;
wherein each of the at least one field containing automatic populating is highlighted; and
wherein the populated automated document is displayed.

20. The system of claim 19, wherein the processor is housed on a terminal.

21. The system of claim 20, wherein the terminal is selected from a group consisting of a personal computer, a minicomputer, a main frame computer, a microcomputer, a hand held device, and a telephonic device.

22. The system of claim 20, wherein the processor is housed on a server.

23. The system of claim 22, wherein the server is selected from a group consisting of a personal computer, a minicomputer, a microcomputer, and a main frame computer.

24. The system of claim 23, wherein the server is coupled to a network.

25. The system of claim 24, wherein the network is the Internet.

26. The system of claim 24, wherein the server is coupled to the network via a coupling.

27. The system of claim 26, wherein the coupling is selected from a group consisting of a wired connection, a wireless connection, and a fiberoptic connection.

28. The system of claim 20, wherein the repository is housed on a server.

29. The system of claim 28, wherein the server is coupled to a network.

30. The system of claim 19, wherein the predetermined legal requirements are legal requirements under the Individuals with Disabilities Education Act.

31. A computer program product comprising a computer usable storage medium having control logic stored therein for causing a computer to provide interactive assistance with populating an automated document that includes at least one field, the control logic comprising:

first computer readable program code means for selecting an entity to which the automated document applies;

second computer readable program code means for assigning a prioritization to each of the at least one field;

third computer readable program code means for prompting for a response for each of the at least one field, the prompting varying based on the prioritization of each of the at least one field, wherein a color of each of the at least one field varies based on the prioritization;

fourth computer readable program code means for performing a compliance check of each response for the at least one field, wherein a validation rule triggers the compliance check to occur as the response for the at least one field is being entered;

fifth computer readable program code means for iteratively revising the prioritization of all of the at least one field upon receiving the response to each of the at least one field;

sixth computer readable program code means for identifying data from an accessible repository responsive to any of the at least one field of the automated document;

seventh computer readable program code means for automatically populating each of the at least one field of the automated document for which the responsive data from the accessible repository are identified;

eighth computer readable program code means for highlighting each of the at least one field containing automatic populating; and ninth computer readable program code means for displaying the populated automated document.

* * * * *